US012587843B2

(12) United States Patent
Tamura et al.

(10) Patent No.: US 12,587,843 B2
(45) Date of Patent: Mar. 24, 2026

(54) USER EQUIPMENT, AND METHOD FOR RECEIVING AN EXTENSIBLE AUTHENTICATION PROTOCOL (EAP) IDENTITY REQUEST

(71) Applicant: NEC Corporation, Tokyo (JP)

(72) Inventors: Toshiyuki Tamura, Tokyo (JP); Tsuyoshi Takakura, Tokyo (JP)

(73) Assignee: NEC Corporation, Tokyo (JP)

( * ) Notice: Subject to any disclaimer, the term of this patent is extended or adjusted under 35 U.S.C. 154(b) by 531 days.

(21) Appl. No.: 17/628,961

(22) PCT Filed: Sep. 10, 2020

(86) PCT No.: PCT/JP2020/034207
§ 371 (c)(1),
(2) Date: Jan. 21, 2022

(87) PCT Pub. No.: WO2021/054231
PCT Pub. Date: Mar. 25, 2021

(65) Prior Publication Data
US 2022/0264294 A1 Aug. 18, 2022

(30) Foreign Application Priority Data

Sep. 18, 2019 (JP) ................................. 2019-169739

(51) Int. Cl.
*H04W 12/06* (2021.01)
*H04W 12/08* (2021.01)
(Continued)

(52) U.S. Cl.
CPC ........... *H04W 12/06* (2013.01); *H04W 12/08* (2013.01); *H04L 63/0892* (2013.01); *H04W 12/00* (2013.01)

(58) Field of Classification Search
None
See application file for complete search history.

(56) References Cited

U.S. PATENT DOCUMENTS

| 11,457,403 B2* | 9/2022 | Kim | ...................... H04W 76/18 |
| 2019/0029065 A1* | 1/2019 | Park | ...................... H04W 60/00 |

(Continued)

FOREIGN PATENT DOCUMENTS

| CN | 109246813 A | * | 1/2019 | ............ H04W 60/00 |
| CN | 111654862 A | * | 9/2020 | ............ H04W 60/00 |

(Continued)

OTHER PUBLICATIONS

International Search Report for PCT Application No. PCT/JP2020/034207, mailed on Dec. 1, 2020.

(Continued)

*Primary Examiner* — Ali H. Cheema
(74) *Attorney, Agent, or Firm* — Sughrue Mion, PLLC

(57) ABSTRACT

Network slice information management by a UE 10 has not been defined for a network slice for which network slice-specific authentication and authorization are pending. A UE may receive, from a core network node, first information indicating that a procedure of network slice-specific authentication and authorization is pending; store first network slice information including one or more pieces of first slice information or one or more pieces of second slice information, the first slice information indicating a slice that a network rejects to be used, the second slice information indicating a slice that the network permits to be used; and store, independently from the first network slice information, second network slice information corresponding to the first information.

7 Claims, 15 Drawing Sheets

(51) Int. Cl.
  *H04L 9/40* (2022.01)
  *H04W 12/00* (2021.01)

(56) References Cited

U.S. PATENT DOCUMENTS

| | | | | |
|---|---|---|---|---|
| 2019/0200285 | A1* | 6/2019 | Velev | H04W 8/02 |
| 2019/0261185 | A1* | 8/2019 | Velev | H04W 48/18 |
| 2019/0357128 | A1* | 11/2019 | Casati | G06F 9/45558 |
| 2020/0053083 | A1* | 2/2020 | Kunz | H04W 12/72 |
| 2020/0107250 | A1* | 4/2020 | So | H04W 48/18 |
| 2020/0137552 | A1* | 4/2020 | Park | H04W 60/06 |
| 2020/0196130 | A1 | 6/2020 | Tamura et al. | |
| 2020/0344648 | A1* | 10/2020 | Kawasaki | H04W 36/14 |
| 2020/0413244 | A1* | 12/2020 | Park | H04W 60/06 |
| 2021/0051516 | A1* | 2/2021 | Huang-Fu | H04W 76/10 |
| 2021/0058840 | A1* | 2/2021 | Kawasaki | H04W 76/12 |
| 2021/0227392 | A1* | 7/2021 | Zhu | H04W 12/082 |
| 2021/0360519 | A1* | 11/2021 | Ramle | H04L 41/0895 |
| 2022/0110050 | A1* | 4/2022 | Won | H04W 8/12 |
| 2022/0256450 | A1* | 8/2022 | Kuge | H04W 60/04 |
| 2022/0295279 | A1* | 9/2022 | Kuge | H04W 12/08 |
| 2023/0247542 | A1* | 8/2023 | Kuge | H04W 48/18 |
| | | | | 370/329 |

FOREIGN PATENT DOCUMENTS

| | | | | | |
|---|---|---|---|---|---|
| JP | | 7401989 | B2 * | 12/2023 | H04W 60/04 |
| WO | 2019/073977 | A1 | | 4/2019 | |

OTHER PUBLICATIONS

3GPP TS 23.501 V16.1.0 (Jun. 2019), "System Architecture for the 5G System". pp. 1-367.

3GPP TS 23.502 V16.1.1 (Jun. 2019), "Procedures for the 5G System". pp. 1-494.

3GPP TS 24.501 V16.1.0 (Jun. 2019), "Non-Access-Stratum (NAS) protocol for 5G System (5GS)", pp. 1-541.

C1-194638, NEC, "Before network slice specific authentication and authorization", 3GPP TSG CT WG1 #119, Aug. 30, 2019. pp. 1-6.

C1-194577, Interdigital, "Progress of the work on Slice Specific Authentication". 3GPP TSG CT WG1 #119. Aug. 30, 2019. pp. 1-2.

C1-196441, NEC, "Preventing UE waiting for completion of NSSAA indefinitely", 3GPP TSG CT WG1 #120, Sep. 30, 2019, pp. 1-3.

Extended European Search Report for EP Application No. 20866866.5 dated on Sep. 20, 2022.

TS 23.502 V16.2.0 "3rd Generation Partnership Project; Technical Specification Group Services and System Aspects; Procedures for the 5G System; Stage 2(Release 16)" 3GPP Draft; 23502-G20_NOT_23502_CR1358R2_CRS_IMPLEMENTED, 3rd Generation Partnership PROJECT(3GPP), Mobile Competence Centre; 650, Route Des Lucioles; F-06921 Sophia-Antipolis Cedex; France, vol. SA WG2, Sep. 6, 2019, XP051776345.

JP Office Action for JP Application No. 2023-126664, mailed on Jul. 30, 2024 with English Translation.

Huawei, "(TP for NR BL CR for TS 38.413) Allowed NSSAI in DL NAS", 3GPP TSG RAN WG3 #101 R3-184879, Aug. 10, 2018.

Japanese Office Communication for JP Application No. 2023-126664, mailed on Feb. 18, 2025 with English Translation.

Huawei et al., "EAP based slice-specific authentication", 3GPP TSG SA WG3 #96 S3-192726, Aug. 19, 2019.

EP Office Action for EP Application No. 20866866.5, mailed on May 12, 2025.

ETSI TS 124 501 V15.4.0 (Jul. 2019), 5G; Non-Access-Stratum (NAS) protocol for 5G System (5GS); Stage 3 (3GPP TS 24.501 version 15.4.0 Release 15), vol. 3GPP CT, No. V15.4.0 Jul. 22, 2019.

* cited by examiner

USER EQUIPMENT, AND METHOD FOR RECEIVING AN EXTENSIBLE AUTHENTICATION PROTOCOL (EAP) IDENTITY REQUEST

This application is a National Stage Entry of PCT/JP2020/034207 filed on Sep. 10, 2020, which claims priority from Japanese Patent Application 2019-169739 filed on Sep. 18, 2019, the contents of all of which are incorporated herein by reference, in their entirety.

TECHNICAL FIELD

The present disclosure relates to a wireless device, a communication method, and a core network node.

BACKGROUND ART

A new generation network called the fifth generation (5G) network has been researched in telecommunication industries. Actions have been started at a plurality of research standardization organizations to develop the 5G network, which provides services to a plurality of vertical service providers and provides services to various kinds of terminals. In particular, the 3rd Generation Partnership Project (3GPP) has been discussing next-generation communication technologies and system architecture of the 5G network as a next-generation mobile communication system. In particular, the 3GPP proceeds specification of a 5G system (5GS) as a system that achieves a 5G mobile communication system. The 5GS specification is disclosed in, for example, Non Patent Literature 1, Non Patent Literature 2, and Non Patent Literature 3.

For example, specification of a network slicing technology has been made as one main characteristic of the 5GS.

A network slice is a collection of logical network functions and resources that achieve a communication service in a particular use case. Network slicing is processing that divides one physical network into a plurality of slices.

Non Patent Literature 1 discloses processing in which a wireless device (user equipment (UE)) uses single network slice selection assistance information (S-NSSAI).

S-NSSAI may be configured with a slice/service type (SST) and a slice differentiator (SD). Alternatively, S-NSSAI may be configured only with the SST. Note that the SST may indicate functions or services of a network slice, and the SD may be complemental information used to identify network slices indicated by the same SST.

A network slice instance is an instance of a network slice having a control plane (c-plane (cp)) function and a user plane (u-plane (up)) function, which is disclosed in Non Patent Literature 1.

As for the relation between S-NSSAI and a network slice instance, a plurality of different pieces of S-NSSAI may be associated with one network slice instance. Moreover, one piece of S-NSSAI may be associated with one network slice instance or may be associated with a plurality of different network slice instances. A network selects an appropriate network slice instance by using S-NSSAI and the like. A function to select a network slice instance is described in Section 5.15 of Non Patent Literature 1. The selected network slice instance provides a network slice-specific service to a UE.

Network slice selection assistance information (NSSAI) is a collection of pieces of S-NSSAI. NSSAI has five NSSAI aspects, namely, configured NSSAI, rejected NSSAI, allowed NSSAI, requested NSSAI, and subscribed NSSAI.

Requested NSSAI includes one or more pieces of S-NSSAI that the UE transfers to the network. Allowed NSSAI includes one or more piece of S-NSSAI that the network permits to be used. Rejected NSSAI includes S-NSSAI that the network rejects to be used, and each S-NSSAI included in rejected NSSAI is associated with a reason value (cause value). Configured NSSAI includes one or more pieces of S-NSSAI that are applicable to one or more public land mobile networks (PLMN), which is indicated to the UE. Subscribed NSSAI includes S-NSSAI based on subscriber information that the UE subscribes to use a PLMN.

The 3GPP has been also discussing a network slice-specific authentication and authorization function. The procedure of network slice-specific authentication and authorization is described in detail in Section 5.15 of Non Patent Literature 1. As disclosed in Non Patent Literature 1, the network activates the procedure of network slice-specific authentication and authorization, and finally notifies the UE of a result of network slice-specific authentication and authorization.

CITATION LIST

Non Patent Literature

Non Patent Literature 1: 3GPP TS 23.501 V16.1.0 (2019-06)

Non Patent Literature 2: 3GPP TS 23.502 V16.1.1 (2019-06)

Non Patent Literature 3: 3GPP TS 24.501 V16.1.0 (2019-06)

SUMMARY OF INVENTION

Technical Problem

The 3GPP has been discussing the network slice-specific authentication and authorization function. However, processing of updating network slice information related to the procedure of network slice-specific authentication and authorization at a UE is not clarified.

In this case, the UE cannot determine which network slice information is to be updated based on network slice information acquired from a network, and thus cannot provide a service using a network slice function after the procedure of network slice-specific authentication and authorization is completed.

The present disclosure is made in view of such a situation and intended to solve a problem that processing of updating network slice information related to network slice-specific authentication and authorization procedure at a UE cannot be performed.

Solution to Problem

A wireless terminal in an aspect of the present disclosure includes: a reception unit configured to receive, from a core network node, first information indicating that a procedure of network slice-specific authentication and authorization is pending; a storage unit configured to store first network slice information including one or more pieces of first network slice information and one or more pieces of second slice information, the first network slice information indicating a slice that a network rejects to be used, the second slice information indicating a slice that the network permits to be used. The storage unit stores, independently from the first network slice information, second network slice information corresponding to the first information.

Advantageous Effects of Invention

According to the present disclosure, a UE 10 can support processing of the procedure of network slice-specific authentication and authorization by defining and introducing network slice information management by the UE 10 for a network slice for which network slice-specific authentication and authorization are pending.

DESCRIPTION OF EMBODIMENTS (Mobile Communication System According to the Present Disclosure)

A mobile communication system according to the present disclosure will be described below with reference to FIGS. 1 to 6.

Figure 1:
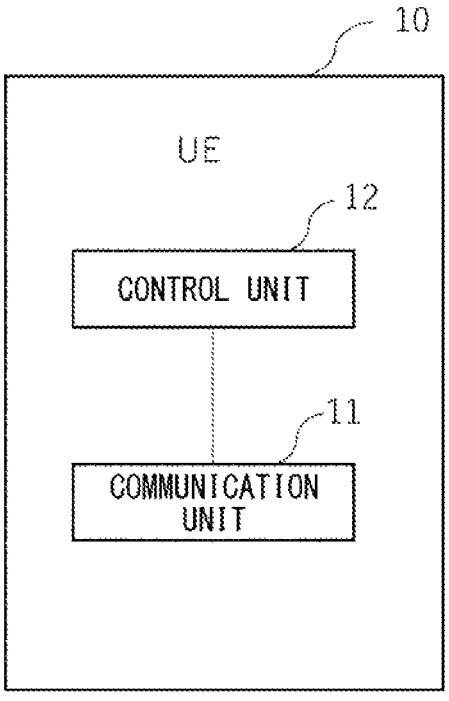
FIG. 1 is a configuration schematic diagram of a UE according to each aspect.

FIG. 1 is a diagram illustrating an exemplary device configuration of a UE. This UE 10 may be a computer device that operates as a processor executes a computer program stored in a memory. The UE 10 may be, for example, a cellular phone terminal, a smartphone terminal, or a tablet terminal. Alternatively, the UE 10 may be an internet-of-things (IoT) terminal or a machine-type communication (MTC) terminal.

The UE 10 includes a communication unit 11 and a control unit 12. The communication unit 11 and the control unit 12 may be each software or a module the processing of which is executed as a processor executes a computer program stored in a memory. Alternatively, the communication unit 11 and the control unit 12 may be each a hardware component such as a circuit or a chip.

The communication unit 11 is a functional component for the UE 10 to connect to an access network and connect to a core network through the access network. In other words, the UE 10 can transmit and receive user data and/or control information to and from an access network and/or a core network through the communication unit 11.

The control unit 12 is a functional component for controlling the UE 10 and achieves various kinds of processing of the entire UE 10 by reading and executing various kinds of information and computer programs stored in a memory.

An exemplary configuration of the UE 10 to be described in each aspect to be described later will be described below in detail with reference to FIG. 3.

Figure 3:
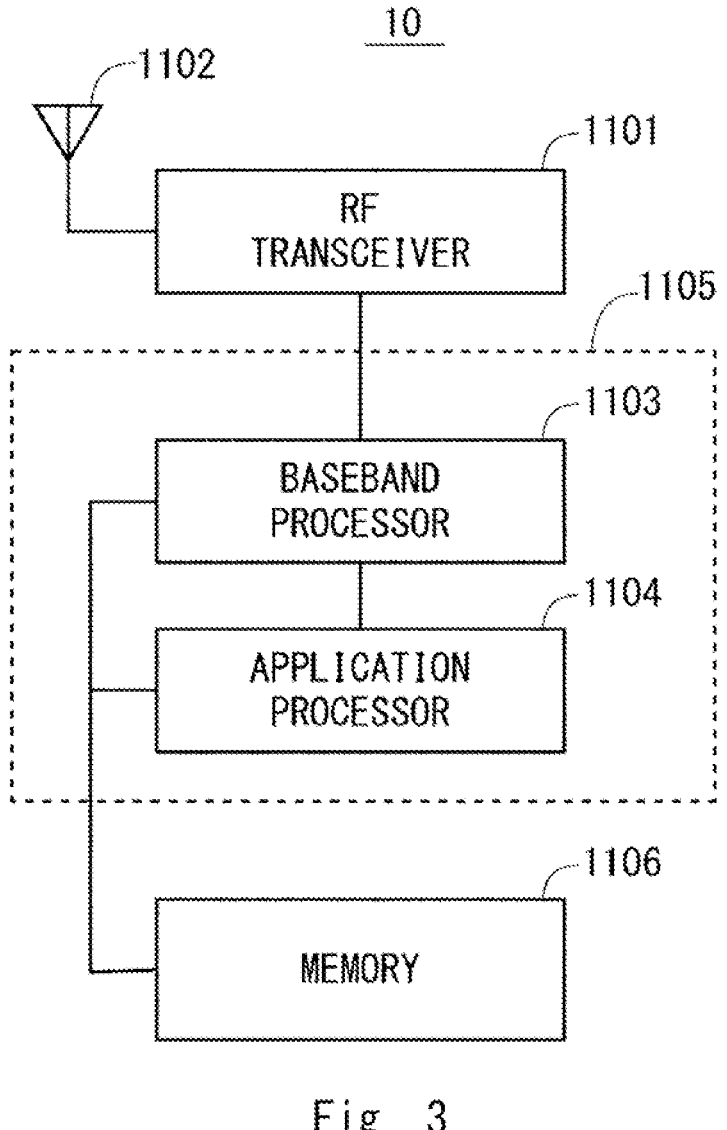
FIG. 3 is a configuration diagram of the UE according to each aspect.

FIG. 3 is a block diagram illustrating an exemplary configuration of the UE 10. A radio frequency (RF) transceiver 1101 performs analog RF signal processing for non-3GPP access such as a WLAN, and communication with an evolved NodeB (eNB) or a next generation NodeB (gNB). The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulation symbol data from the baseband processor 1103, generates a transmission RF signal, and supplies the transmission RF signal to the antenna 1102. The modulation symbol data may be orthogonal frequency division multiplexing (OFDM) symbol data.

In addition, the RF transceiver 1101 generates a baseband received signal based on a reception RF signal received by the antenna 1102 and supplies the baseband received signal to the baseband processor 1103. The UE 10 may perform communication by using wired media. In this case, the radio frequency (RF) transceiver 1101 is not connected to the antenna 1102 and operates as an adapter for communication with the wired media.

The baseband processor 1103 performs digital baseband signal processing (data plane processing) and control plane processing for wireless communication. The digital baseband signal processing includes (a) data compression/decompression, (b) data segmentation/concatenation, and (c) transmission format (transmission frame) generation/decomposition. The digital baseband signal processing includes (d) transmission path encoding/decoding. The digital baseband signal processing includes (e) modulation (symbol mapping)/demodulation and (f) OFDM symbol data (baseband OFDM signal) generation by inverse fast Fourier transform (IFFT). The control plane processing includes communication management of Layer 1 (e.g., transmission electric power control) and Layer 2 (e.g., wireless resource management, and hybrid automatic repeat request (HARQ) processing). The control plane processing includes communication management of Layer 3 (e.g., signaling related to attach, mobility, and call management).

For example, in cases of NR (New Radio), LTE (Long Term Evolution), and LTE-Advanced, the digital baseband signal processing by the baseband processor 1103 may include signal processing of a packet data convergence protocol (PDCP) layer. The digital baseband signal processing may include signal processing of a radio link control (RLC) layer, a medium access control (MAC) layer, and a physical (PHY) layer. The control plane processing by the baseband processor 1103 may also include processing of a non-access stratum (NAS) protocol, a radio resource control (RRC) protocol, and a MAC control element (CE).

The baseband processor 1103 may include a modem processor (e.g., digital signal processor (DSP)) that performs the digital baseband signal processing. The baseband processor 1103 may include a protocol stack processor that performs the control plane processing. The protocol stack processor may be, for example, a central processing unit (CPU) or a micro processing unit (MPU). In this case, the protocol stack processor that performs the control plane processing may be common to an application processor 1104 to be described later.

The application processor 1104 is also called a CPU, an MPU, a microprocessor, and a processor core. The application processor 1104 may include a plurality of processors (a plurality of processor cores). The application processor 1104 executes a system software program (operating system (OS)) read from a memory 1106 or a non-illustrated memory. The application processor implements various kinds of functions of the UE 10 by executing various application programs. The application programs may be, for example, a call application, a WEB browser, a mailer, a camera operation application, and a music playback application.

In some implementations, the baseband processor 1103 and the application processor 1104 may be integrated on one chip as illustrated with a dashed line (1105) in FIG. 3. In other words, the baseband processor 1103 and the application processor 1104 may be implemented as one system-on-chip (SoC) device 1105. A SoC device is also called a system large-scale integration (LSI) or a chip set.

The memory 1106 is a transitory memory, a non-transitory memory, or a combination thereof. The memory 1106 may include a plurality of physically independent memory devices. The transitory memory is, for example, a static random-access memory (SRAM), a dynamic RAM (DRAM), or a combination thereof. The non-transitory memory is a mask read-only memory (MROM), an electrically erasable programmable ROM (EEPROM), a flash memory, or a hard disk drive. Alternatively, the non-transitory memory is an optional combination thereof. For example, the memory 1106 may include an external memory device that is accessible from the baseband processor 1103, the application processor 1104, and the SoC 1105. The memory 1106 may include a built-in memory device integrated in the baseband processor 1103, in the application processor 1104, or in the SoC 1105. The memory 1106 may include a memory in a universal integrated circuit card (UICC).

The memory 1106 may store a software module (computer program) including a command group and data for performing processing by the UE 10 described above in a plurality of aspects. In some implementations, the baseband processor 1103 or the application processor 1104 may be configured to perform processing of the UE 10 in an aspect to be described later by reading the software module from the memory 1106 and executing the software module.

Figure 2:
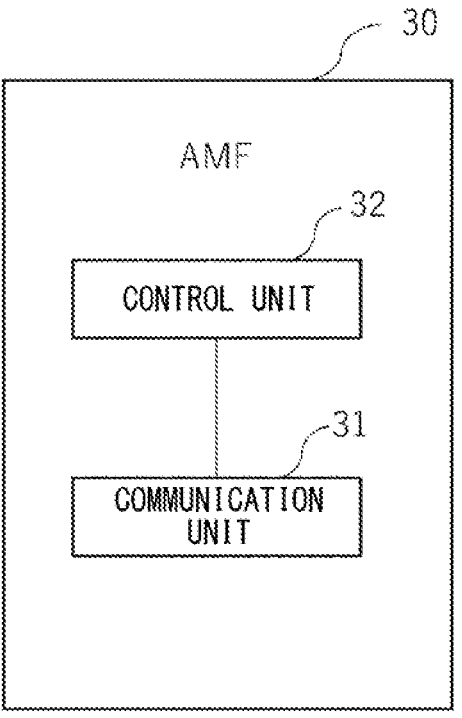
FIG. 2 is a configuration schematic diagram of an AMF according to each aspect.

FIG. 2 illustrates an exemplary device configuration of an access and mobility management function (AMF) 30. The AMF 30 includes a communication unit 31 and a control unit 32. The communication unit 31 and the control unit 32 may be each software or a module the processing of which is executed as a processor executes a computer program stored in a memory. Alternatively, the communication unit 31 and the control unit 32 may be each a hardware component such as a circuit or a chip.

The communication unit 31 is a functional component for the AMF 30 to connect to an access network or a core network device included in a core network. In other words, the AMF 30 can transmit and receive user data and/or control information to and from the access network and/or the core network device included in the core network through the communication unit 31.

The control unit 32 is a functional component for controlling the AMF 30 and achieves various kinds of processing of the entire AMF 30 by reading and executing various kinds of information and computer programs stored in a memory.

An exemplary configuration of the AMF 30 in a plurality of aspects to be described later will be described below in detail with reference to FIG. 4.

Figure 4:
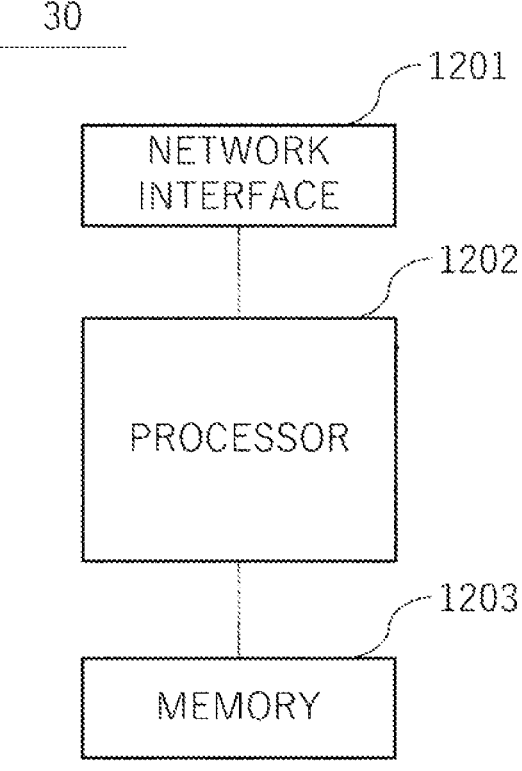
FIG. 4 is a configuration diagram of the AMF according to each aspect.

FIG. 4 is a block diagram illustrating an exemplary configuration of the AMF 30. As illustrated in FIG. 4, the AMF 30 includes a network interface 1201, a processor 1202, and a memory 1203. The network interface 1201 is used to communicate with another network node device included in the communication system. The network interface 1201 may include, for example, a network interface card (NIC) compliant with IEEE 802.3 series.

The processor 1202 performs processing of the AMF 30 described with reference to a sequence diagram in the above-described aspect by reading and executing software (computer program) from the memory 1203. The processor 1202 may be, for example, a microprocessor, a micro processing unit (MPU), or a central processing unit (CPU). The processor 1202 may include a plurality of processors.

The memory 1203 is configured as a combination of a transitory memory and a non-transitory memory. The memory 1203 may include a storage disposed separately from the processor 1202. In this case, the processor 1202 may access the memory 1203 through a non-illustrated I/O interface.

In the example illustrated in FIG. 4, the memory 1203 is used to store a software module group. The processor 1202 can perform processing of the AMF 30 in an aspect to be described later by reading the software module group from the memory 1203 and executing the software module group.

As described with reference to FIG. 4, each processor included in the AMF 30 executes one or a plurality of computer programs including a command group for causing a computer to perform an algorithm described with reference to the accompanying drawings.

In the above-described example, a computer program can be stored by using various types of non-transitory computer-readable media and supplied to a computer. The non-transitory computer-readable media include various types of tangible storage medium. Examples of the non-transitory computer-readable media include a magnetic storage medium (for example, a flexible disk, a magnetic tape, or a hard disk drive), and a magneto-optical storage medium (for example, a magneto-optical disk). Examples of the non-transitory computer-readable media further include a CD-ROM (read-only memory), a CD-R, and a CD-R/W. In addition, examples of the non-transitory computer-readable media include a semiconductor memory. The semiconductor memory includes, for example, a mask ROM, a programmable ROM (PROM), an erasable PROM (EPROM), a flash ROM, and a random-access memory (RAM). A computer program may be supplied to a computer through various types of transitory computer-readable media. Examples of the transitory computer-readable media include an electric signal, an optical signal, and an electromagnetic wave. The transitory computer-readable media can supply a computer program to a computer through a wired communication path such as an electrical line or an optical fiber or through a wireless communication path.

Key terms and information will be described below before the following description of procedure examples according to aspects. Note that information in each aspect may be information included in a message transmitted and received between the UE and the AMF, information held in the UE, or information held in the core network.

The core network means at least some of the AMF 30, a session management function (SMF) 40, a user plane function (UPF) 50, unified data management (UDM) 60, and authentication, authorization, and accounting (AAA) 70 and may be referred to as a core network or a core network device. Thus, message transmission-reception and/or procedure execution by the core network means message transmission-reception and/or procedure execution by a device in the core network.

The access network is a wireless network through which the UE and the core network are connected. The access network may be a 3GPP network or a non-3GPP network. The 3GPP network may be an NG-(R)AN 20, means at least one of a gNB 21 and an ng-eNB 22, and may be referred to as an NG-(R)AN or an NG-(R)AN device. Thus, message transmission-reception and/or procedure execution by the NG-(R)AN means message transmission-reception and/or procedure execution by a device in the NG-(R)AN. Note that the gNB may be a gNB having a new radio (NR) function and included in the NG-(R)AN. The ng-eNB 22 may be an eNB having an evolved universal terrestrial radio access (E-UTRA) function and included in the NG-(R)AN.

An N1 mode is a UE mode in which the core network can be accessed through the access network. The N1 mode may be a UE mode in which message transmission-reception is possible through an N1 interface.

An S1 mode is a UE mode in which message transmission-reception is possible through an S1 interface. Note that the S1 interface may be configured by an S1-MME interface and an S1-U interface.

The core network manages the position of the UE in the unit of a set of adjacent cells, which are each called a tracking area (TA). The tracking area is identified by a tracking area identifier (TAI).

A tracking area list (also referred to as a TA list) is a list including one or more TAs. A set of one or more TAs is also expressed as a registration area (RA).

Subsequently, various kinds of information used in procedures in a plurality of aspects to be described later will be described below in detail.

First network slice information may be requested NSSAI and may be NSSAI transferred by the UE in a registration procedure. The UE may include the first network slice information in an initial registration, mobility registration update, or periodic registration update message.

First support information may be information indicating whether the UE supports the procedure of network slice-specific authentication and authorization (NSSAA) or may be capability information. The UE may include the first support information in an initial registration, mobility registration update, or periodic registration update message.

The procedure of network slice-specific authentication and authorization may be the procedure of authentication and authorization requested for each network slice.

Second network slice information may be allowed NSSAI or may be NSSAI available at a place (current registration area) where the UE is located. The NSSAI available at a place (current registration area) where the UE is located may be notified by the core network. The core network may include the second network slice information in a registration accept message, in a configuration update command (UE setting information update command control signal or control message), or in a downlink (DL) NAS transport message.

Third network slice information may be rejected NSSAI or may be one or more pieces of S-NSSAI rejected by the core network. The core network may include the third network slice information in a registration accept message, in a registration reject message, in a de-registration request message, in a configuration update command (UE setting information update command control signal or control message), or in a DL NAS transport message. The rejected NSSAI may be a list in which one or more pieces of S-NSSAI rejected by the core network are each associated with a reason value of rejection of the S NSSAI. The third network slice information may be NSSAI including S-NSSAI having a predetermined cause value (reason value or rejection reason value). The predetermined cause value may be at least one of first to fourth reason values to be described later.

A first reason value may be a cause value (reason value or rejection reason value) associated with each S-NSSAI included in the third network slice information. Note that the first reason value may be a reason value indicating pending. Alternatively, the first reason value may be a reason value indicating that the procedure of network slice-specific authentication and authorization is being executed, an execution target, or scheduled to be executed. In each aspect, the first reason value is also expressed as a "reason value indicating pending" for sake of description. In some instances in which a plurality of pieces of S-NSSAI are set to the third network slice information, the first reason value may be associated with each S-NSSAI or with the third network slice information (rejected NSSAI) as an assembly of the pieces of S-NSSAI. For S-NSSAI associated with the reason value, the UE may prevent transmission of a registration request (initial registration request, mobility registration update, or periodic registration update) using the S-NSSAI until the procedure of network slice-specific authentication and authorization is successfully executed, terminal power on/off, or insertion and removal of a universal subscriber identity module (USIM). Note that the case in which the procedure of network slice-specific authentication and authorization is successfully executed may be a case in which the UE has received extensible authentication protocol (EAP) success from the core network. The core network may include the first reason value in a registration accept message, in a registration reject message, in a de-registration request message, in a configuration update command (UE setting information update command control signal or control message), or in a DL NAS transport message.

A second reason value may be a cause value (reason value or rejection reason value) associated with each S-NSSAI included in the third network slice information. Note that the second reason value may be a reason value indicating success or failure. Alternatively, the second reason value may be a reason value indicating that the procedure of network slice-specific authentication and authorization has been successful as a result of execution, and is also expressed as a "reason value indicating success" for sake of description in each aspect. Alternatively, the second reason value may be a reason value indicating that the procedure of network slice-specific authentication and authorization has failed as a result of execution, and is also expressed as a "reason value indicating failure" for sake of description in each aspect. In some instances in which a plurality of pieces of S-NSSAI are set to the third network slice information, the second reason value may be associated with each S-NS-SAI or with the third network slice information (rejected NSSAI) as an assembly of the pieces of S-NSSAI. The UE 10 may hold the association of the reason value and the third network slice information until terminal power on/off or insertion and removal of a universal subscriber identity module (USIM). When the second reason value is the reason value indicating failure, the UE 10 may prevent transmission of a registration request (initial registration request, mobility registration update, or periodic registration update) using the S-NSSAI until terminal power on/off or insertion and removal of a universal subscriber identity module (USIM). The core network may include the second reason value in a registration accept message, in a registration reject message, in a de-registration request message, in a configuration update command (UE setting information update command control signal or control message), or in a DL NAS transport message.

A third reason value may be a cause value (reason value or rejection reason value) associated with each S-NSSAI included in the third network slice information. Note that the third reason value may be a reason value indicating "S-NS-SAI not available in the current PLMN" written in Section 9.11.3.46 of Non Patent Literature 3. The reason value indicating "S-NSSAI not available in the current PLMN" may be a reason value indicating that the S-NSSAI is not available in a public land mobile network (PLMN) accessed by the UE. In other words, when having moved to another PLMN, the UE 10 may be able to perform reconnection (registration request) by using the S-NSSAI. In some instances in which a plurality of pieces of S-NSSAI are set to the third network slice information, the third reason value may be associated with each S-NSSAI or with rejected NSSAI as an assembly of the pieces of S-NSSAI. Note that the UE 10 may hold the association of the reason value and the third network slice information until terminal power on/off or insertion and removal of a universal subscriber identity module (USIM). The core network may include the third reason value in a registration accept message, in a registration reject message, in a de-registration request message, in a configuration update command (UE setting information update command control signal or control message), or in a DL NAS transport message.

A fourth reason value may be a cause value (reason value or rejection reason value) associated with each S-NSSAI included in the third network slice information. Note that the fourth reason value may be a reason value indicating "S-NS-SAI not available in the current registration area" written in Section 9.11.3.46 of Non Patent Literature 3. The reason value indicating "S-NSSAI not available in the current registration area" may be a reason value indicating that the S-NSSAI is not available in a registration area where the UE is located. In other words, when having moved to another RA, the UE 10 may be able to perform reconnection (registration request) by using the S-NSSAI. In some instances in which a plurality of pieces of S-NSSAI are set to the third network slice information, the fourth reason value may be associated with each S-NSSAI or with the third network slice information (rejected NSSAI) as an assembly of the pieces of S-NSSAI. Note that the UE 10 may hold the association of the reason value and the third network slice information until terminal power on/off or insertion and removal of a universal subscriber identity module (USIM). The core network may include the fourth reason value in a registration accept message, in a registration reject message, in a de-registration request message, in a configuration update command (UE setting information update command control signal or control message), or in a DL NAS transport message.

First timer information may be a timer value set to a timer 1. The timer 1 may be a timer with which the UE manages (transmits or prevents transmission of) a registration request message (the registration request message is an initial registration request, mobility registration update, or periodic registration update) using S-NSSAI included in the third network slice information associated with the first reason value or S-NSSAI included in sixth network slice information. In other words, the timer 1 may be a timer configured to manage (transmit or prevent transmission of) reconnection (registration request transmission/retransmission) using pending S-NSSAI. In some instances, the timer 1 may be a timer for waiting reception of an EAP identity request (control signal or control message with which the core network requests an EAP identifier to the UE), may be a timer for waiting reception of EAP success or EAP failure (control signal or control message that means EAP authentication completion), or may be a timer for waiting reception of a configuration update command (UE setting information update command control signal or control message) that triggers acquisition of new slice information. Alternatively, the timer 1 may be a timer for determining whether the network is abnormal during the procedure of network slice-specific authentication and authorization. The core network may include the first timer information in a registration accept message or in a registration reject message.

Fourth network slice information may be configured NSSAI. The core network may include the fourth network slice information in a registration accept message, in a configuration update command (UE setting information update command control signal or control message), or in a DL NAS transport message.

The second network slice information may be information indicating that no S-NSSAI is available at a place (current registration area) where the UE is located, or may be empty allowed NSSAI. The second network slice information in this case is also referred to as fifth network slice information in the following description. The core network may include the fifth network slice information in a registration accept message or in a registration reject message.

First instruction information (indication) may be information indicating whether the network performs the procedure of network slice-specific authentication and authorization or may be information indicating the fifth network slice information. Specifically, the first instruction information may be information indicating that the procedure of network slice-specific authentication and authorization is not performed, or may be information indicating that the procedure of network slice-specific authentication and authorization is performed. The core network may include the first instruction information in a registration accept message or in a registration reject message. Note that the first instruction information may be included in a registration accept message when no S-NSSAI is available at the place where the UE is located, or may be included in a registration reject message, but is not limited thereto. Note that the place where the UE is located may be a place indicated as, for example, a tracking area, a cell, a base station, and/or an area managed by position information.

The sixth network slice information may be information indicating S-NSSAI as a target of network slice-specific authentication and authorization, and may be information indicating S-NSSAI for which the procedure of network slice-specific authentication and authorization is pending. In other words, the sixth network slice information may be the third network slice information (or S-NSSAI) associated with the first reason value. The sixth network slice information may include S-NSSAI that is neither S-NSSAI that a network indicated by the second network slice information permits to be used nor S-NSSAI that a network indicated by the third network slice information rejects to be used. In other words, the sixth network slice information may be information that is independent from the second network slice information and the third network slice information. Alternatively, the sixth network slice information may be information indicating network slice information as a target of the first instruction information indicating that the procedure of network slice-specific authentication and authorization is performed. The core network may include the sixth network slice information in a registration accept message or in a registration reject message. The first instruction information and the sixth network slice information may be collectively expressed as first information indicating that the procedure of network slice-specific authentication and authorization is pending.

Second instruction information may be instruction information that the core network transmits to prompt or request the UE to execute a registration procedure. Note that the core network may include the second instruction information in a configuration update command (UE setting information update command control signal or control message), in a de-registration request message, or in a registration reject message.

An example of initial procedure (hereinafter also referred to as the present procedure) in the present disclosure will be described below with reference to FIG. 5. The example of the present procedure includes a registration procedure.

The example of the present procedure included in FIG. 5 will be described in detail as follows.

Step (1): the UE 10 transmits the first network slice information (requested NSSAI) and the first support information to the access network (for example, the NG-(R)AN 20) on the N1 interface (S0501). Specifically, the UE 10 transmits a radio resource control (RRC) message including a registration request message to the access network. The registration request message may be an initial registration request, a mobility registration update, or a periodic registration update.

Step (2): the access network selects, based on the registration request message included in the RRC message, the AMF 30 at the transmission destination of the registration request message (S0502). Thus, the access network may select the AMF 30 based on information included in the RRC message.

Step (3): the access network transmits or transparently forwards the registration request message to the selected AMF 30 (S0503). In this case, the registration request may include the first network slice information (requested NSSAI) and the first support information. Note that a message related to the registration procedure and transmitted and received on the N1 interface between the UE 10 and the AMF 30 is a message processed at a non-access-stratum (NAS) layer. The NAS layer is a higher-level layer of an RRC layer between the UE 10 and the NG-(R)AN 20.

Step (4): the AMF 30 receives the registration request message and executes a registration procedure written in Section 4.2.2 of Non Patent Literature 2 (S0504).

As written in Section 5.15 of Non Patent Literature 1, the AMF 30 sets one or more pieces of S-NSSAI as the second network slice information (allowed NSSAI) based on, for example, subscriber information and/or an access type (S0504).

In some instances when the first support information is included in the registration request message received at Step (1), the AMF 30 sets S-NSSAI as a target of network slice-specific authentication and authorization to the third network slice information (rejected NSSAI) or the sixth network slice information. Note that the S-NSSAI set to the third network slice information or the sixth network slice information does not necessarily need to be S-NSSAI as a target of network slice-specific authentication and authorization in a home PLMN (HPLMN). The S-NSSAI set to the third network slice information or the sixth network slice information may be S-NSSAI provided by a serving PLMN and to which S-NSSAI as a target of network slice-specific authentication and authorization in a HPLMN is mapped. The AMF 30 determines or specifies S-NSSAI as a target of network slice-specific authentication and authorization based on the subscriber information. Specifically, during the registration procedure written in Section 4.2.2 of Non Patent Literature 1 described above, S-NSSAI as a target of network slice-specific authentication and authorization is determined or specified based on the subscriber information (S0504) that the AMF 30 receives from the UDM 60.

Step (5): for example, when the AMF 30 is updated, the AMF 30 updates, for the SMF 40, information of a protocol data unit (PDU) session (S0505).

In some instances when the first network slice information (requested NSSAI) is not included in the RRC message including the registration request message received at Step (1) or when S-NSSAI as a target of network slice-specific authentication and authorization is not included in the first network slice information (requested NSSAI), the AMF 30 may specify S-NSSAI as a target of network slice-specific authentication and authorization based on the subscriber information. Specifically, in this case, the AMF 30 determines whether one or more pieces of default S-NSSAI set to the subscriber information (S0504) acquired from the UDM 60 are targets of network slice-specific authentication and authorization. When the pieces of default S-NSSAI are targets of network slice-specific authentication and authorization, the AMF 30 determines the pieces of S-NSSAI as a target of network slice-specific authentication and authorization.

In some instances when all pieces of S-NSSAI included in the first network slice information (requested NSSAI) received at Step (1) are targets of network slice-specific authentication and authorization, the AMF 30 may set the fifth network slice information as empty allowed NSSAI. In other words, nothing may be set to allowed NSSAI as the fifth network slice information. Alternatively, in some instances when all pieces of S-NSSAI included in the first network slice information (requested NSSAI) received at Step (1) are targets of network slice-specific authentication and authorization, the AMF 30 may set the first instruction information to a registration accept message or a registration reject message. In this case, the AMF 30 may set, to a registration accept message or a registration reject message, the third network slice information as NSSAI including all pieces of S-NSSAI indicated by or included in the first network slice information (requested NSSAI).

In some instances when the first network slice information (requested NSSAI) is not included in the RRC message including the registration request message received at Step (1) and all pieces of default S-NSSAI set to the subscriber information are targets of network slice-specific authentication and authorization, the AMF 30 may set the fifth network slice information as empty allowed NSSAI. In other words, nothing may be set to allowed NSSAI as the fifth network slice information.

In some instances when all pieces of S-NSSAI included in the first network slice information (requested NSSAI) received at Step (1) do not match a set (subscribed NSSAI) of pieces of S-NSSAI recorded in the subscriber information and all pieces of default S-NSSAI set to the subscriber information are targets of network slice-specific authentication and authorization, the AMF 30 may set empty allowed NSSAI as the fifth network slice information. In other words, nothing may be set to allowed NSSAI as the fifth network slice information.

Step (6): the AMF 30 sets, to the third network slice information (rejected NSSAI) or the sixth network slice information, one or more pieces of S-NSSAI as a target of network slice-specific authentication and authorization or as a trigger of start of the procedure of network slice-specific authentication and authorization at S0601. Then, a registration accept message including at least one or a combination of the third network slice information, the sixth network slice information, the second network slice information, the fifth network slice information, and/or the first instruction information is transmitted to the UE 10 on the N1 interface (S0506).

Note that one or more pieces of S-NSSAI included in the third network slice information (rejected NSSAI) or the sixth network slice information do not necessarily need to be S-NSSAI as a target of network slice-specific authentication and authorization in a HPLMN. One or more pieces of S-NSSAI included in the third network slice information (rejected NSSAI) or the sixth network slice information may be S-NSSAI provided by a serving PLMN to which S-NS-SAI as a target of network slice-specific authentication and authorization in a HPLMN is mapped.

Note that when all pieces of S-NSSAI included in the first network slice information received at Step (1) are targets of network slice-specific authentication and authorization, the first instruction information may be information indicating that the procedure of network slice-specific authentication and authorization is performed. When all pieces of S-NSSAI included in the first network slice information received at Step (1) are not a target of network slice-specific authentication and authorization, the first instruction information may be information indicating that the procedure of network slice-specific authentication and authorization is not performed. When the EAP-utilized procedure of network slice-specific authentication and authorization written in Section 4.2.9.2 of Non Patent Literature 2 is already executed for all pieces of S-NSSAI included in the first network slice information received at Step (1) or the UE is notified of an execution result (EAP success or EAP failure) of the procedure of network slice-specific authentication and authorization (S0604), the first instruction information may be information indicating that the procedure of network slice-specific authentication and authorization is not performed.

Step (7): the UE 10 recognizes and holds contents of various kinds of information acquired from the registration accept message (S0507). For example, the UE 10 may recognize and hold the second network slice information or the fifth network slice information as allowed NSSAI. The UE 10 may recognize and hold the third network slice information as rejected NSSAI. When the third network slice information and the first instruction information are included in the registration accept message, the UE 10 may recognize and hold S-NSSAI indicated by the third network slice information as S-NSSAI that is a target of network slice-specific authentication and authorization or as a trigger of start of the procedure of network slice-specific authentication and authorization (S0601). When the sixth network slice information is included in the registration accept message, the UE 10 may recognize and hold S-NSSAI indicated by the sixth network slice information as S-NSSAI that is a target of network slice-specific authentication and authorization or as a trigger of start of the procedure of network slice-specific authentication and authorization (S0601).

When having acquired the sixth network slice information from the registration accept message, the UE 10 may save or store S-NSSAI indicated by the sixth network slice information together with the sixth network slice information.

For example, when the sixth network slice information is acquired and S-NSSAI included in the sixth network slice information is included in the second network slice information and/or the third network slice information that are already held, the UE 10 may update the held network slice information based on the property (kind) of the included network slice information.

When S-NSSAI included in the sixth network slice information is included in the second network slice information that is already held, the UE 10 may delete or remove the S-NSSAI from the second network slice information. When S-NSSAI included in the sixth network slice information is included in the third network slice information that is already held, the UE 10 may delete or remove the S-NSSAI from the third network slice information. In this case, the S-NSSAI included in the third network slice information to be deleted may be deleted or removed irrespective of the associated first to fourth reason values. Specifically, when S-NSSAI included in the sixth network slice information is included in the third network slice information that is already held, the S-NSSAI associated with the third reason value may be deleted or removed from the third network slice information, and the S-NSSAI associated with the fourth reason value may be deleted or removed from the third network slice information.

Then, upon reception of the registration accept message, the UE 10 transmits a registration completion message on the N1 interface (S0508).

Figure 5:
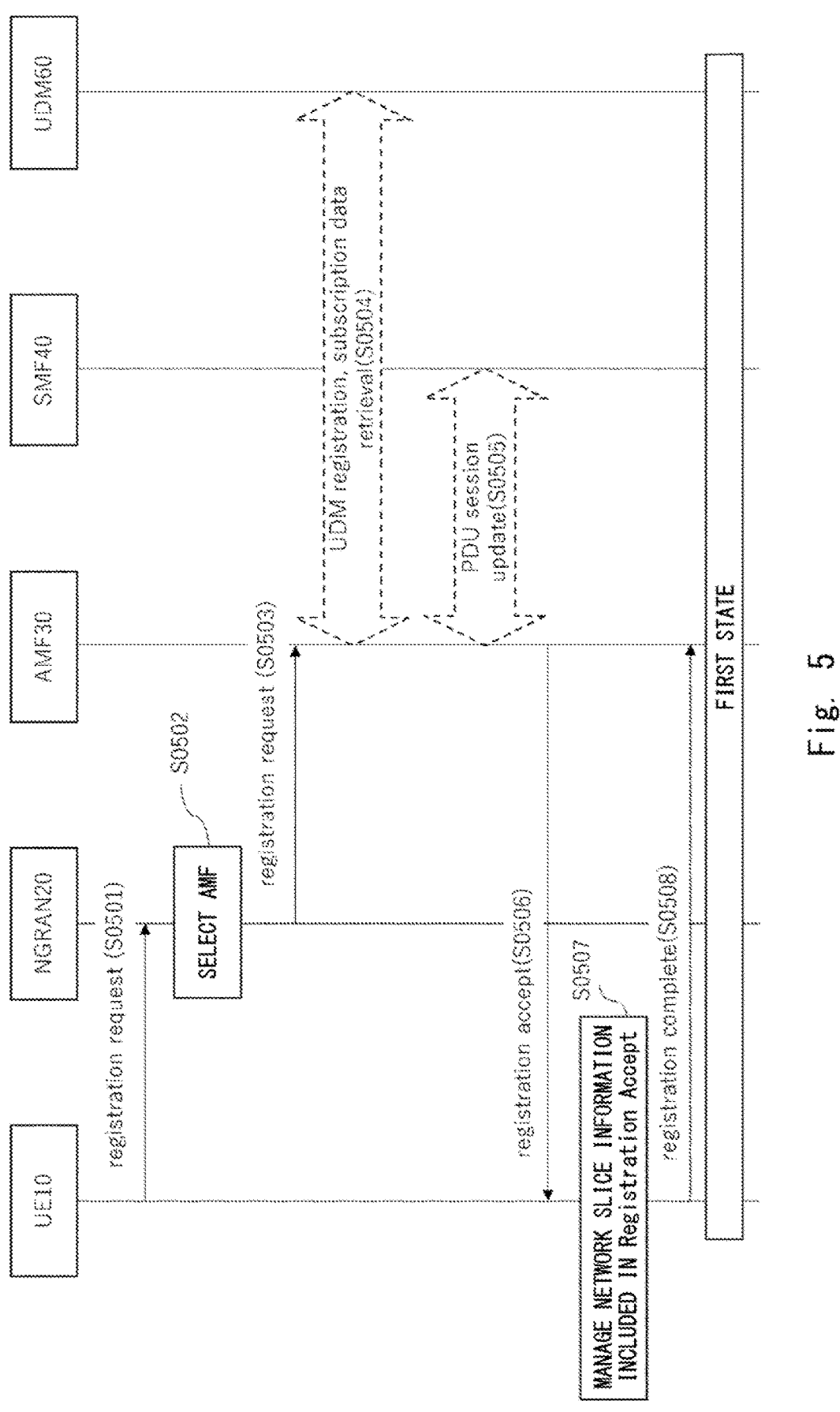
FIG. 5 is a diagram illustrating an initial procedure as the premise of each aspect.
Figure 6:
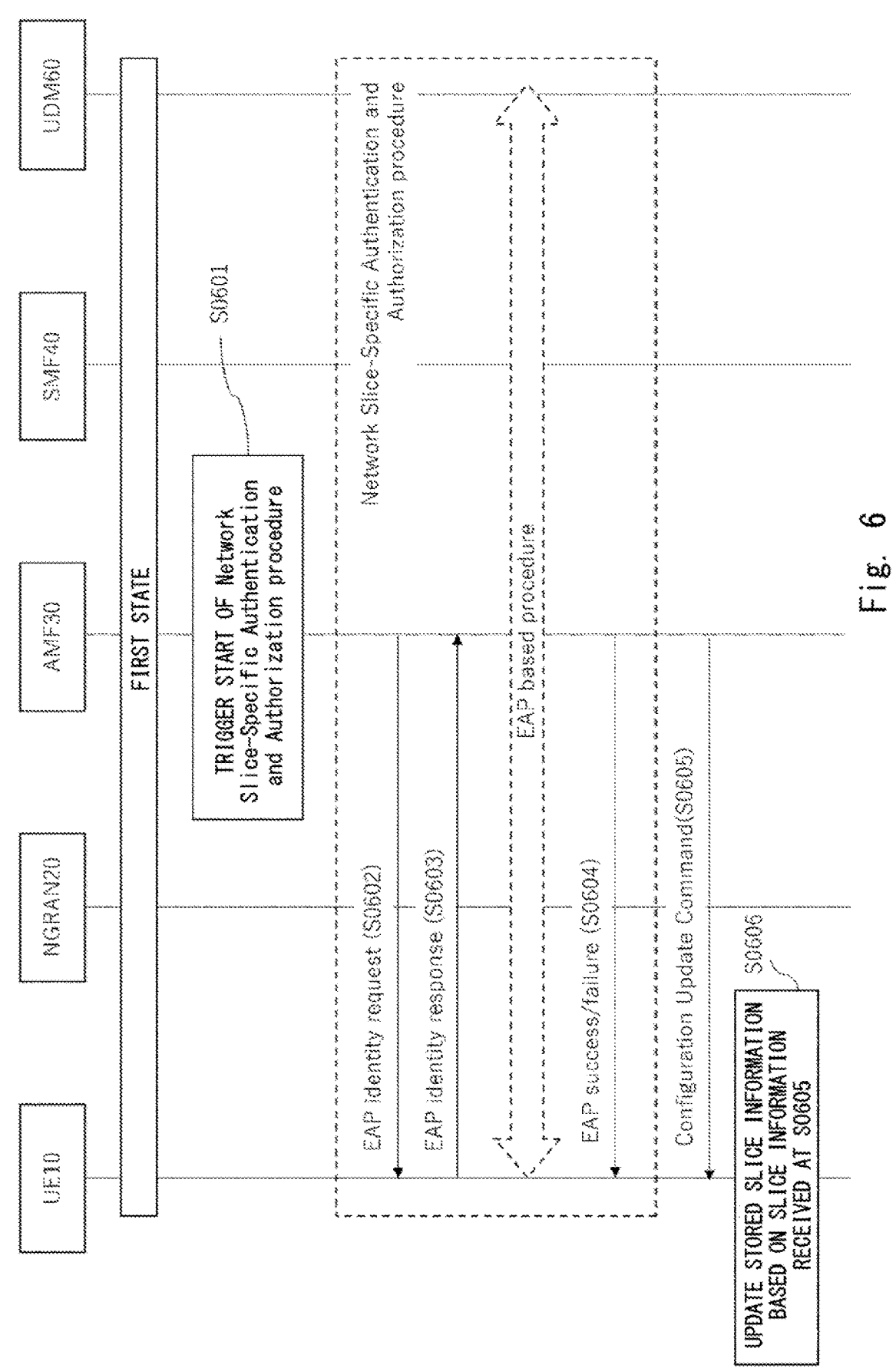
FIG. 6 is a diagram illustrating a network slice-specific authentication and authorization procedure according to each aspect.

Accordingly, the initial procedure ends, and the procedure of network slice-specific authentication and authorization illustrated in FIG. 6 is performed (first state). The first state is a state in which the initial procedure illustrated in FIG. 5 has ended, and is a state in which the procedure of network slice-specific authentication and authorization is waited.

An example of the procedure of network slice-specific authentication and authorization (hereinafter also referred to as the present procedure) according to each aspect will be described below with reference to FIG. 6. The example of the present procedure includes the procedure of network slice-specific authentication and authorization.

Step (1): as written in Section 4.2.2.2 and Section 4.2.9.2 of Non Patent Literature 2, the AMF 30 may trigger start of the procedure of network slice-specific authentication and authorization after the registration procedure completion (after registration accept transmission, after registration complete message reception, or after 5GS mobility management (5GMM) context establishment) (S0601).

In this case, the AMF 30 may hold S-NSSAI determined as a target of network slice-specific authentication and authorization, which is described above at Step (4) of the registration procedure, and the processing state of the procedure of network slice-specific authentication and authorization in association with each other. In other words, the AMF 30 may hold, as UE context information, state information indicating S-NSSAI for which the procedure of network slice-specific authentication and authorization is being executed, an execution target, or scheduled to be executed. The state information may be information indicating that the procedure of network slice-specific authentication and authorization is pending or is success or failure for the S-NSSAI.

The AMF 30 may determine, based on the state information, a trigger of start of the procedure of network slice-specific authentication and authorization, or S-NSSAI for which the procedure of network slice-specific authentication and authorization is to be executed. For example, when the state information indicating that the procedure of network slice-specific authentication and authorization for particular S-NSSAI is success is included in the UE context information, the AMF 30 does not need to execute or may skip the procedure of network slice-specific authentication and authorization for the S-NSSAI.

Steps (2, 3): the AMF 30 executes the EAP-utilized procedure of network slice-specific authentication and authorization written in Section 4.2.9.2 of Non Patent Literature 2 (S0602 and S0603).

Step (4): after notifying (S0604) the UE of an execution result (EAP success or EAP failure) of the procedure of network slice-specific authentication and authorization, the AMF 30 may transmit a configuration update command toward the UE as written in Section 4.2.9.2 of Non Patent Literature 2 (S0605). Specifically, when the second network slice information or the fifth network slice information (allowed NSSAI) that are new is set to the UE, when the third network slice information (rejected NSSAI) that is new is set to the UE, when the fourth network slice information that is new is set to the UE, or when a serving AMF is changed to another different AMF, the AMF 30 may transmit a configuration update command toward the UE for each access type. Note that the access type indicates the type of the access network and may mean a 3GPP network or a non 3GPP network.

Step (5): the UE 10 recognizes, holds, and manages the contents of various kinds of information acquired from the configuration update command transmitted from the AMF 30 (S0606). Network slice information management by the UE 10 will be described below.

For example, when at least one of the second network slice information, the third network slice information, and the fourth network slice information is acquired and S-NSSAI included in the acquired network slice information is included in the sixth network slice information that is already held, the UE 10 may update the held sixth network slice information based on the property (kind) of the S-NSSAI.

For example, when the fourth network slice information is acquired, the UE 10 may store or save the fourth network slice information that is new in place of the fourth network slice information that is already held. In other words, the fourth network slice information may be stored in the UE 10 until the fourth network slice information that is new is provided by a given PLMN. Alternatively or in addition, the UE 10 may delete or remove all second network slice information that is already held. Alternatively or in addition, the UE 10 may delete all third network slice information that is already held. Alternatively or in addition, the UE 10 may delete or remove all sixth network slice information that is already held.

When the second network slice information is acquired, the UE 10 may store or save the second network slice information that is new in place of the second network slice information that is already held. In other words, the second network slice information may be stored in the UE 10 until the second network slice information that is new is provided by a given PLMN. Alternatively or in addition, when S-NSSAI included in the acquired second network slice information is included in the third network slice information that is already held, the UE 10 may delete or remove the S-NSSAI from the third network slice information. Alternatively or in addition, when S-NSSAI included in the acquired second network slice information is included in the sixth network slice information that is already held, the UE 10 may delete or remove the S-NSSAI from the sixth network slice information.

When the third network slice information is acquired, the UE 10 may hold the third network slice information in association with at least one of the first to fourth reason values. In addition, when S-NSSAI included in the third network slice information held in association with the third reason value or the fourth reason value is included in the second network slice information that is already held, the UE 10 may delete or remove the S-NSSAI from the second network slice information. The S-NSSAI included in the third network slice information held in association with the third reason value or the fourth reason value may mean, irrespective of an associated access type, S-NSSAI included in the third network slice information held in association with the third reason value or the fourth reason value in all access types. In addition, when the S-NSSAI included in the third network slice information held in association with the third reason value or the fourth reason value is included in the sixth network slice information that is already held, the UE 10 may delete or remove the S-NSSAI from the sixth network slice information. The S-NSSAI included in the third network slice information held in association with the third reason value or the fourth reason value may mean, irrespective of an associated access type, the S-NSSAI included in the third network slice information held in association with the third reason value or the fourth reason value in all access types.

When the sixth network slice information is acquired, the UE 10 may store or save S-NSSAI indicated by the sixth network slice information in addition to the sixth network slice information. In addition, when S-NSSAI included in the sixth network slice information is included in the second network slice information that is already held, the UE 10 may delete or remove the S-NSSAI from the second network slice information. In addition, when S-NSSAI included in the sixth network slice information is included in the third network slice information that is already held, the UE 10 may delete or remove the S-NSSAI from the third network slice information. In this case, the S-NSSAI included in the third network slice information to be deleted may be deleted or removed irrespective of the associated first to fourth reason values. Specifically, when S-NSSAI included in the sixth network slice information is included in the third network slice information that is already held, the S-NSSAI associated with the third reason value may be deleted or removed from the third network slice information, and the S-NSSAI associated with the fourth reason value may be deleted or removed from the third network slice information. Note that the above-described configuration update command at Step (5) is a step performed after completion of Step (4) but is not limited thereto. Specifically, irrespective of Steps (1) to (4), the core network may perform Step (5) when having determined that network slice information needs to be updated.

For example, in some instances when the core network has determined that the sixth network slice information needs to be updated, the AMF 30 may transmit a configuration update command including one or more of the second to sixth network slice information toward the UE 10. Having received one or more of the second to sixth network slice information, the UE 10 may perform the above-described network slice information management by the UE 10. Note that the necessity of network slice information update may be determined by the core network by reference to an operator network operation policy.

In addition, when the configuration update command transmitted from the AMF 30 includes the second instruction information (registration requested) that requests the registration procedure to be performed by the UE, the UE 10 transmits a registration request message to the core network based on the acquired second instruction information. Having received the registration request message from the UE 10, the core network transmits a registration accept message to the UE. In this case, when the core network has determined that network slice information needs to be updated, one or more of the second to sixth network slice information may be included in the registration accept message. Having received one or more of the second to sixth network slice information, the UE 10 may perform the above-described network slice information management by the UE 10. Note that the necessity of network slice information update may be determined by the core network by reference to an operator network operation policy.

No network slice information management related to the sixth network slice information and the first reason value by the UE 10 has been defined. When the network slice information management by the UE 10 as described above is defined and introduced, the UE can support processing of the procedure of network slice-specific authentication and authorization.

Network slice information management in the example of the initial procedure and the example of the procedure of network slice-specific authentication and authorization is described so far. In the following, various problem scenarios that a service using a network slice-specific authentication and authorization function cannot be provided are considered and an exemplary solution of each problem scenario will be described in an individual aspect below.
(First Aspect)

Figure 7:
FIG. 7 is a diagram illustrating the procedure of reconnection using S-NSSAI according to a first aspect.
Figure 7:
Figure 7:
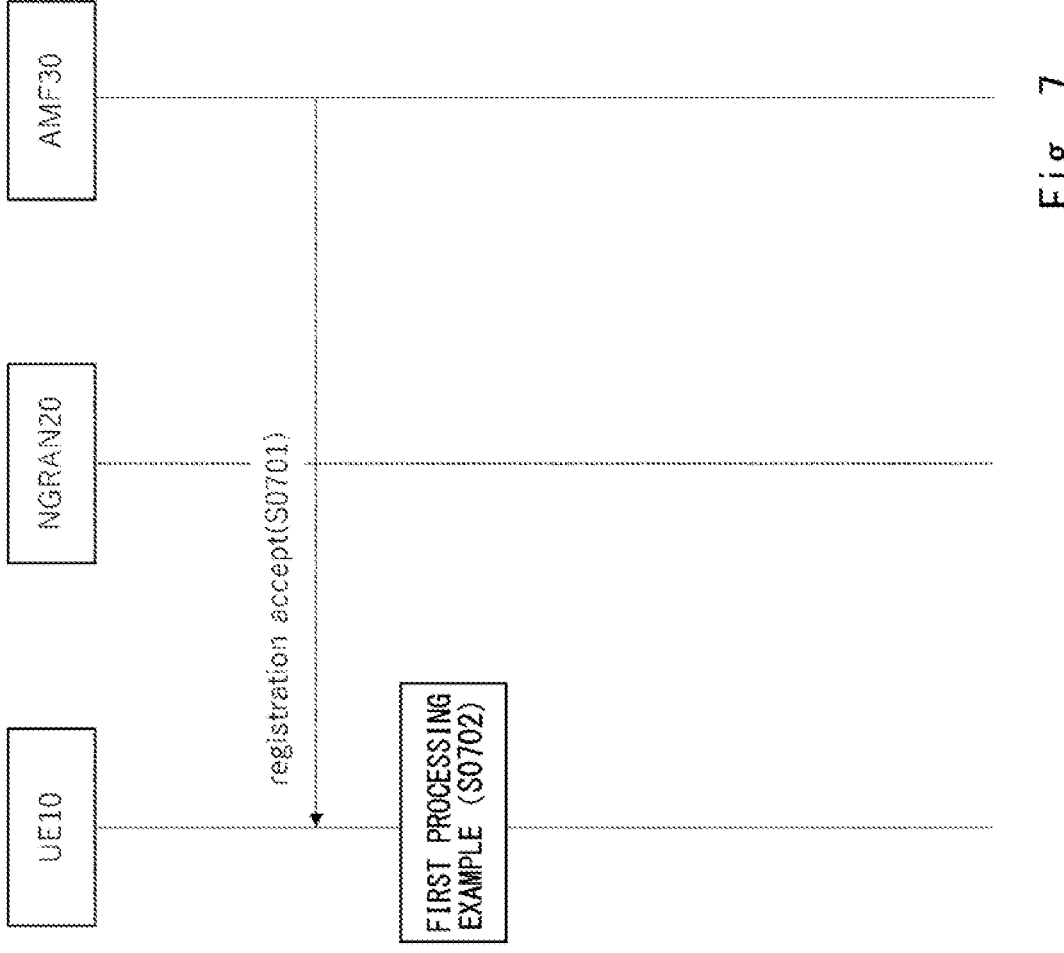

FIG. 7 is a diagram for description of a first aspect.

The present aspect relates to a scenario that, after execution of steps S0501 to S0505 in FIG. 5, the UE 10 receives the third network slice information including S-NSSAI associated with the first reason value and waits the procedure of network slice-specific authentication and authorization in place of the processing at step S0506. The UE 10 supports the procedure of network slice-specific authentication and authorization. The wait of the procedure of network slice-specific authentication and authorization is a state in which the UE 10 holds one or more pieces of S-NSSAI associated with the reason value indicating pending as the first reason value after registration accept reception, after registration completion message transmission, or after 5GMM context establishment. Specifically, the wait of the procedure of network slice-specific authentication and authorization may mean a case in which no EAP identity request is received, neither EAP success nor EAP failure is received, no message (configuration update command or de-registration request) that triggers acquisition of new slice information is received, or no message (DL NAS transport) for setting new slice information is received.

In a solution described below, the UE 10 manages, based on a timer 1 and/or a first timer value acquired from the core network or based on a timer 1 and/or a first timer value set to the UE 10 in advance, transmission of a registration request (initial registration request, mobility registration update, or periodic registration update) using S-NSSAI that has been associated with the first reason value (reason value indicating pending). Note that the management of transmission may mean management of the behavior of transmission and the behavior of transmission prevention, and the behavior of transmission is also expressed as re-attempt (reconnection).

A step illustrated in FIG. 7 will be described in detail as follows.

Step (1): after having executed the processing at steps S0501 to S0505 in FIG. 5, the UE 10 receives the first timer information from the AMF 30 in addition to the third network slice information and the first reason value (S0701) or the UE 10 receives the first timer information from the AMF 30 in addition to the sixth network slice information (S0701). When the timer 1 and/or the first timer value is set to the UE 10 in advance, the first timer information does not necessarily need to be received.

In this case, the UE 10 may hold one or more pieces of S-NSSAI indicated by the third network slice information in association with the first reason value (reason value indicating pending) or may hold one or more pieces of S-NSSAI indicated by the sixth network slice information. In addition, after having transmitted a registration accept message to the UE 10 or having received a registration complete message from the UE 10, the AMF 30 may hold one or more pieces of S-NSSAI indicated by the third network slice information in association with the first reason value (reason value indicating pending) or may hold one or more pieces of S-NSSAI indicated by the sixth network slice information as UE context information. The AMF 30 may hold one or more pieces of S-NSSAI indicated by the third network slice information and/or may hold the first timer information as UE context information in association with the first reason value (reason value indicating pending). The AMF 30 may hold the first timer information as UE context information in association with one or more pieces of S-NSSAI indicated by the sixth network slice information.

Step (2): the UE 10 performs first processing example (S0702). In the first processing example, the UE 10 may perform one or more of first to third behavior examples. The first processing example includes processing including behavior (first behavior example) that the UE 10 activates the timer 1 for determining whether the network is abnormal during the procedure of network slice-specific authentication and authorization, behavior (second behavior example) until the timer 1 expires or stops, and behavior (third behavior example) when the timer 1 has expired or stopped.

The first behavior example in the present aspect may be behavior that the UE 10 sets, to the timer 1, a timer value indicated by the first timer information or a value set to the UE 10 in advance and activates the timer 1. Note that the activation of the timer 1 may mean start of counting at the timer. The timer value set to the UE 10 in advance may be set to the UE 10 so that the timer value is used when the UE 10 is located in a HPLMN or an equivalent PLMN.

The UE 10 may activate the timer 1 in the unit of one or more pieces of S-NSSAI associated with the first reason value (reason value indicating pending) in the third network slice information (rejected NSSAI), in the unit of one or more pieces of S-NSSAI indicated by the sixth network slice information (pending NSSAI), in the unit of one or more pieces of S-NSSAI indicated by the first network slice information (requested NSSAI), or in the unit of at least one or a combination of S-NSSAI, subscriber identity module (SIM), UE, and PLMN. In other words, the first timer information including the timer value of the timer 1 may be set in the unit of one or more pieces of S-NSSAI associated with the first reason value (reason value indicating pending) in the third network slice information (rejected NSSAI), in the unit of one or more pieces of S-NSSAI indicated by the sixth network slice information (pending NSSAI), in the unit of one or more pieces of S-NSSAI indicated by the first network slice information (requested NSSAI), or in the unit of at least one or a combination of S-NSSAI, SIM, UE, and PLMN. For example, the UE 10 may activate the timer 1 in the unit of one or more pieces of S-NSSAI associated with the first reason value (reason value indicating pending) in the third network slice information (rejected NSSAI), may activate the timer 1 in the unit of SIM, may activate the timer 1 in the unit of UE, may activate the timer 1 in the unit of PLMN, may activate the timer 1 in the unit of one or more pieces of S-NSSAI indicated by the sixth network slice information, or may activate the timer 1 in the unit of one or more pieces of S-NSSAI indicates by the first network slice information (requested NSSAI). For example, the UE 10 may activate the timer 1 in a combination of the unit of one or more pieces of S-NSSAI associated with the first reason value (reason value indicating pending) in the third network slice information (rejected NSSAI) and the unit of PLMN, may activate the timer 1 in a combination of the unit of one or more pieces of S-NSSAI associated with the first reason value (reason value indicating pending) and the unit of SIM, or may activate the timer 1 in a combination of the unit of one or more pieces of S-NSSAI associated with the first reason value (reason value indicating pending) and the unit of UE. For example, the UE 10 may activate the timer 1 in a combination of the unit of SIM and the unit of PLMN or may activate the timer 1 in a combination of the unit of UE and the unit of PLMN. For example, the UE 10 may activate the timer 1 in a combination of the unit of one or more pieces of S-NSSAI associated with the first reason value (reason value indicating pending) in the third network slice information (rejected NSSAI), the unit of UE, and the unit of PLMN, may activate the timer 1 in a combination of the unit of one or more pieces of S-NSSAI associated with the first reason value (reason value indicating pending) in the third network slice information (rejected NSSAI), the unit of SIM, and the unit of PLMN, and may activate the timer 1 in a combination of the unit of SIM, the unit of UE, and the unit of PLMN. For example, the UE 10 may activate the timer 1 in a combination of the unit of one or more pieces of S-NSSAI associated with the first reason value (reason value indicating pending) in the third network slice information (rejected NSSAI), the unit of SIM, the unit of UE, and the unit of PLMN.

Note that, in a case in which there are two or more pieces of S-NSSAI associated with the first reason value (reason value indicating pending) or in a case in which there are two or more pieces of S-NSSAI indicated by the sixth network slice information (pending NSSAI), the first timer information may be obtained as the product of the timer value of a single piece of S-NSSAI and the number of pieces of S-NSSAI associated with the first reason value (reason value indicating pending) or S-NSSAI indicated by the sixth network slice information (pending NSSAI).

In the first behavior example in the present aspect, the UE 10 may perform N repetitions of an operation to reactivate the timer 1 each time the timer 1 expires. The value N as the number of repetitions of the operation may be a value determined based on configuration data held by the UE 10. Alternatively, the value N indicating N times may be set to a registration accept message, a registration reject message, a configuration update command (UE setting information update command control signal or control message), or a DL NAS transport message that are transmitted from the AMF 30, and the AMF 30 may transmit the message to the UE 10, so that the value N is set to the UE 10. In this case, the second behavior example to be described below may be activated until the timer 1 is activated or expires N times, and the third behavior example to be described later may be activated after N times of activation and expiration of the timer 1.

The second behavior example in the present aspect may include behavior that, until the timer 1 being activated stops or expires, the UE 10 prevents transmission of a registration request (initial registration request, mobility registration update, or periodic registration update) using one or more pieces of S-NSSAI associated with the first reason value (reason value indicating pending) in the third network slice information (rejected NSSAI), S-NSSAI of a serving PLMN to which one or more pieces of S-NSSAI associated with the first reason value (reason value indicating pending) in the third network slice information (rejected NSSAI) are mapped, or one or more pieces of S-NSSAI indicated by the sixth network slice information.

The second behavior example in the present aspect may be behavior that, until the timer 1 being activated stops or expires, the UE 10 transmits, irrespective of the third network slice information (rejected NSSAI) or the sixth network slice information (pending NSSAI), an emergency registration request using one or more pieces of S-NSSAI associated with the reason value indicating pending in the third network slice information (rejected NSSAI), one or more pieces of S-NSSAI associated with the first reason value (reason value indicating pending) in the third network slice information (rejected NSSAI), or S-NSSAI of a serving PLMN to which one or more pieces of S-NSSAI indicated by the sixth network slice information are mapped.

In the second behavior example in the present aspect, when the procedure of network slice-specific authentication and authorization is completed for one or more pieces of S-NSSAI associated with the first reason value (reason value indicating pending) in the third network slice information (rejected NSSAI), one or more pieces of S-NSSAI associated with the first reason value (reason value indicating pending) in the third network slice information (rejected NSSAI), or S-NSSAI of a serving PLMN to which one or more pieces of S-NSSAI indicated by the sixth network slice information (pending NSSAI) are mapped, the UE 10 may delete the S-NSSAI from the third network slice information (rejected NSSAI) or the sixth network slice information. The UE 10 may manage, as the second network slice information (allowed NSSAI), the S-NSSAI deleted from the third network slice information or the sixth network slice information. In addition, the UE 10 may start a service using the S-NSSAI managed as the second network slice information (allowed NSSAI).

The third behavior example in the present aspect may include behavior that, when the timer 1 being activated has stopped or expired, the UE 10 updates at least one of: one or more pieces of S-NSSAI corresponding to the first reason value (reason value indicating pending) and/or the third network slice information (rejected NSSAI); and one or more pieces of S-NSSAI indicated by the sixth network slice information.

Specifically, the UE 10 may perform a first procedure example below as the third behavior example.

In the present aspect, when the timer 1 being activated has stopped or expired, the UE 10 may cancel the association of the first reason value (reason value indicating pending) and one or more pieces of S-NSSAI corresponding to the third network slice information (rejected NSSAI), which are held by the UE 10. The cancellation of the association of the first reason value (reason value indicating pending) and one or more pieces of S-NSSAI corresponding to the third network slice information (rejected NSSAI) may mean deletion of the first reason value (reason value indicating pending) for one or more pieces of S-NSSAI corresponding to the third network slice information (rejected NSSAI) and the first reason value (reason value indicating pending), which are held by the UE 10, or may mean rewriting to the second reason value (reason value indicating failure). In this case, the UE 10 may perform rewriting to the second reason value (reason value indicating failure) without message transmission and reception to and from the core network and/or the access network (locally). Note that the deletion of the first reason value (reason value indicating pending) may mean that no reason value is associated with the one or more pieces of S-NSSAI.

In some instances, the UE 10 may perform, as the third behavior example, a second procedure example below, which is different from the first procedure example.

In the present aspect, when the timer 1 being activated has stopped or expired, the UE 10 may delete one or more pieces of S-NSSAI associated with the first reason value (reason value indicating pending) in the third network slice information (rejected NSSAI) held by the UE 10, or one or more pieces of S-NSSAI indicated by the sixth network slice information. The deletion of one or more pieces of S-NSSAI associated with the first reason value (reason value indicating pending) in the third network slice information (rejected NSSAI) may mean deletion of both of: the first reason value (reason value indicating pending) in the third network slice information (rejected NSSAI) held by the UE; and one or more pieces of S-NSSAI associated with the reason value.

In some instances, the UE 10 may perform, as the third behavior example, a third procedure example below, which is different from the first and second procedure examples.

In a case in which the UE 10 holds only one or more pieces of S-NSSAI associated with the first reason value (reason value indicating pending) in the third network slice information (rejected NSSAI) when the timer 1 being activated has stopped or expired, the UE 10 may reset the third network slice information (rejected NSSAI) held by the UE 10. The resetting of the third network slice information (rejected NSSAI) may mean deletion of all pieces of third network slice information (rejected NSSAI) held by the UE.

In a case in which the UE 10 holds only one or more pieces of S-NSSAI indicated by the sixth network slice information (pending NSSAI) when the timer 1 being activated has stopped or expired, the UE 10 may reset the sixth network slice information (pending NSSAI) held by the UE 10. The resetting of the sixth network slice information (pending NSSAI) may mean deletion of all pieces of sixth network slice information (pending NSSAI) held by the UE.

Figure 8:
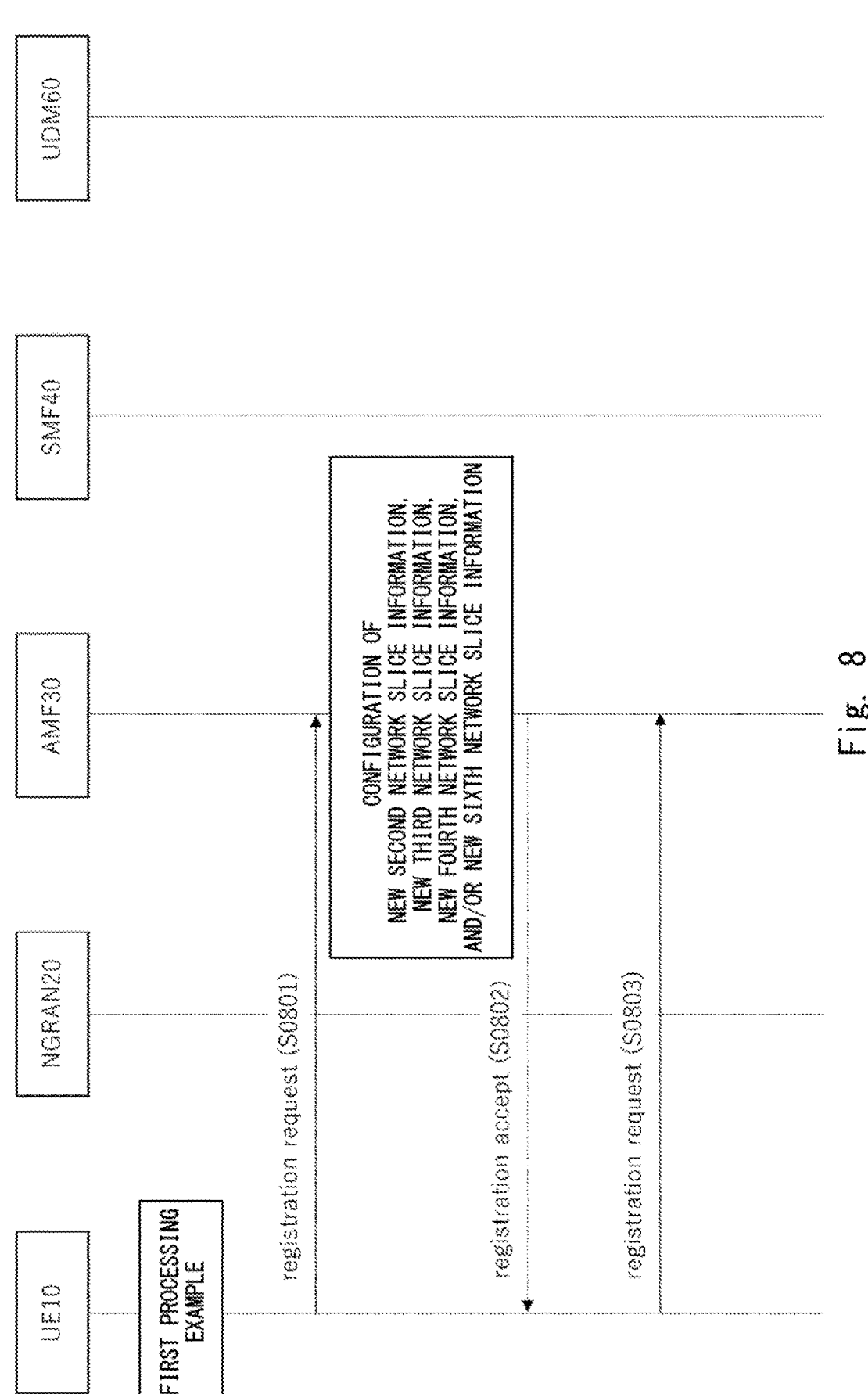
FIG. 8 is a diagram illustrating the procedure of reconnection using S-NSSAI according to the first aspect.

FIG. 8 is a diagram illustrating the procedure of reconnection using S-NSSAI that has been associated with the first reason value (reason value indicating pending) or one or more pieces of S-NSSAI indicated by the sixth network slice information (pending NSSAI), which is performed after the first processing example in the present aspect.

In some instances, the UE 10 may perform a first procedure example below.

Specifically, after performing the first processing example, the UE 10 may transmit a registration request (initial registration request, mobility registration update, or periodic registration update) message to the AMF 30 by using one or more pieces of S-NSSAI that have been associated with the first reason value (reason value indicating pending) in the third network slice information (rejected NSSAI), one or more pieces of S-NSSAI that are associated with the first reason value (reason value indicating pending) in the third network slice information (rejected NSSAI), or S-NSSAI provided by a serving PLMN to which one or more pieces of S-NSSAI indicated by the sixth network slice information (pending NSSAI) are mapped (S0801).

In some instances, the UE 10 may perform a second procedure example below.

Specifically, when the timer 1 being activated has stopped or expired as illustrated in FIG. 8, the UE 10 may transmit, to the AMF 30, a registration request (initial registration request, mobility registration update, or periodic registration update) message using neither one or more pieces of S-NSSAI associated with the third network slice information (rejected NSSAI) that has been associated with the first reason value (reason value indicating pending) nor one or more pieces of S-NSSAI indicated by the sixth network slice information (pending NSSAI) (S0801). Specifically, in the second procedure example, neither one or more pieces of S-NSSAI that have been associated with the reason value indicating pending in the third network slice information (rejected NSSAI) nor one or more pieces of S-NSSAI indicated by the sixth network slice information (pending NSSAI) are set to the first network slice information (requested NSSAI) set to the registration request (initial registration request, mobility registration update, or periodic registration update) message. Alternatively, the UE 10 may set, as an individual information element to the registration request (initial registration request, mobility registration update, or periodic registration update) message, one or more pieces of S-NSSAI already associated with the third network slice information (rejected NSSAI) and pending or one or more pieces of S-NSSAI already indicated by the sixth network slice information (pending NSSAI), and may transmit the individual information element to the AMF 30. The AMF 30 may activate, for the S-NSSAI received as the individual information element, operation and maintenance (O&M) such as check of whether the procedure of network slice-specific authentication and authorization is normal. Note that one or more pieces of S-NSSAI that have been associated with the first reason value (reason value indicating pending) in the third network slice information (rejected NSSAI) may be one or more pieces of S-NSSAI the associated reason value of which is deleted or replaced with the second reason value (reason value indicating failure) as described in the first procedure example of the third behavior example of the first processing example.

The AMF 30 receives a registration request message using neither one or more pieces of S-NSSAI associated with the first reason value (reason value indicating pending) in the third network slice information (rejected NSSAI) nor one or more pieces of S-NSSAI indicated by the sixth network slice information (pending NSSAI). Subsequently, the AMF 30 may set the second network slice information to a registration accept message when the second network slice information that is new (allowed NSSAI) is to be set to the UE, may set the third network slice information and the second reason value (reason value indicating failure) to a registration accept message when the third network slice information (rejected NSSAI) that is new is to be set to the UE, may set the fourth network slice information to a registration accept message when the fourth network slice information that is new (configured NSSAI) is to be set to the UE, or may set the sixth network slice information to a registration accept message when the sixth network slice information that is new (pending NSSAI) is to be set to the UE, and may transmit a registration accept message including the information to the UE 10 (S0802).

Note that, even when the UE 10 has deleted, or rewritten to the second reason value (reason value indicating failure), a reason value associated with one or more pieces of S-NSSAI associated with the third network slice information (rejected NSSAI) based on the first procedure example of the third behavior example of the first processing example, the AMF 30 may recognize, as the first reason value (reason value indicating pending), the reason value associated as UE context information with the S-NSSAI. In other words, the reason value recognized by the AMF 30 may be different from the reason value associated with one or more pieces of S-NSSAI associated with the third network slice information (rejected NSSAI) recognized by the UE 10. The reason value recognized by the AMF 30 is associated with one or more pieces of S-NSSAI associated with the third network slice information (rejected NSSAI).

A case in which the second network slice information is included in a registration accept message will be described below. When one or more pieces of S-NSSAI included in the second network slice information match one or more pieces of S-NSSAI associated with the first reason value (reason value indicating pending) in the third network slice information (rejected NSSAI) held by the UE 10 or one or more pieces of S-NSSAI indicated by the sixth network slice information (pending NSSAI) held by the UE 10, the UE 10 may delete the matching one or more pieces of S-NSSAI from the third network slice information (rejected NSSAI) or the sixth network slice information (pending NSSAI). The UE 10 may transmit, to the AMF 30, a registration request (initial registration request, mobility registration update, or periodic registration update) message using the one or more pieces of S-NSSAI deleted from the third network slice information (rejected NSSAI) or the sixth network slice information (pending NSSAI) (S0803).

For example, it is assumed that the UE 10 holds S-NSSAI #1 as S-NSSAI corresponding to the third network slice information (rejected NSSAI). S-NSSAI #1 is associated with the first reason value (reason value indicating pending). In this case, when having received a registration accept message including S-NSSAI #1 as the second network slice information, the UE 10 deletes S-NSSAI #1 held as S-NSSAI corresponding to the third network slice information (rejected NSSAI). In addition, the UE 10 may transmit, to the AMF 30, a registration request (initial registration request, mobility registration update, or periodic registration update) message using S-NSSAI #1 (S0803).

For example, it is assumed that the UE 10 holds S-NSSAI #1 as S-NSSAI corresponding to the sixth network slice information (pending NSSAI). In this case, when having received a registration accept message including S-NSSAI #1 as the second network slice information, the UE 10 deletes S-NSSAI #1 held as S-NSSAI corresponding to the sixth network slice information (pending NSSAI). In addition, the UE 10 may transmit, to the AMF 30, a registration request (initial registration request, mobility registration update, or periodic registration update) message using S-NSSAI #1 (S0803).

A case in which the third network slice information and the second reason value are included in a registration accept message will be described below. When one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

For example, it is assumed that the UE 10 holds S-NSSAI #1 as S-NSSAI corresponding to the third network slice information (rejected NSSAI). S-NSSAI #1 is associated with the first reason value (reason value indicating pending). In this case, when having received a registration accept message including S-NSSAI #1 as S-NSSAI corresponding to the third network slice information and the second reason value (reason value indicating failure), the UE 10 may rewrite, to the second reason value (reason value indicating failure), the reason value associated with S-NSSAI #1 held as S-NSSAI corresponding to the third network slice information (rejected NSSAI).

In some instances, for example, when configured NSSAI is included in the fourth network slice information, the UE 10 may delete the held third network slice information (rejected NSSAI) or the sixth network slice information (pending NSSAI) held by the UE 10. In other words, when having received the fourth network slice information (configured NSSAI), the UE 10 may reset the held third network slice information (rejected NSSAI) or the sixth network slice information (pending NSSAI) held by the UE 10. In some instances, the UE 10 may transmit, to the AMF 30, a registration request (initial registration request, mobility registration update, or periodic registration update) message using one or more pieces of S-NSSAI associated with the fourth network slice information (configured NSSAI) (S0803). The fourth network slice information set by the UE 10 may include one or more pieces of S-NSSAI associated with the first reason value (reason value indicating pending) for network slice-specific authentication and authorization in the third network slice information (rejected NSSAI), or one or more pieces of S-NSSAI indicated by the sixth network slice information (pending NSSAI). In other words, at step at S0803, the UE 10 can transmit a registration request (initial registration request, mobility registration update, or periodic registration update) message to the AMF 30 by using one or more pieces of S-NSSAI that have been associated with the first reason value (reason value indicating pending) for network slice-specific authentication and authorization, which are included in the reset third network slice information (rejected NSSAI), or one or more pieces of S-NSSAI that have been included in the reset sixth network slice information (pending NSSAI).

For example, it is assumed that the UE 10 holds S-NSSAI #1 and S-NSSAI #2 as S-NSSAI corresponding to the third network slice information (rejected NSSAI). S-NSSAI #1 is associated with the first reason value (reason value indicating pending). S-NSSAI #2 is associated with the fourth reason value (reason value indicating "S-NSSAI not available in the current registration area") disclosed in Non Patent Literature 3. In this case, when having received a registration accept message including the fourth network slice information (configured NSSAI), the UE 10 may delete both S-NSSAI #1 and S-NSSAI #2 held as S-NSSAI corresponding to the third network slice information (rejected NSSAI) or may delete the third network slice information (rejected NSSAI) held by the UE 10. For example, when S-NSSAI #1 is included in the fourth network slice information (configured NSSAI), the UE 10 may transmit, to the AMF 30, a registration request (initial registration request, mobility registration update, or periodic registration update) message using S-NSSAI #1 included in the fourth network slice information (configured NSSAI).

In some instances, the UE 10 may perform the third procedure example below.

Figure 9:
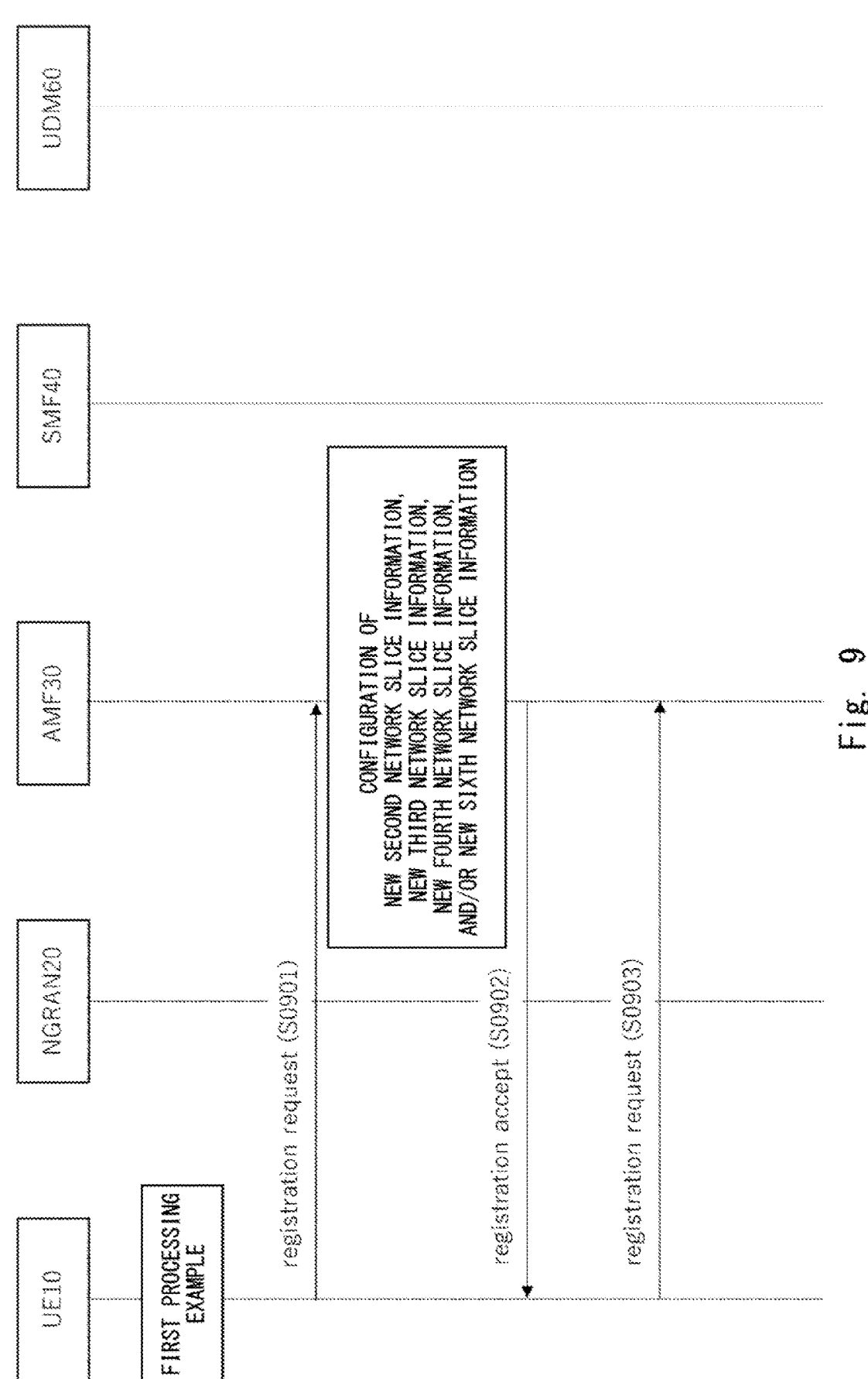
FIG. 9 is a diagram illustrating the procedure of reconnection using S-NSSAI according to the first aspect.

Specifically, when the timer 1 being activated has stopped or expired as illustrated in FIG. 9, the UE 10 may transmit, to the AMF 30, a registration request (initial registration request, mobility registration update, or periodic registration update) message using S-NSSAI that have been associated with the first reason value (reason value indicating pending) in the third network slice information (rejected NSSAI), or one or more pieces of S-NSSAI indicated by the sixth network slice information (pending NSSAI) (S0901). Note that one or more pieces of S-NSSAI that have been associated with the first reason value (reason value indicating pending) in the third network slice information (rejected NSSAI) may be one or more pieces of S-NSSAI the associated reason value of which is deleted or rewritten to the second reason value (reason value indicating failure) as described in the first procedure of the third behavior example of the first processing example.

The AMF 30 receives a registration request message using one or more pieces of S-NSSAI associated with the first reason value (reason value indicating pending) in the third network slice information (rejected NSSAI), or one or more pieces of S-NSSAI indicated by the sixth network slice information (pending NSSAI). Subsequently, the AMF 30 may set the second network slice information to a registration accept message when the second network slice information that is new (allowed NSSAI) is set to the UE, may set the third network slice information and the second reason value to a registration accept message when the third network slice information (rejected NSSAI) that is new is set to the UE, may set the fourth network slice information to a registration accept message when the fourth network slice information that is new (configured NSSAI) is set to the UE, or may set the sixth network slice information to a registration accept message when the sixth network slice information that is new (pending NSSAI) is set to the UE, and may transmit a registration accept message including the information to the UE 10 (S0902).

Note that, even when the UE 10 has deleted, or rewritten to the second reason value (reason value indicating failure), a reason value associated with one or more pieces of S-NSSAI corresponding to the third network slice information (rejected NSSAI) based on the first procedure example of the third behavior example of the first processing example, the AMF 30 may recognize, as the first reason value (reason value indicating pending), the reason value associated as UE context information with the S-NSSAI. In other words, the reason value associated with one or more pieces of S-NSSAI of the third network slice information (rejected NSSAI) and recognized by the AMF 30 may be different from the reason value associated with one or more pieces of S-NSSAI corresponding to the third network slice information (rejected NSSAI) and recognized by the UE 10.

A case in which the second network slice information is included in a registration accept message will be described below. When one or more pieces of S-NSSAI included in the second network slice information match one or more pieces of S-NSSAI associated with the first reason value (reason value indicating pending) in the third network slice information (rejected NSSAI) held by the UE 10, or one or more pieces of S-NSSAI indicated by the sixth network slice information (pending NSSAI), the UE 10 may delete the matching one or more pieces of S-NSSAI from the third network slice information (rejected NSSAI) or the sixth network slice information (pending NSSAI). The UE 10 may transmit, to the AMF 30, a registration request (initial registration request, mobility registration update, or periodic registration update) message using the one or more pieces of S-NSSAI deleted from the third network slice information (rejected NSSAI) or the sixth network slice information (pending NSSAI) (S0903).

For example, it is assumed that the UE 10 holds S-NSSAI #1 as S-NSSAI corresponding to the third network slice information (rejected NSSAI). S-NSSAI #1 is associated with the first reason value (reason value indicating pending). In this case, when having received a registration accept message including S-NSSAI #1 as the second network slice information, the UE 10 deletes S-NSSAI #1 held as S-NSSAI corresponding to the third network slice information (rejected NSSAI). In addition, the UE 10 may transmit, to the AMF 30, a registration request (initial registration request, mobility registration update, or periodic registration update) message using S-NSSAI #1 (S0903).

For example, it is assumed that the UE 10 holds S-NSSAI #1 as S-NSSAI corresponding to the sixth network slice information (pending NSSAI). In this case, when having received a registration accept message including S-NSSAI #1 as the second network slice information, the UE 10 deletes S-NSSAI #1 held as S-NSSAI corresponding to the sixth network slice information (pending NSSAI). In addition, the UE 10 may transmit, to the AMF 30, a registration request (initial registration request, mobility registration update, or periodic registration update) message using S-NSSAI #1 (S0903).

A case in which the third network slice information and the second reason value are included in a registration accept message will be described below. When one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

For example, it is assumed that the UE 10 holds S-NSSAI #1 as S-NSSAI corresponding to the third network slice information (rejected NSSAI). S-NSSAI #1 is associated with the first reason value (reason value indicating pending). In this case, when having received a registration accept message including S-NSSAI #1 as S-NSSAI corresponding to the third network slice information and the second reason value (reason value indicating failure), the UE 10 may rewrite, to the second reason value (reason value indicating failure), the reason value associated with S-NSSAI #1 held as S-NSSAI corresponding to the third network slice information (rejected NSSAI).

In some instances, for example, when configured NSSAI is included in the fourth network slice information, the UE 10 may delete the held third network slice information (rejected NSSAI) or the sixth network slice information (pending NSSAI) held by the UE 10. In other words, when having received the fourth network slice information (configured NSSAI), the UE 10 may reset the held third network slice information (rejected NSSAI) or the sixth network slice information (pending NSSAI) held by the UE 10. The UE 10 may transmit, to the AMF 30, a registration request (initial registration request, mobility registration update, or periodic registration update) message using one or more pieces of S-NSSAI associated with the fourth network slice information (configured NSSAI) (S0903). The fourth network slice information set by the UE 10 may include one or more pieces of S-NSSAI associated with the first reason value (reason value indicating pending) for network slice-specific authentication and authorization in the third network slice information (rejected NSSAI), or one or more pieces of S-NSSAI indicated by the sixth network slice information (pending NSSAI). In other words, at step at S0903, the UE 10 can transmit a registration request (initial registration request, mobility registration update, or periodic registration update) message to the AMF 30 by using one or more pieces of S-NSSAI that have been associated with the first reason value (reason value indicating pending) for network slice-specific authentication and authorization, which have been included in the reset third network slice information (rejected NSSAI), or one or more pieces of S-NSSAI that have been included in the reset sixth network slice information (pending NSSAI).

For example, it is assumed that the UE 10 holds S-NSSAI #1 and S-NSSAI #2 as S-NSSAI corresponding to the third network slice information (rejected NSSAI). S-NSSAI #1 is associated with the first reason value (reason value indicating pending). S-NSSAI #2 is associated with the third reason value (reason value indicating "S-NSSAI not available in the current registration area") disclosed in Non Patent Literature 3. In this case, when having received a registration accept message including the fourth network slice information (configured NSSAI), the UE 10 may delete both S-NSSAI #1 and S-NSSAI #2 held as S-NSSAI corresponding to the third network slice information (rejected NSSAI) or may delete the third network slice information (rejected NSSAI) held by the UE 10. For example, when S-NSSAI #1 is included in the fourth network slice information (configured NSSAI), the UE 10 may transmit, to the AMF 30, a registration request (initial registration request, mobility registration update, or periodic registration update) message using S-NSSAI #1 included in the fourth network slice information (configured NSSAI).

Note that, in the second and third procedure examples performed after the first processing example, it is described that, when the timer 1 has stopped or expired, the UE 10 transmits a registration request to the AMF 30 and acquires, through registration accept as a reply to the registration request, new network slice information (the second network slice information, the third network slice information and the second reason value, the fourth network slice information, and/or the sixth network slice information). In this manner, the means for solving such a problem that the UE 10 indefinitely waits the procedure of network slice-specific authentication and authorization is described above, but the present invention is not limited thereto.

Specifically, the UE 10 may receive, from the AMF 30, a configuration update command including the second instruction information. The UE 10 may transmit a registration request message to the AMF 30 based on the second instruction information, and the AMF 30 may include the second network slice information, the third network slice information and the second reason value, the fourth network slice information, and/or the sixth network slice information in a registration accept message in response to the registration request message, thereby setting new network slice information to the UE. The behavior of the UE 10 related to registration request transmission and registration accept may be same as the above-described behavior of the UE 10 in the second and third procedure examples performed after the first processing example.

The first to third behavior examples of the first processing example may be behavior executed based on a rule and/or a policy inside the UE 10. The UE 10 may hold a policy (UE policy) in a memory and/or a control unit inside the UE 10. For example, when the timer 1 has expired, the UE 10 may execute, based on the policy, one or more of the first to third procedure examples of the third behavior example of the first processing example and one or more of the first to third procedure examples performed after the first processing example, thereby solving such a problem that the procedure of network slice-specific authentication and authorization is indefinitely waited.

A processing example that stops the timer 1 being activated will be described below.

It may be set that the UE 10 stops the timer 1 when having received an EAP identity request from the core network or stops the timer 1 when having received EAP success or EAP failure.

A case in which the UE 10 performs movement that involves PLMN interchange while the timer 1 is activated will be described below.

A PLMN before the interchange is referred to as an interchange source PLMN, and a PLMN after the interchange is referred to as an interchange destination PLMN.

A first procedure example below may be performed as a procedure example in a case in which the UE 10 performs movement that involves PLMN interchange while the timer 1 is activated.

It may be set that the timer 1 does not need to be stopped when the UE 10 has performed PLMN interchange while the timer 1 is activated. In this case, the timer 1 may be managed (stopped or activated) in the unit of third network slice information or in a combination of the unit of third network slice information and the unit of UE.

Note that the timer 1 may be managed (stopped or activated) in the unit of sixth network slice information or in a combination of the unit of sixth network slice information and the unit of UE.

In some instances, the UE 10 may prevent, in the interchange destination PLMN, transmission of a registration request message (initial registration request, mobility registration update, or periodic registration update) using the third network slice information or the sixth network slice information or using the third network slice information or S-NSSAI provided by a serving PLMN to which the sixth network slice information is mapped in a case in which the interchange source PLMN is a HPLMN.

In some instances, a second procedure example below may be performed as a procedure example in a case in which the UE 10 performs movement that involves PLMN interchange while the timer 1 is activated.

It may be set that the timer 1 does not need to be stopped when the UE 10 has performed PLMN interchange while the timer 1 is activated. In this case, the timer 1 may be managed (stopped or activated) in the unit of third network slice information or in a combination of the unit of third network slice information and the unit of UE. Alternatively, the timer 1 may be managed (stopped or activated) in the unit of sixth network slice information or in a combination of the unit of sixth network slice information and the unit of UE. This is to continue activation of the timer 1, which is activated in the interchange source PLMN, when return is made from the interchange destination PLMN to the interchange source PLMN again through PLMN interchange, thereby continuously applying registration request message transmission management applied in the interchange source PLMN.

In some instances, the UE 10 may transmit, in the interchange destination PLMN, a registration request message (initial registration request, mobility registration update, or periodic registration update) using the third network slice information or the sixth network slice information or using the third network slice information or S-NSSAI provided by a serving PLMN to which the sixth network slice information is mapped in a case in which the interchange source PLMN is a HPLMN.

In some instances, a third procedure example below, which is different from the first and second procedure examples, may be performed as a procedure example in a case in which the UE 10 performs movement that involves PLMN interchange while the timer 1 is activated.

It may be set that the timer 1 is stopped when the UE 10 has performed PLMN interchange while the timer 1 is activated. The timer 1 may be managed (stopped or activated) in the unit of third network slice information and PLMN or in a combination of the unit of third network slice information, the unit of PLMN, and the unit of UE. The timer 1 may be managed (stopped or activated) in the unit of sixth network slice information and the unit of PLMN or in a combination of the unit of sixth network slice information, the unit of PLMN, and the unit of UE.

In some instances, the UE 10 may transmit, in the interchange destination PLMN, a registration request message (initial registration request, mobility registration update, or periodic registration update) using the third network slice information or the sixth network slice information or using the third network slice information or S-NSSAI provided by a serving PLMN to which the sixth network slice information is mapped in a case in which the interchange source PLMN is a HPLMN.

A case in which system interchange is performed from the N1 mode to the S1 mode while the timer 1 is activated will be described below.

A first procedure example below may be performed as a procedure example in a case in which the UE 10 interchanges the N1 mode with the S1 mode while the timer 1 is activated.

It may be set that, when the N1 mode is interchanged with the S1 mode while the timer 1 is activated, the UE 10 does not need to stop the timer 1 being activated. This is to continue activation of the timer 1, which is initially activated in the N1 mode, in a case of interchange with the N1 mode again after interchange with the S1 mode, thereby continuously applying registration request message transmission management applied in the N1 mode.

In some instances, a second procedure example below, which is different from the first procedure example, may be performed as a procedure example in a case in which the UE 10 interchanges the N1 mode with the S1 mode while the timer 1 is activated.

It may be set that, when the N1 mode is interchanged with the S1 mode while the timer 1 is activated, the UE 10 stops the timer 1 being activated.

The above description is made on a case in which the UE 10 receives, from the AMF 30, at least one of the third network slice information and the first reason value, and the first timer information or receives the sixth network slice information and the first timer information, but the following description will be made on a case in which the UE 10 receives the fifth network slice information from the AMF 30.

Specifically, the AMF 30 may transmit the fifth network slice information to the UE 10 when all pieces of S-NSSAI included in the first network slice information (requested NSSAI) are targets of network slice-specific authentication and authorization, when the first network slice information (requested NSSAI) is not included and all pieces of default S-NSSAI set to the subscriber information are targets of network slice-specific authentication and authorization, or when all pieces of S-NSSAI included in the first network slice information (requested NSSAI) do not match S-NSSAI (subscribed NSSAI) recorded in the subscriber information and all pieces of default S-NSSAI set to the subscriber information are targets of network slice-specific authentication and authorization.

In other words, the AMF 30 transmits the fifth network slice information since there is no S-NSSAI as the second network slice information (allowed NSSAI) that can be transmitted to the UE 10. The AMF 30 may include S-NSSAI as a target of network slice-specific authentication and authorization in the third network slice information and transmit the associated first reason value (reason value indicating pending) to the UE 10, and does not necessarily need to transmit the third network slice information and the first reason value to the UE 10.

In this case, when having received the first timer information in addition to the fifth network slice information and at least one of the third network slice information and the first reason value from the AMF 30 as described in the present aspect, the UE 10 may perform behavior same as in a case in which the timer 1 is set to the UE in advance.

(Second Aspect)

Figure 10:
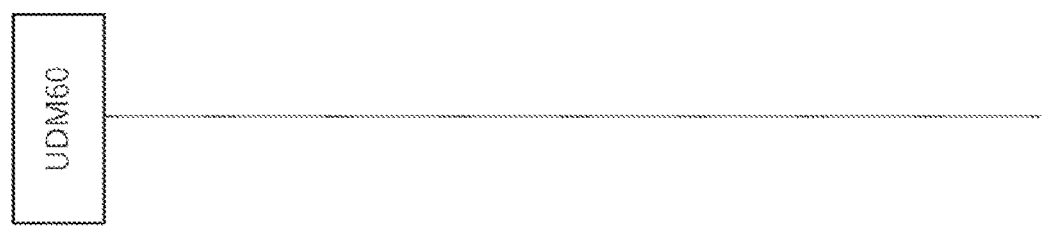
FIG. 10 is a diagram illustrating the procedure of reconnection using S-NSSAI according to a second aspect.
Figure 10:
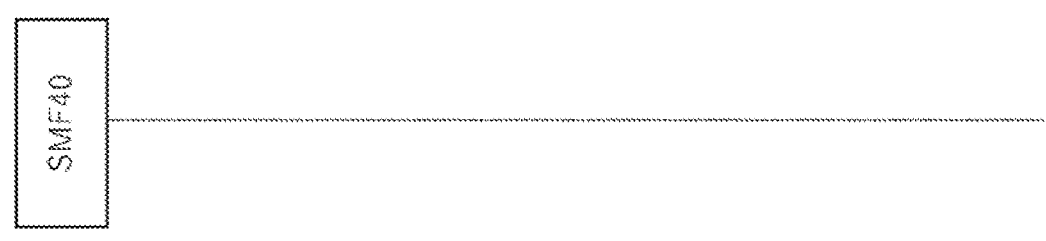
Figure 10:
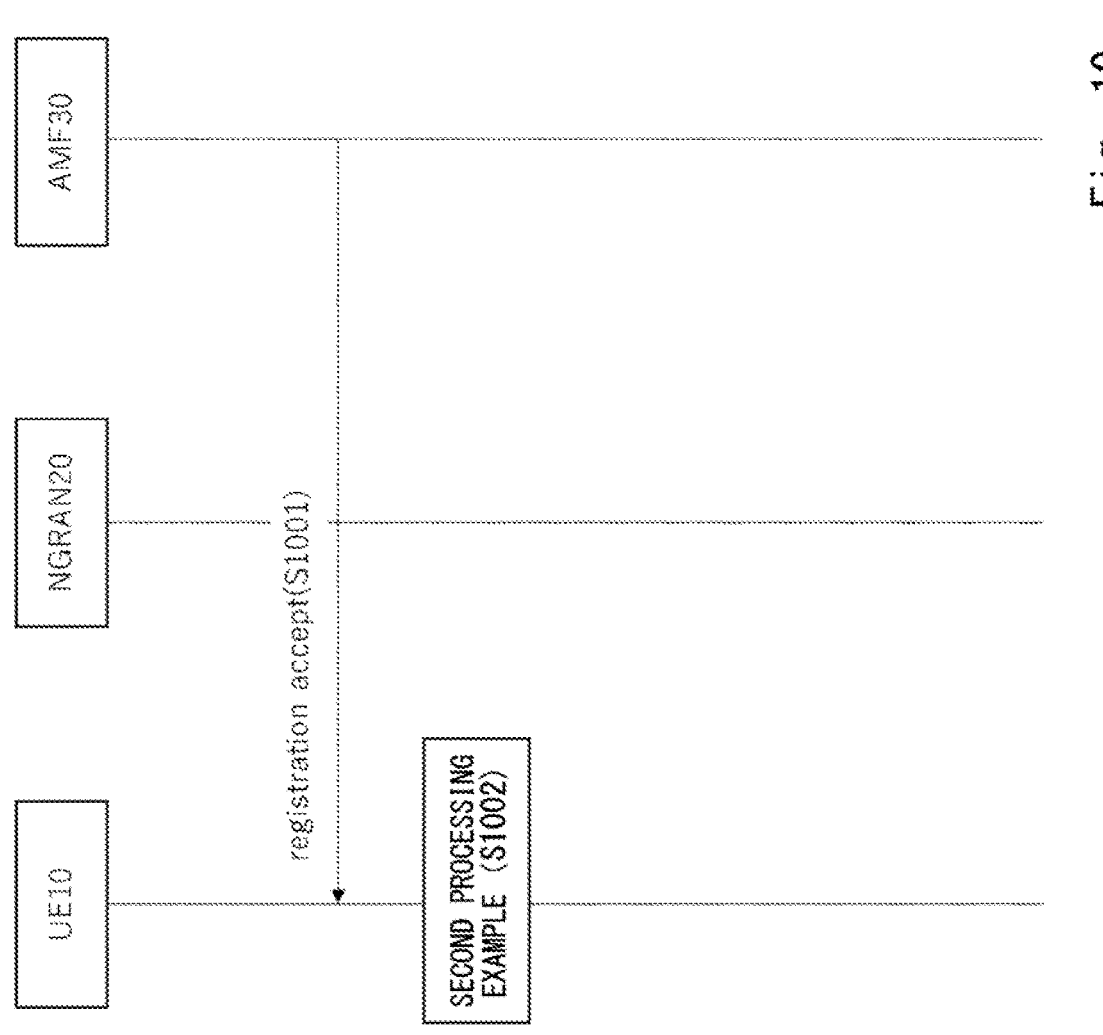

A second aspect will be described below with reference to FIG. 10.

The present aspect relates to a scenario that, after execution of the processing at steps S0501 to S0505 in FIG. 5, the UE 10 receives the third network slice information including S-NSSAI associated with the first reason value, or the sixth network slice information and waits the procedure of network slice-specific authentication and authorization. The UE 10 supports the procedure of network slice-specific authentication and authorization. The wait of the procedure of network slice-specific authentication and authorization is a state in which the UE 10 holds one or more pieces of S-NSSAI associated with the first reason value (reason value indicating pending) or one or more pieces of S-NSSAI included in the sixth network slice information after registration accept reception, after registration completion message transmission, or after 5GMM context establishment. Specifically, the wait of the procedure of network slice-specific authentication and authorization may mean a case in which no EAP identity request is received, neither EAP success nor EAP failure is received, no message (configuration update command or de-registration request) that triggers acquisition of new slice information is received, or no message (DL NAS transport) for setting new slice information is received.

In a solution described below, the UE 10 manages, based on a timer 1 and/or a first timer information acquired from the core network or based on a timer 1 and/or a first timer information set to the UE 10 in advance, transmission of a registration request (initial registration request, mobility registration update, or periodic registration update) using S-NSSAI associated with the first reason value (reason value indicating pending) or one or more pieces of S-NSSAI included in the sixth network slice information. Note that, in the second aspect, unlike the first aspect, when the timer 1 has stopped or expired, another timer is activated and registration request transmission management is performed. The management of transmission may mean management of the behavior of transmission and the behavior of transmission prevention, and the behavior of transmission is also expressed as re-attempt (reconnection).

A step illustrated in FIG. 10 will be described in detail as follows.

Step (1): after having executed the processing at steps S0501 to S0505 in FIG. 5, the UE 10 receives, from the AMF 30, the first timer information in addition to at least one of the third network slice information and the first reason value, or the sixth network slice information (S1001).

In this case, the UE 10 may hold, in association with the first reason value (reason value indicating pending), one or more pieces of S-NSSAI associated with the third network slice information. The AMF 30 may hold, as UE context information in association with the first reason value (reason value indicating pending), one or more pieces of S-NSSAI associated with the third network slice information. The AMF 30 may hold one or more pieces of S-NSSAI associated with the third network slice information, and/or the first timer information as UE context information in association with the first reason value (reason value indicating pending).

The UE 10 may also hold one or more pieces of S-NSSAI included in the sixth network slice information. The AMF 30 may also hold, as UE context information, one or more pieces of S-NSSAI included in the sixth network slice information. The AMF 30 may hold the first timer information as UE context information in association with one or more pieces of S-NSSAI included in the sixth network slice information.

Step (2): having received the first timer information, the UE 10 performs a second processing example (S1002). In the second processing example, the UE 10 may perform one or more of first to third behavior examples. The second processing example includes processing including behavior (the first behavior example) that the UE 10 activates the timer 1 for determining whether the network is abnormal during the procedure of network slice-specific authentication and authorization, behavior (the second behavior example) until the timer 1 expires or stops, and behavior (the third behavior example) when the timer 1 has expired or stopped.

The first behavior example in the present aspect may be behavior that the UE 10 sets, to the timer 1, a timer value indicated by the first timer information or a value set to the UE 10 in advance and activates the timer 1. Note that the activation of the timer 1 may mean start of counting at the timer. The timer value set to the UE 10 in advance may be set to the UE 10 so that the timer value is used when the UE 10 is located in a HPLMN or an equivalent PLMN.

The UE 10 may activate the timer 1 in the unit of one or more pieces of S-NSSAI associated with the first reason value (reason value indicating pending) in the third network slice information (rejected NSSAI), may activate the timer 1 in the unit of one or more pieces of S-NSSAI included in the sixth network slice information, or may activate the timer 1 in the unit of at least one or a combination of S-NSSAI, SIM, UE, and PLMN. In other words, the first timer information including the timer value of the timer 1 may be set in the unit of one or more pieces of S-NSSAI associated with the first reason value (reason value indicating pending) in the third network slice information (rejected NSSAI), may be set in the unit of one or more pieces of S-NSSAI included in the sixth network slice information, or may be set in the unit of at least one or a combination of S-NSSAI, SIM, UE, and PLMN. For example, the UE 10 may activate the timer 1 in the unit of one or more pieces of S-NSSAI associated with the first reason value (reason value indicating pending) in the third network slice information (rejected NSSAI), may activate the timer 1 in the unit of one or more pieces of S-NSSAI included in the sixth network slice information, may activate the timer 1 in the unit of SIM, may activate the timer 1 in the unit of UE, or may activate the timer 1 in the unit of PLMN. For example, the UE 10 may activate the timer 1 in a combination of the unit of one or more pieces of S-NSSAI associated with the first reason value (reason value indicating pending) in the third network slice information (rejected NSSAI) and the unit of PLMN, may activate the timer 1 in a combination of the unit of one or more pieces of S-NSSAI associated with the first reason value (reason value indicating pending) and the unit of SIM, or may activate the timer 1 in a combination of the unit of one or more pieces of S-NSSAI associated with the first reason value (reason value indicating pending) and the unit of UE. For example, the UE 10 may activate the timer 1 in a combination of the unit of one or more pieces of S-NSSAI included in the sixth network slice information and the unit of PLMN, may activate the timer 1 in a combination of the unit of one or more pieces of S-NSSAI included in the sixth network slice information and the unit of SIM, and may activate the timer 1 in a combination of the unit of one or more pieces of S-NSSAI included in the sixth network slice information and the unit of UE. For example, the UE 10 may activate the timer 1 in a combination of the unit of SIM and the unit of PLMN or may activate the timer 1 in a combination of the unit of UE and the unit of PLMN. For example, the UE 10 may activate the timer 1 in a combination of the unit of one or more pieces of S-NSSAI associated with the first reason value (reason value indicating pending) in the third network slice information (rejected NSSAI), the unit of UE, and the unit of PLMN, may activate the timer 1 in a combination of the unit of one or more pieces of S-NSSAI associated with the first reason value (reason value indicating pending) in the third network slice information (rejected NSSAI), the unit of SIM, and the unit of PLMN, and may activate the timer 1 in a combination of the unit of SIM, the unit of UE, and the unit of PLMN. For example, the UE 10 may activate the timer 1 in a combination of the unit of one or more pieces of S-NSSAI included in the sixth network slice information, the unit of UE, and the unit of PLMN, or may activate the timer 1 in a combination of the unit of one or more pieces of S-NSSAI included in the sixth network slice information, the unit of SIM, and the unit of PLMN. For example, the UE 10 may activate the timer 1 in a combination of the unit of one or more pieces of S-NSSAI associated with the first reason value (reason value indicating pending) in the third network slice information (rejected NSSAI), the unit of SIM, the unit of UE, and the unit of PLMN. For example, the UE 10 may activate the timer 1 in a combination of the unit of one or more pieces of S-NSSAI included in the sixth network slice information, the unit of SIM, the unit of UE, and the unit of PLMN.

Note that, in a case in which there are two or more pieces of S-NSSAI associated with the first reason value (reason value indicating pending), the first timer information may be obtained as the product of the timer value of a single piece of S-NSSAI and the number of pieces of S-NSSAI associated with the first reason value (reason value indicating pending). Note that, in a case in which there are two or more pieces of S-NSSAI included in the sixth network slice information, the first timer information may be obtained as the product of the timer value of a single piece of S-NSSAI and the number of pieces of the S-NSSAI.

The second behavior example in the present aspect may be behavior that, until the timer 1 being activated stops or expires, the UE 10 prevents transmission of a registration request (initial registration request, mobility registration update, or periodic registration update) using one or more pieces of S-NSSAI associated with the first reason value (reason value indicating pending) in the third network slice information (rejected NSSAI), one or more pieces of S-NS-SAI associated with the first reason value (reason value indicating pending) in the third network slice information (rejected NSSAI), or S-NSSAI of a serving PLMN to which one or more pieces of S-NSSAI included in the sixth network slice information are mapped.

The third behavior example in the present aspect may include behavior that, when the timer 1 being activated has stopped or expired, the UE 10 updates at least one of: one or more pieces of S-NSSAI corresponding to the first reason value (reason value indicating pending) and/or the third network slice information (rejected NSSAI); and one or more pieces of S-NSSAI included in the sixth network slice information.

Specifically, the UE 10 may perform a first procedure example below as the third behavior example.

When the timer 1 being activated has stopped or expired, the UE 10 may cancel the association of the first reason value (reason value indicating pending) and one or more pieces of S-NSSAI associated with the third network slice information (rejected NSSAI), which are held by the UE 10. The cancellation of the association of the first reason value (reason value indicating pending) and one or more pieces of S-NSSAI associated with the third network slice information (rejected NSSAI) may mean deletion of the first reason value (reason value indicating pending) for one or more pieces of S-NSSAI associated with the third network slice information (rejected NSSAI) and the first reason value (reason value indicating pending), which are held by the UE, or may mean rewriting to the second reason value (reason value indicating failure). In this case, the UE 10 may perform rewriting to the second reason value (reason value indicating failure) without message transmission and reception to and from the core network and/or the access network (locally). Note that the deletion of the first reason value (reason value indicating pending) may mean that no reason value is associated with the one or more pieces of S-NSSAI.

In some instances, the UE 10 may perform, as the third behavior example, a second procedure example below, which is different from the first procedure example.

When the timer 1 being activated has stopped or expired, the UE 10 may delete one or more pieces of S-NSSAI associated with the first reason value (reason value indicating pending) in the third network slice information (rejected NSSAI) held by the UE 10, or one or more pieces of S-NSSAI included in the sixth network slice information. The deletion of one or more pieces of S-NSSAI associated with the first reason value (reason value indicating pending) in the third network slice information (rejected NSSAI) may mean deletion of both of: the first reason value (reason value indicating pending) held by the UE; and one or more pieces of S-NSSAI associated with the third network slice information (rejected NSSAI) associated with the first reason value.

In some instances, the UE 10 may perform, as the third behavior example, a third procedure example below, which is different from the first and second procedure examples.

In a case in which the UE 10 holds only one or more pieces of S-NSSAI associated with the first reason value (reason value indicating pending) in the third network slice information (rejected NSSAI) or one or more pieces of S-NSSAI included in the sixth network slice information when the timer 1 being activated has stopped or expired, the UE 10 may reset the third network slice information (rejected NSSAI) or one or more pieces of S-NSSAI included in the sixth network slice information, which are held by the UE 10. The resetting of the third network slice information (rejected NSSAI) may mean deletion of all pieces of third network slice information (rejected NSSAI) held by the UE.

In some instances, the UE 10 may perform a first procedure example below, which is performed after the second processing example.

Figure 11:
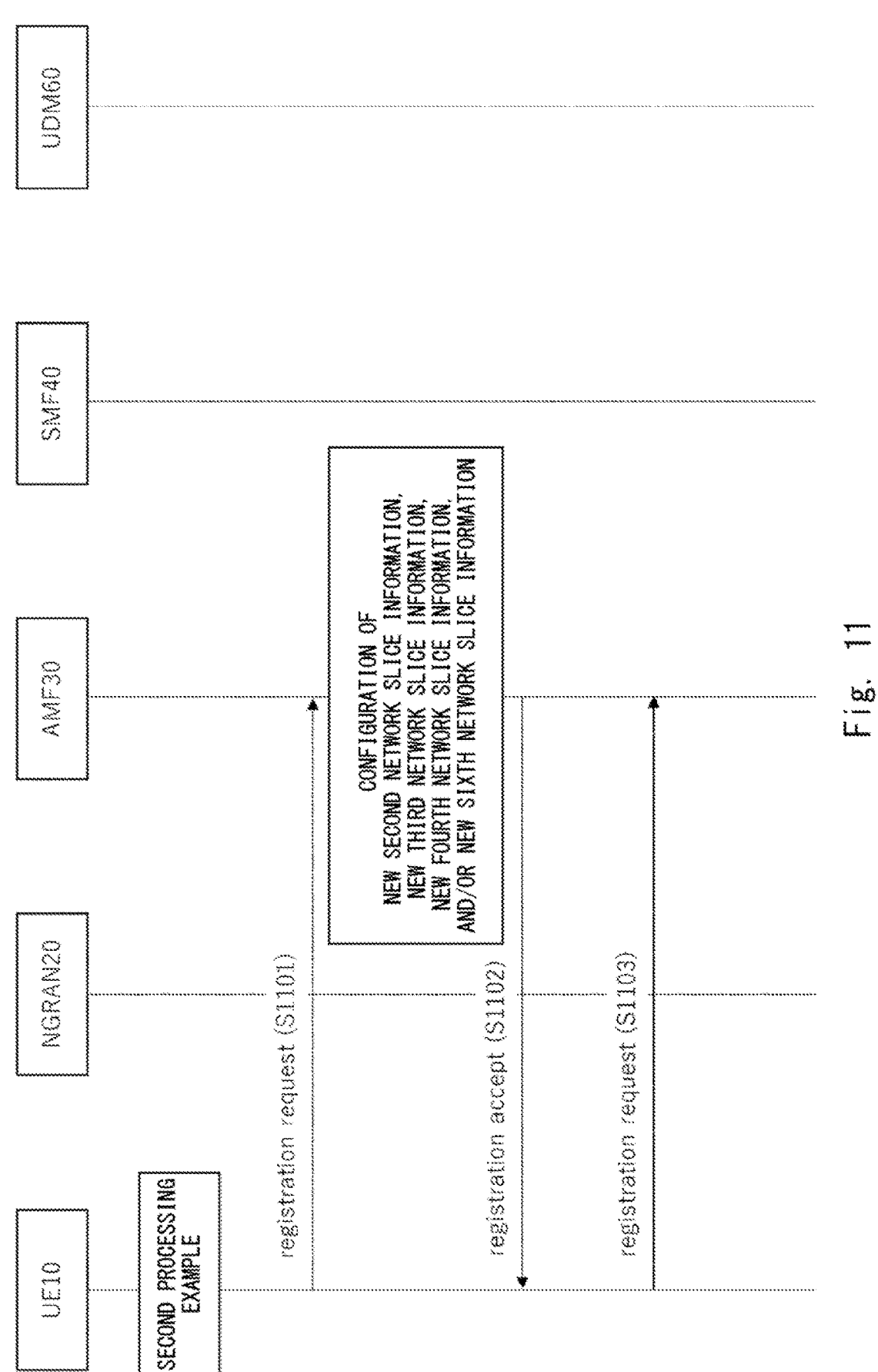
FIG. 11 is a diagram illustrating the procedure of reconnection using S-NSSAI according to the second aspect.

FIG. 11 is a diagram illustrating the procedure of reconnection not using S-NSSAI that has been associated with the first reason value (reason value indicating pending) in the first procedure example performed after the second processing example of the present aspect.

Specifically, when the timer 1 being activated has stopped or expired as illustrated in FIG. 11, the UE 10 may transmit, to the AMF 30, a registration request (initial registration request, mobility registration update, or periodic registration update) message using neither one or more pieces of S-NS-SAI associated with the first reason value (reason value indicating pending) in the third network slice information (rejected NSSAI) nor one or more pieces of S-NSSAI included in the sixth network slice information (S1101). Note that one or more pieces of S-NSSAI associated with the first reason value (reason value indicating pending) in the third network slice information (rejected NSSAI) may be one or more pieces of S-NSSAI the associated reason value of which is deleted or rewritten to the second reason value (reason value indicating failure) as described in the first procedure of the third behavior example of the second processing example. In this case, the UE 10 may activate a timer 2 and/or a timer 3. As written in Section 10.2 of Non Patent Literature 3, the timer 2 may be a mobility timer configured to wait a registration accept message from the core network and activated after the UE 10 has transmitted a registration request message. As written in Section 10.2 of Non Patent Literature 3, the timer 3 may be a timer configured to manage retransmission of a registration request message.

The AMF 30 receives a registration request message using neither one or more pieces of S-NSSAI associated with the first reason value (reason value indicating pending) in the third network slice information (rejected NSSAI) nor one or more pieces of S-NSSAI included in the sixth network slice information. Subsequently, the AMF 30 may set the second network slice information to a registration accept message when the second network slice information that is new (allowed NSSAI) is set to the UE, may set the third network slice information and the second reason value to a registration accept message when the third network slice information (rejected NSSAI) that is new is set to the UE, may set the fourth network slice information to a registration accept message when the fourth network slice information that is new (configured NSSAI) is set to the UE, or may set the sixth network slice information to a registration accept message when the sixth network slice information that is new (pending NSSAI) is set to the UE, and may transmit a registration accept message including the information to the UE 10 (S1102).

Note that, even when the UE 10 has deleted, or rewritten to the second reason value (reason value indicating failure), a reason value associated with one or more pieces of S-NSSAI associated with the third network slice information (rejected NSSAI) based on the first procedure example of the third behavior example of the second processing example, the AMF 30 may recognize, as the first reason value (reason value indicating pending), the reason value associated as UE context information with the S-NSSAI. In other words, the reason value associated with one or more pieces of S-NSSAI associated with the third network slice information (rejected NSSAI) and recognized by the AMF 30 may be different from the reason value associated with one or more pieces of S-NSSAI associated with the third network slice information (rejected NSSAI) and recognized by the UE 10. The reason value recognized by the AMF 30 is associated with one or more pieces of S-NSSAI associated with the third network slice information (rejected NSSAI).

A case in which the second network slice information is included in a registration accept message will be described below. When one or more pieces of S-NSSAI included in the second network slice information match one or more pieces of S-NSSAI associated with the first reason value (reason value indicating pending) in the third network slice information (rejected NSSAI) held by the UE 10, or one or more pieces of S-NSSAI indicated by the sixth network slice information (pending NSSAI), the UE 10 may delete the matching one or more pieces of S-NSSAI from the third network slice information (rejected NSSAI) or the sixth network slice information (pending NSSAI). The UE 10 may transmit, to the AMF 30, a registration request (initial registration request, mobility registration update, or periodic registration update) message using the one or more pieces of S-NSSAI deleted from the third network slice information (rejected NSSAI) or the sixth network slice information (pending NSSAI) (S1103).

For example, it is assumed that the UE 10 holds S-NSSAI #1 as S-NSSAI associated with the third network slice information (rejected NSSAI). S-NSSAI #1 is associated with the first reason value (reason value indicating pending). In this case, when having received a registration accept message including S-NSSAI #1 as the second network slice information, the UE 10 deletes S-NSSAI #1 held as S-NSSAI associated with the third network slice information (rejected NSSAI). In addition, the UE 10 may transmit, to the AMF 30, a registration request (initial registration request, mobility registration update, or periodic registration update) message using S-NSSAI #1 (S1103).

For example, it is assumed that the UE 10 holds S-NSSAI #1 as S-NSSAI corresponding to the sixth network slice information (pending NSSAI). In this case, when having received a registration accept message including S-NSSAI #1 as the second network slice information, the UE 10 deletes S-NSSAI #1 held as S-NSSAI corresponding to the sixth network slice information (pending NSSAI). In addition, the UE 10 may transmit, to the AMF 30, a registration request (initial registration request, mobility registration update, or periodic registration update) message using S-NSSAI #1 (S1103).

A case in which the third network slice information and the second reason value are included in a registration accept message will be described below. When one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

For example, it is assumed that the UE 10 holds S-NSSAI #1 as S-NSSAI included in the third network slice information (rejected NSSAI). S-NSSAI #1 is associated with the first reason value (reason value indicating pending). In this case, when having received a registration accept message including S-NSSAI #1 as S-NSSAI associated with the third network slice information and the second reason value (reason value indicating failure), the UE 10 may rewrite, to the second reason value (reason value indicating failure), the reason value associated with S-NSSAI #1 held as S-NSSAI associated with the third network slice information (rejected NSSAI).

In some instances, for example, when configured NSSAI is included in the fourth network slice information, the UE 10 may delete the held third network slice information (rejected NSSAI) or the sixth network slice information (pending NSSAI) held by the UE 10. In other words, when having received the fourth network slice information (configured NSSAI), the UE 10 may reset the held third network slice information (rejected NSSAI) or the sixth network slice information (pending NSSAI) held by the UE 10. The UE 10 may transmit, to the AMF 30, a registration request (initial registration request, mobility registration update, or periodic registration update) message using one or more pieces of S-NSSAI associated with the fourth network slice information (configured NSSAI) (S1103). The fourth network slice information set by the UE 10 may include one or more pieces of S-NSSAI associated with the first reason value (reason value indicating pending) for network slice-specific authentication and authorization in the third network slice information (rejected NSSAI) or one or more pieces of S-NSSAI indicated by the sixth network slice information (pending NSSAI). In other words, at step at S1103, the UE 10 can transmit a registration request (initial registration request, mobility registration update, or periodic registration update) message to the AMF 30 by using one or more pieces of S-NSSAI associated with the first reason value (reason value indicating pending) for network slice-specific authentication and authorization, which have been included in the reset third network slice information (rejected NSSAI), or one or more pieces of S-NSSAI indicated by the sixth network slice information (pending NSSAI).

For example, it is assumed that the UE 10 holds S-NSSAI #1 and S-NSSAI #2 as S-NSSAI associated with the third network slice information (rejected NSSAI). S-NSSAI #1 is associated with the first reason value (reason value indicating pending). S-NSSAI #2 is associated with the fourth reason value (reason value indicating "S-NSSAI not available in the current registration area") disclosed in Non Patent Literature 3. In this case, when having received a registration accept message including the fourth network slice information (configured NSSAI), the UE 10 may delete both S-NSSAI #1 and S-NSSAI #2 held as S-NSSAI associated with the third network slice information (rejected NSSAI) or may delete the third network slice information (rejected NSSAI) held by the UE 10. For example, when S-NSSAI #1 is included in the fourth network slice information (configured NSSAI), the UE 10 may transmit, to the AMF 30, a registration request (initial registration request, mobility registration update, or periodic registration update)

message using S-NSSAI #1 included in the fourth network slice information (configured NSSAI).

In some instances, the UE 10 may perform a second procedure example below, which is performed after the second processing example.

Figure 12:
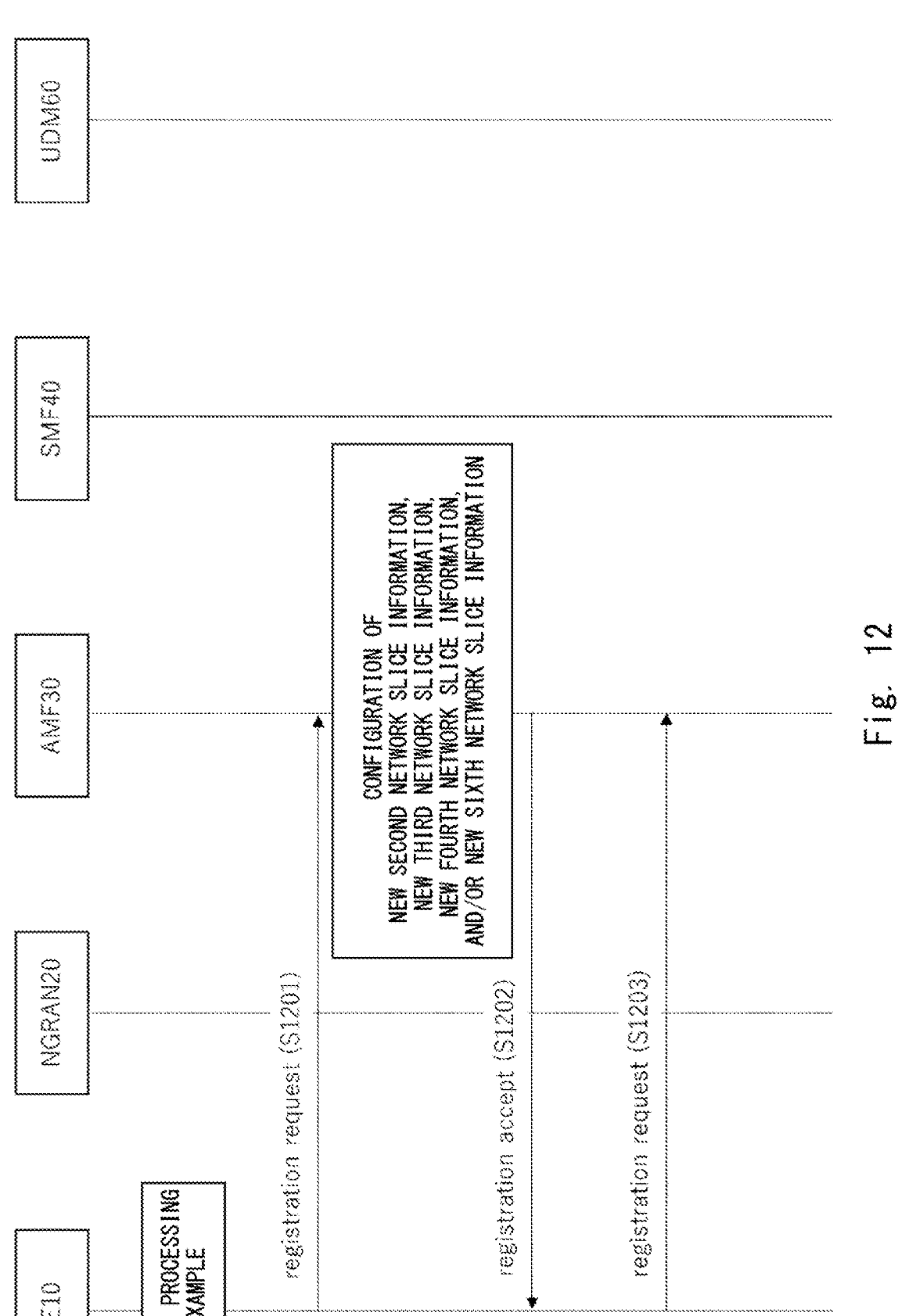
FIG. 12 is a diagram illustrating the procedure of reconnection using S-NSSAI according to the second aspect.

FIG. 12 is a diagram illustrating the procedure of reconnection using S-NSSAI associated with the first reason value (reason value indicating pending) or S-NSSAI included in the sixth network slice information (pending NSSAI) in the second procedure example performed after the second processing example of the present aspect.

Specifically, when the timer 1 being activated has stopped or expired as illustrated in FIG. 12, the UE 10 may transmit, to the AMF 30, a registration request (initial registration request, mobility registration update, or periodic registration update) message by using S-NSSAI associated with the first reason value (reason value indicating pending) in the third network slice information (rejected NSSAI), one or more pieces of S-NSSAI indicated by the sixth network slice information (pending NSSAI), or S-NSSAI provided by a PLMN to which the S-NSSAI is mapped (S1201). Note that one or more pieces of S-NSSAI associated with the first reason value (reason value indicating pending) in the third network slice information (rejected NSSAI) may be one or more pieces of S-NSSAI the associated reason value of which is deleted or rewritten to the second reason value (reason value indicating failure) as described in the first procedure of the third behavior example of the second processing example. In this case, the UE 10 may activate a timer 2 and/or a timer 3. As written in Section 10.2 of Non Patent Literature 3, the timer 2 may be a mobility timer configured to wait a registration accept message from the core network and activated after the UE 10 has transmitted a registration request message. As written in Section 10.2 of Non Patent Literature 3, the timer 3 may be a timer configured to manage retransmission of a registration request message.

The AMF 30 receives a registration request message using one or more pieces of S-NSSAI associated with the first reason value (reason value indicating pending) in the third network slice information (rejected NSSAI) or one or more pieces of S-NSSAI indicated by the sixth network slice information (pending NSSAI). Subsequently, the AMF 30 may set the second network slice information to a registration accept message when the second network slice information that is new (allowed NSSAI) is set to the UE, may set the third network slice information and the second reason value to a registration accept message when the third network slice information (rejected NSSAI) that is new is set to the UE, may set the fourth network slice information to a registration accept message when the fourth network slice information that is new (configured NSSAI) is set to the UE, or may set the sixth network slice information to a registration accept message when the sixth network slice information that is new (pending NSSAI) is set to the UE, and may transmit a registration accept message including the information to the UE 10 (S1202).

Note that, even when the UE 10 has deleted, or rewritten to the second reason value (reason value indicating failure), a reason value associated with one or more pieces of S-NSSAI associated with the third network slice information (rejected NSSAI) based on the first procedure example of the third behavior example of the second processing example, the AMF 30 may recognize, as the first reason value (reason value indicating pending), the reason value associated as UE context information with the S-NSSAI. In other words, the reason value associated with one or more pieces of S-NSSAI associated with the third network slice information (rejected NSSAI) and recognized by the AMF 30 may be different from the reason value associated with one or more pieces of S-NSSAI associated with the third network slice information (rejected NSSAI) and recognized by the UE 10.

A case in which the second network slice information is included in a registration accept message will be described below. When one or more pieces of S-NSSAI included in the second network slice information match one or more pieces of S-NSSAI associated with the first reason value (reason value indicating pending) in the third network slice information (rejected NSSAI) held by the UE 10, or one or more pieces of S-NSSAI indicated by the sixth network slice information (pending NSSAI), the UE 10 may delete the matching one or more pieces of S-NSSAI from the third network slice information (rejected NSSAI) or the sixth network slice information (pending NSSAI). The UE 10 may transmit, to the AMF 30, a registration request (initial registration request, mobility registration update, or periodic registration update) message using the one or more pieces of S-NSSAI deleted from the third network slice information (rejected NSSAI) or the sixth network slice information (pending NSSAI) (S1203).

For example, it is assumed that the UE 10 holds S-NSSAI #1 as S-NSSAI associated with the third network slice information (rejected NSSAI). S-NSSAI #1 is associated with the first reason value (reason value indicating pending). In this case, when having received a registration accept message including S-NSSAI #1 as the second network slice information, the UE 10 deletes S-NSSAI #1 held as S-NSSAI associated with the third network slice information (rejected NSSAI). In addition, the UE 10 may transmit, to the AMF 30, a registration request (initial registration request, mobility registration update, or periodic registration update) message using S-NSSAI #1 (S1203).

For example, it is assumed that the UE 10 holds S-NSSAI #1 as S-NSSAI corresponding to the sixth network slice information (pending NSSAI). In this case, when having received a registration accept message including S-NSSAI #1 as the second network slice information, the UE 10 deletes S-NSSAI #1 held as S-NSSAI corresponding to the sixth network slice information (pending NSSAI). In addition, the UE 10 may transmit, to the AMF 30, a registration request (initial registration request, mobility registration update, or periodic registration update) message using S-NSSAI #1 (S1203).

A case in which the third network slice information and the second reason value are included in a registration accept message will be described below. When one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

For example, it is assumed that the UE 10 holds S-NSSAI #1 as S-NSSAI associated with the third network slice information (rejected NSSAI). S-NSSAI #1 is associated with the first reason value (reason value indicating pending). In this case, when having received a registration accept message including S-NSSAI #1 as S-NSSAI associated with the third network slice information and the second reason value (reason value indicating failure), the UE 10 may rewrite, to the second reason value (reason value indicating failure), the reason value associated with S-NSSAI #1 held as S-NSSAI associated with the third network slice information (rejected NSSAI).

In some instances, for example, when configured NSSAI is included in the fourth network slice information, the UE 10 may delete the held third network slice information (rejected NSSAI) or the sixth network slice information (pending NSSAI) held by the UE 10. In other words, when having received the fourth network slice information (configured NSSAI), the UE 10 may reset the held third network slice information (rejected NSSAI) or the sixth network slice information (pending NSSAI) held by the UE 10. The UE 10 may transmit, to the AMF 30, a registration request (initial registration request, mobility registration update, or periodic registration update) message using one or more pieces of S-NSSAI associated with the fourth network slice information (configured NSSAI) (S1203). The fourth network slice information set by the UE 10 may include one or more pieces of S-NSSAI associated with the first reason value (reason value indicating pending) for network slice-specific authentication and authorization in the third network slice information (rejected NSSAI) or one or more pieces of S-NSSAI indicated by the sixth network slice information (pending NSSAI). In other words, at step at S1203, the UE 10 can transmit a registration request (initial registration request, mobility registration update, or periodic registration update) message to the AMF 30 by using one or more pieces of S-NSSAI associated with the first reason value (reason value indicating pending) for network slice-specific authentication and authorization, which have been included in the reset third network slice information (rejected NSSAI), or one or more pieces of S-NSSAI indicated by the sixth network slice information (pending NSSAI).

For example, it is assumed that the UE 10 holds S-NSSAI #1 and S-NSSAI #2 as S-NSSAI associated with the third network slice information (rejected NSSAI). S-NSSAI #1 is associated with the first reason value (reason value indicating pending). S-NSSAI #2 is associated with the fourth reason value (reason value indicating "S-NSSAI not available in the current registration area") disclosed in Non Patent Literature 3. In this case, when having received a registration accept message including the fourth network slice information (configured NSSAI), the UE 10 may delete both S-NSSAI #1 and S-NSSAI #2 held as S-NSSAI associated with the third network slice information (rejected NSSAI) or may delete the third network slice information (rejected NSSAI) held by the UE 10. For example, when S-NSSAI #1 is included in the fourth network slice information (configured NSSAI), the UE 10 may transmit, to the AMF 30, a registration request (initial registration request, mobility registration update, or periodic registration update) message using S-NSSAI #1 included in the fourth network slice information (configured NSSAI).

Note that, in the first and second procedure examples performed after the second processing example, it is described that, when the timer 1 has stopped or expired, the UE 10 transmits a registration request to the AMF 30 and acquires, through registration accept as a reply to the registration request, new network slice information (the second network slice information, the third network slice information and the second reason value, the fourth network slice information, and/or the sixth network slice information) and activates the timer 2 and/or the timer 3. In this manner, the means for solving such a problem that the UE 10 indefinitely waits the procedure of network slice-specific authentication and authorization is described above, but the present invention is not limited thereto.

Specifically, the UE 10 may receive, from the AMF 30, a configuration update command including the second instruction information. The UE 10 may transmit a registration request message to the AMF 30 based on the second instruction information, and the AMF 30 may include the second network slice information, the third network slice information and the second reason value, the fourth network slice information, and/or the sixth network slice information in a registration accept message in response to the registration request message, thereby setting new network slice information to the UE. The behavior of the UE 10 related to registration request transmission and registration accept may be same as the above-described behavior of the UE 10 in the first and second procedure examples performed after the second processing example.

The first to third behaviors of the second processing example may be behavior executed based on a rule and/or a policy inside the UE 10. The UE 10 may hold a policy (UE policy) in a memory and/or a control unit inside the UE 10. For example, it may be set that, when the timer 1 has expired and a registration request message has been transmitted to the AMF 30, the UE 10 activates the timer 2 and/or the timer 3 based on the policy.

A processing example that stops the timer 1 being activated will be described below.

It may be set that the UE 10 stops the timer 1 when having received an EAP identity request from the core network or stops the timer 1 when having received EAP success or EAP failure.

A case in which the UE 10 performs movement that involves PLMN interchange while the timer 1 is activated will be described below.

A PLMN before the interchange is referred to as an interchange source PLMN, and a PLMN after the interchange is referred to as an interchange destination PLMN.

A first procedure example below may be performed as a procedure example in a case in which the UE 10 performs movement that involves PLMN interchange while the timer 1 is activated.

It may be set that the timer 1 does not need to be stopped when the UE 10 has performed PLMN interchange while the timer 1 is activated. In this case, the timer 1 may be managed (stopped or activated) in the unit of third network slice information or in a combination of the unit of third network slice information and the unit of UE.

Note that the timer 1 may be managed (stopped or activated) in the unit of sixth network slice information or in a combination of the unit of sixth network slice information and the unit of UE.

In some instances, the UE 10 may prevent, in the interchange destination PLMN, transmission of a registration request message (initial registration request, mobility registration update, or periodic registration update) using the third network slice information or the sixth network slice information or using the third network slice information or S-NSSAI provided by a serving PLMN to which the sixth network slice information is mapped in a case in which the interchange source PLMN is a HPLMN.

In some instances, a second procedure example below may be performed as a procedure example in a case in which the UE 10 performs movement that involves PLMN interchange while the timer 1 is activated.

It may be set that the timer 1 does not need to be stopped when the UE 10 has performed PLMN interchange while the timer 1 is activated. In this case, the timer 1 may be managed (stopped or activated) in the unit of third network slice information or in a combination of the unit of third network slice information and the unit of UE. Alternatively, the timer 1 may be managed (stopped or activated) in the unit of sixth network slice information or in a combination of the unit of sixth network slice information and the unit of UE. This is to continue activation of the timer 1, which is activated in the interchange source PLMN, when return is made from the interchange destination PLMN to the interchange source PLMN again through PLMN interchange, thereby continuously applying registration request message transmission management applied in the interchange source PLMN.

In some instances, the UE 10 may transmit, in the interchange destination PLMN, a registration request message (initial registration request, mobility registration update, or periodic registration update) using the third network slice information or the sixth network slice information or using the third network slice information or S-NSSAI provided by a serving PLMN to which the sixth network slice information is mapped in a case in which the interchange source PLMN is a HPLMN.

In some instances, a third procedure example below, which is different from the first and second procedure examples, may be performed as a procedure example in a case in which the UE 10 performs movement that involves PLMN interchange while the timer 1 is activated.

It may be set that the timer 1 is stopped when the UE 10 has performed PLMN interchange while the timer 1 is activated. The timer 1 may be managed (stopped or activated) in the unit of third network slice information and PLMN or in a combination of the unit of third network slice information, the unit of PLMN, and the unit of UE.

The timer 1 may be managed (stopped or activated) in the unit of sixth network slice information and in the unit of PLMN or in a combination of the unit of sixth network slice information, the unit of PLMN, and the unit of UE.

In some instances, the UE 10 may transmit, in the interchange destination PLMN, a registration request message (initial registration request, mobility registration update, or periodic registration update) using the third network slice information or the sixth network slice information or using the third network slice information or S-NSSAI provided by a serving PLMN to which the sixth network slice information is mapped in a case in which the interchange source PLMN is a HPLMN.

A case in which system interchange is performed from the N1 mode to the S1 mode while the timer 1 is activated will be described below.

A first procedure example below may be performed as a procedure example in a case in which the UE 10 interchanges the N1 mode with the S1 mode while the timer 1 is activated.

It may be set that, when the N1 mode is interchanged with the S1 mode while the timer 1 is activated, the UE 10 does not need to stop the timer 1 being activated. This is to continue activation of the timer 1, which is initially activated in the N1 mode, in a case of interchange with the N1 mode again after interchange with the S1 mode, thereby continuously applying registration request message transmission management applied in the N1 mode.

In some instances, a second procedure example below, which is different from the first procedure example, may be performed as a procedure example in a case in which the UE 10 interchanges the N1 mode with the S1 mode while the timer 1 is activated.

It may be set that, when the N1 mode is interchanged with the S1 mode while the timer 1 is activated, the UE 10 stops the timer 1 being activated.

The above description is made on a case in which, after having executed the processing at steps S0501 to S0505 in FIG. 5, the UE 10 receives, from the AMF 30, at least one of the third network slice information and the first reason value, and the first timer information or receives the sixth network slice information and the first timer information, but the following description will be made on a case in which the fifth network slice information is received.

Specifically, the AMF 30 may transmit the fifth network slice information in place of the second network slice information to the UE 10 when all pieces of S-NSSAI included in the first network slice information (requested NSSAI) are targets of network slice-specific authentication and authorization, when the first network slice information (requested NSSAI) is not included and all pieces of default S-NSSAI set to the subscriber information are targets of network slice-specific authentication and authorization, or when all pieces of S-NSSAI included in the first network slice information (requested NSSAI) do not match S-NSSAI (subscribed NSSAI) recorded in the subscriber information and all pieces of default S-NSSAI set to the subscriber information are targets of network slice-specific authentication and authorization.

In other words, the AMF 30 transmits the fifth network slice information since there is no S-NSSAI as the second network slice information (allowed NSSAI) that can be transmitted to the UE 10. The AMF 30 may include S-NSSAI as a target of network slice-specific authentication and authorization in the third network slice information and transmit the associated first reason value (reason value indicating pending) to the UE 10, and does not necessarily need to transmit the third network slice information and the first reason value to the UE 10.

In this case, when having received the first timer information in addition to at least one of the third network slice information and the first reason value from the AMF 30 as described in the present aspect, the UE 10 may perform behavior same as in a case in which the timer 1 is set to the UE in advance.

(Third Aspect)

Figure 13:
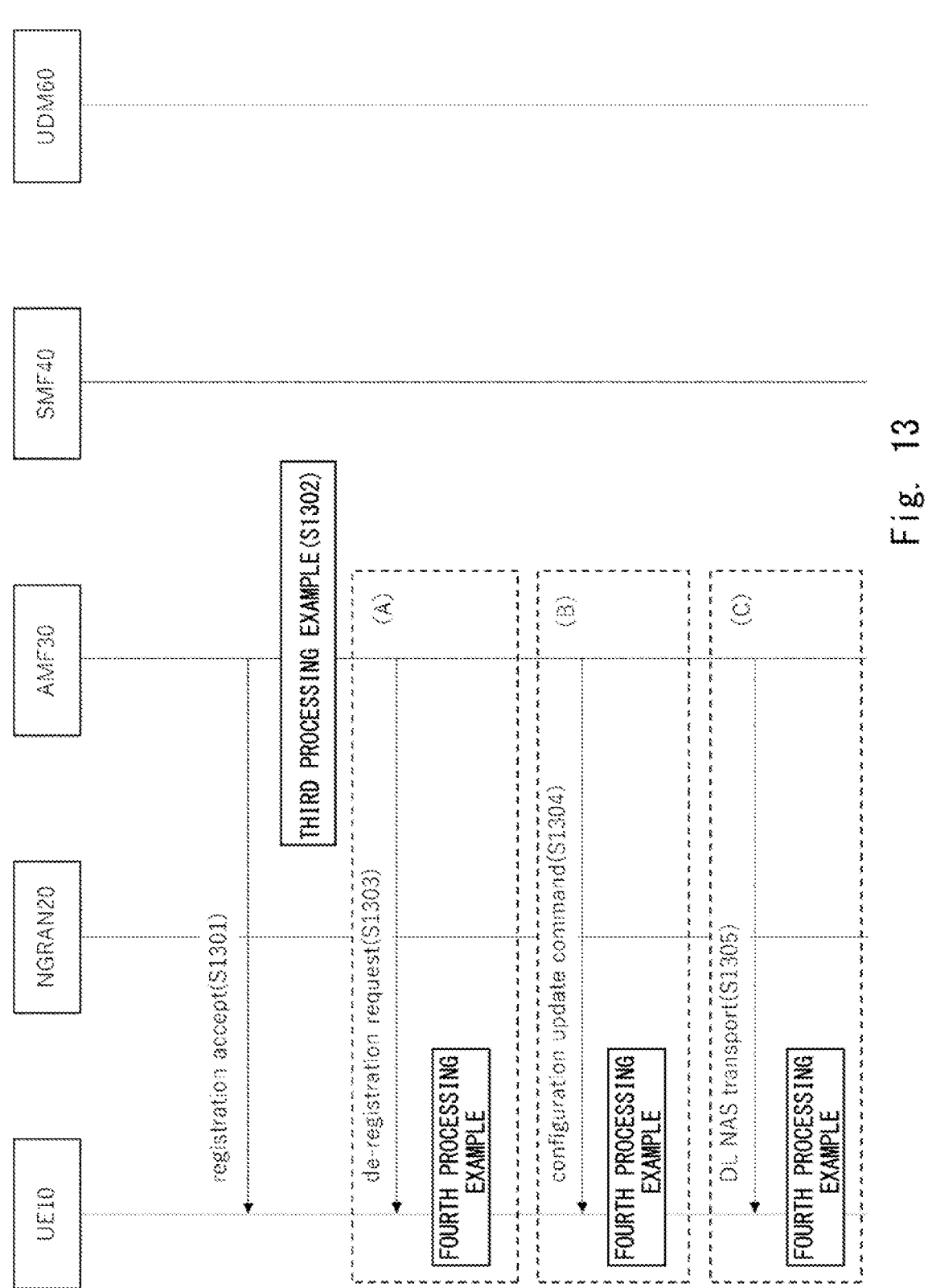
FIG. 13 is a diagram illustrating the procedure of reconnection using S-NSSAI according to a third aspect.

A third aspect will be described below with reference to FIG. 13.

The present aspect relates to a scenario that, after execution of the processing at steps S0501 to S0505 in FIG. 5, the UE 10 receives the third network slice information including S-NSSAI associated with the first reason value, or the sixth network slice information and waits the procedure of network slice-specific authentication and authorization. The UE 10 supports the procedure of network slice-specific authentication and authorization. The wait of the procedure of network slice-specific authentication and authorization is a state in which the UE 10 holds one or more pieces of S-NSSAI associated with the first reason value (reason value indicating pending) or one or more pieces of S-NSSAI included in the sixth network slice information after registration accept reception, after registration completion message transmission, or after 5GMM context establishment. Specifically, the wait of the procedure of network slice-specific authentication and authorization may mean a case in which no EAP identity request is received, neither EAP success nor EAP failure is received, no message (configuration update command or de-registration request) that triggers acquisition of new slice information is received, or no message (DL NAS transport) for setting new slice information is received.

In a solution described below, the UE 10 manages, based on a timer 11 activated by the core network, transmission of a registration request (initial registration request, mobility registration update, or periodic registration update) using S-NSSAI associated with the first reason value (reason value indicating pending) or one or more pieces of S-NSSAI included in the sixth network slice information. Note that the management of transmission may mean management of the behavior of transmission and the behavior of transmission prevention, and the behavior of transmission is also expressed as re-attempt (reconnection).

The timer 11 may be a timer activated when the core network transmits, to the UE 10, a registration accept message using the third network slice information and S-NSSAI associated with the first reason value, or one or more pieces of S-NSSAI included in the sixth network slice information. In other words, the timer 11 may be a timer for determining whether the network is abnormal during the procedure of network slice-specific authentication and authorization.

A step illustrated in FIG. 13 will be described in detail as follows.

Step (1): after having executed the processing at steps S0501 to S0505 in FIG. 5, the AMF 30 transmits at least one of the third network slice information and the first reason value to the UE 10 (S1301). The transmission of at least one of the third network slice information and the first reason value or the sixth network slice information may be performed upon reception of a registration complete message from the UE 10 by the AMF 30 at Step (1).

In this case, the UE 10 may hold one or more pieces of S-NSSAI indicated by the third network slice information in association with the first reason value (reason value indicating pending). The AMF 30 may hold one or more pieces of S-NSSAI corresponding to the third network slice information as UE context information in association with the first reason value (reason value indicating pending). The AMF 30 may hold, as UE context information, one or more pieces of S-NSSAI associated with the third network slice information, and/or a timer value set to the timer 11 in association with the first reason value (reason value indicating pending).

The UE 10 may also hold one or more pieces of S-NSSAI included in the sixth network slice information. The AMF 30 may also hold, as UE context information, one or more pieces of S-NSSAI included in the sixth network slice information. The AMF 30 may hold the first timer information as UE context information in association with one or more pieces of S-NSSAI included in the sixth network slice information.

Step (2): the AMF 30 performs a third processing example (S1302). In the third processing example, the AMF 30 may perform one or more of a first behavior example, a second behavior example, and a third behavior example. The third processing example includes processing including behavior (the first behavior example) that the AMF 30 activates the timer 11 for determining whether the network is abnormal during the procedure of network slice-specific authentication and authorization, behavior (the second behavior example) until the timer 11 expires or stops, and behavior (the third behavior example) when the timer 11 has expired or stopped.

The first behavior example in the present aspect may be behavior that the AMF 30 activates the timer 11.

The AMF 30 may activate the timer 11 in the unit of one or more pieces of S-NSSAI associated with the first reason value (reason value indicating pending) in the third network slice information (rejected NSSAI) or the unit of one or more pieces of S-NSSAI included in the sixth network slice information, and/or in the unit of UE, and/or in the unit of PLMN, or in a combination thereof. In other words, the first timer information including the timer value of the timer 11 may be set in the unit of one or more pieces of S-NSSAI associated with the first reason value (reason value indicating pending) in the third network slice information (rejected NSSAI) or the unit of one or more pieces of S-NSSAI included in the sixth network slice information, and/or in the unit of UE, and/or in the unit of PLMN, or in a combination thereof. For example, the AMF 30 may activate the timer 11 in the unit of one or more pieces of S-NSSAI associated with the first reason value (reason value indicating pending) in the third network slice information (rejected NSSAI), may activate the timer 11 in a combination of the unit of one or more pieces of S-NSSAI associated with the first reason value (reason value indicating pending) in the third network slice information (rejected NSSAI) and the unit of PLMN, may activate the timer 11 in a combination of the unit of one or more pieces of S-NSSAI associated with the first reason value (reason value indicating pending) in the third network slice information (rejected NSSAI), the unit of UE, and the unit of PLMN, may activate the timer 11 in the unit of UE, may activate the timer 11 in the unit of PLMN, may activate the timer 11 in a combination of the unit of UE and the unit of PLMN, or may activate the timer 11 in a combination of the unit of one or more pieces of S-NSSAI associated with the first reason value (reason value indicating pending) in the third network slice information (rejected NSSAI) and the unit of UE. For example, the UE 10 may activate the timer 1 in the unit of one or more pieces of S-NSSAI included in the sixth network slice information, may activate the timer 1 in a combination of the unit of one or more pieces of S-NSSAI included in the sixth network slice information and the unit of PLMN, may activate the timer 11 in a combination of the unit of one or more pieces of S-NSSAI included in the sixth network slice information and the unit of SIM, or may activate the timer 1 in a combination of the unit of one or more pieces of S-NSSAI included in the sixth network slice information and the unit of UE. For example, the UE 10 may activate the timer 1 in a combination of the unit of one or more pieces of S-NSSAI included in the sixth network slice information, the unit of UE, and the unit of PLMN or may activate the timer 1 in a combination of the unit of one or more pieces of S-NSSAI included in the sixth network slice information, the unit of SIM, and the unit of PLMN. For example, the UE 10 may activate the timer 1 in a combination of the unit of one or more pieces of S-NSSAI included in the sixth network slice information, the unit of SIM, the unit of UE, and the unit of PLMN.

Note that, in a case in which there are two or more pieces of S-NSSAI associated with the first reason value (reason value indicating pending), a timer value set to the timer 11 may be obtained as the product of the timer value of a single piece of S-NSSAI and the number of pieces of S-NSSAI associated with the first reason value (reason value indicating pending). Note that, in a case in which there are two or more pieces of S-NSSAI included in the sixth network slice information, the first timer information may be obtained as the product of the timer value of a single piece of S-NSSAI and the number of pieces of the S-NSSAI.

A procedure example 1 below may be performed as the second behavior example in the present aspect.

Until the timer 11 being activated stops or expires, the AMF 30 may ignore one or more pieces of S-NSSAI associated with the first reason value (reason value indicating pending) in the third network slice information (rejected NSSAI) received from the UE 10 or one or more pieces of S-NSSAI included in the sixth network slice information, or a registration request (initial registration request, mobility registration update, or periodic registration update) using one or more pieces of S-NSSAI associated with the first reason value (reason value indicating pending) in the third network slice information (rejected NSSAI) or S-NSSAI of a serving PLMN to which one or more pieces of S-NSSAI included in the sixth network slice information are mapped.

The AMF 30 may perform a procedure example 2 below as the second behavior example.

Until the timer 11 being activated stops or expires, when having received, from the UE 10, one or more pieces of S-NSSAI associated with the first reason value (reason value indicating pending) in the third network slice information (rejected NSSAI) or one or more pieces of S-NSSAI included in the sixth network slice information, or a registration request (initial registration request, mobility registration update, or periodic registration update) using one or more pieces of S-NSSAI associated with the first reason value (reason value indicating pending) in the third network slice information (rejected NSSAI) or S-NSSAI of a serving PLMN to which one or more pieces of S-NSSAI included in the sixth network slice information are mapped, the AMF 30 may transmit a registration reject message to which a reason value (reject cause) for each S-NSSAI is set or a registration accept message to the UE 10 in accordance with the processing situation of the procedure of network slice-specific authentication and authorization for the S-NSSAI. The reject cause may be, for example, Network Slice specific authentication and authorization on going, AAA server not responding, AAA server failure, or AAA server not found.

A procedure example 3 below may be performed as the second behavior example in the present aspect.

Until the timer 11 being activated stops or expires, when having received, from the SMF 40, one or more pieces of S-NSSAI associated with the first reason value (reason value indicating pending) in the third network slice information (rejected NSSAI), or a Namf_Communication_N1N2MessageTransfer message for S-NSSAI of a serving PLMN to which one or more pieces of S-NSSAI associated with the first reason value (reason value indicating pending) in the third network slice information (rejected NSSAI) are mapped, the AMF 30 may set information indicating that the procedure of network slice-specific authentication and authorization is in execution for the S-NNSAI and may transmit a Namf_Communication_N1N2MessageTransfer response message to the SMF 40. The information indicating that the procedure of network slice-specific authentication and authorization in is execution for the S-NNSAI may include information (temporally not available) notifying that the Namf_Communication_N1N2MessageTransfer message temporarily cannot be processed. The SMF 40 receives the information indicating that the procedure of network slice-specific authentication and authorization is in execution for the S-NNSAI. Subsequently, the SMF 40 may activate a unique timer (locally configured timer) and retransmit the Namf_Communication_N1N2MessageTransfer message to the AMF 40 after a certain duration.

The third behavior example in the present aspect may include behavior that the AMF 30 cancels the association of the first reason value (reason value indicating pending) and one or more pieces of S-NSSAI associated with the third network slice information (rejected NSSAI), which are held as UE context information in the UE 10 at the transmission destination of a configuration update command, a de-registration request message, or a DL NAS transport message. The cancellation of the association of the first reason value (reason value indicating pending) and one or more pieces of S-NSSAI associated with the third network slice information (rejected NSSAI) may mean deletion of the first reason value (reason value indicating pending) among one or more pieces of S-NSSAI associated with the third network slice information (rejected NSSAI) and the first reason value (reason value indicating pending) held by the AMF 30 or may mean rewriting to the second reason value (reason value indicating failure).

Step (3): after the third processing example, behavior that the AMF 30 transmits a configuration update command, a de-registration request message, or a DL NAS transport message to the UE 10 (S1303/S1304/S1305) may be performed for the UE 10 to solve such a problem that the procedure of network slice-specific authentication and authorization is indefinitely waited. These messages may be transmitted to set new network slice information to the UE 10. The new network slice information may be the second network slice information (allowed NSSAI), the third network slice information (rejected NSSAI), the fourth network slice information (configured NSSAI), and/or the sixth network slice information (pending NSSAI).

Specifically, the AMF 30 may perform, as Step (3) performed after the third processing example, a first procedure example illustrated in (A) in FIG. 13 as follows.

When the timer 11 being activated has stopped or expired, the AMF 30 may set the second instruction information, the third network slice information, the first reason value, and/or the sixth network slice information to a de-registration request and may transmit the de-registration request to the UE 10 (S1303). Re-registration required or another information element may be set to this de-registration request message, and through transmission of the message, the AMF may prompt the UE 10 to activate re-registration processing.

In some instances, the AMF 30 may perform, as Step (3) performed after the third processing example, a second procedure example illustrated in (B) in FIG. 13, which is different from the first procedure example, as follows.

When the timer 11 being activated has stopped or expired, the AMF 30 may set the second instruction information, the second network slice information, the third network slice information, the first reason value, and/or the sixth network slice information to a configuration update command and may transmit the configuration update command to the UE 10 (S1304). Re-registration required or another information element may be set to this configuration update command message, and through transmission of the message, the AMF 30 may prompt the UE 10 to activate re-registration processing.

In some instances, the AMF 30 may perform, as Step (3) performed after the third processing example, a third procedure example illustrated in (C) in FIG. 13, which is different from the first and second procedure examples, as follows.

When the timer 11 being activated has stopped or expired, the AMF 30 may set the second network slice information, the third network slice information, the first reason value, the fourth network slice information, and/or the sixth network slice information to a DL NAS transport message and may transmit the DL NAS transport message to the UE 10 (S1305). Re-registration required or another information element may be set to the DL NAS transport message, and through transmission of the message, the AMF 30 may prompt the UE 10 to activate re-registration processing.

Having received the message described above in the first procedure example, the second procedure example, or the third procedure example in the present aspect, the UE 10 performs a fourth processing example. In the fourth processing example, the UE 10 may perform a first behavior example.

Specifically, the UE 10 may perform a first procedure example below as the first behavior example.

When the UE 10 has received the second network slice information and one or more pieces of S-NSSAI included in the second network slice information match one or more pieces of S-NSSAI associated with the first reason value (reason value indicating pending) in the third network slice information (rejected NSSAI) held by the UE 10 or one or more pieces of S-NSSAI included in the sixth network slice information, the UE 10 may delete the matching one or more pieces of S-NSSAI from the third network slice information (rejected NSSAI) or the sixth network slice information (pending NSSAI).

In some instances, the UE 10 may perform a second procedure example below as the first behavior example.

When the UE 10 has received the third network slice information and the second reason value and one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

In some instances, the UE 10 may perform a third procedure example below as the first behavior example.

When having received the fourth network slice information including configured NSSAI, the UE 10 may delete the held third network slice information (rejected NSSAI) or the sixth network slice information (pending NSSAI). In other words, the UE 10 may reset the held third network slice information (rejected NSSAI) or the sixth network slice information (pending NSSAI) by receiving the fourth network slice information (configured NSSAI). The UE 10 may transmit, to the AMF 30, a registration request (initial registration request, mobility registration update, or periodic registration update) message using one or more pieces of S-NSSAI associated with the fourth network slice information (configured NSSAI). The fourth network slice information set by the UE 10 may include one or more pieces of S-NSSAI associated with the first reason value (reason value indicating pending) for network slice-specific authentication and authorization in the third network slice information (rejected NSSAI), or one or more pieces of S-NSSAI included in the sixth network slice information (pending NSSAI). In other words, the UE 10 can transmit a registration request (initial registration request, mobility registration update, or periodic registration update) message to the AMF 30 by using one or more pieces of S-NSSAI associated with the first reason value (reason value indicating pending) for network slice-specific authentication and authorization, which have been included in the reset third network slice information (rejected NSSAI), or one or more pieces of S-NSSAI included in the sixth network slice information (pending NSSAI).

In some instances, after the fourth processing example, the UE 10 may perform a first procedure example below as the second behavior example. The first procedure example in the second behavior example may be performed in addition to the first procedure example, the second procedure example, or the third procedure example in the first behavior example.

Figure 14:
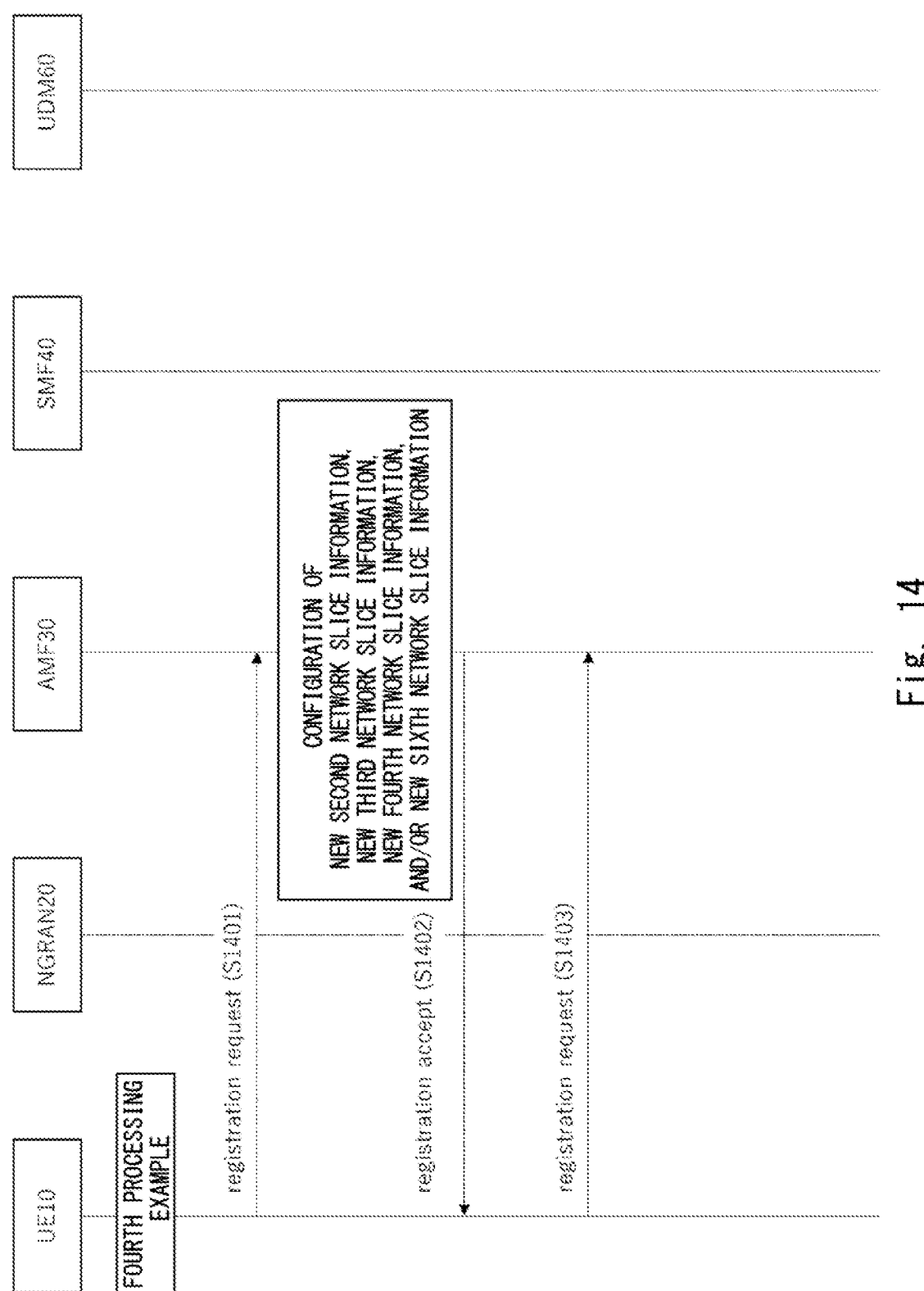
FIG. 14 is a diagram illustrating the procedure of reconnection using S-NSSAI according to the third aspect.

FIG. 14 is a diagram illustrating the procedure of reconnection using neither S-NSSAI associated with the first reason value (reason value indicating pending) nor one or more pieces of S-NSSAI included in the sixth network slice information (pending NSSAI) in the first procedure example of the second behavior example in the present aspect.

Specifically, after having performed the fourth processing example in the present aspect as illustrated in FIG. 14, the UE 10 may transmit, to the AMF 30, a registration request (initial registration request, mobility registration update, or periodic registration update) message using neither one or more pieces of S-NSSAI corresponding to the first reason value (reason value indicating pending) in the third network slice information (rejected NSSAI) nor one or more pieces of S-NSSAI included in the sixth network slice information (pending NSSAI) (S1401).

One or more pieces of S-NSSAI associated with the first reason value (reason value indicating pending) in the third network slice information (rejected NSSAI) may be, for example, S-NSSAI the reason value of which is rewritten to the second reason value (reason value indicating failure), which is described in the first behavior example of the fourth processing example according to the present aspect.

The AMF 30 receives a registration request message using neither one or more pieces of S-NSSAI associated with the first reason value (reason value indicating pending) in the third network slice information (rejected NSSAI) nor one or more pieces of S-NSSAI included in the sixth network slice information (pending NSSAI). Subsequently, the AMF 30 may set the second network slice information to a registration accept message when the second network slice information that is new (allowed NSSAI) is set to the UE, may set the third network slice information and the second reason value to a registration accept message when the third network slice information (rejected NSSAI) that is new is set to the UE, may set the fourth network slice information to a registration accept message when the fourth network slice information that is new (configured NSSAI) is set to the UE, or may set the sixth network slice information to a registration accept message when the sixth network slice information that is new (pending NSSAI) is set to the UE, and may transmit a registration accept message including the information to the UE 10 (S1402).

A case in which the second network slice information is included in a registration accept message will be described below. When one or more pieces of S-NSSAI included in the second network slice information match one or more pieces of S-NSSAI associated with the first reason value (reason value indicating pending) in the third network slice information (rejected NSSAI) held by the UE 10, or one or more pieces of S-NSSAI indicated by the sixth network slice information (pending NSSAI), the UE 10 may delete the matching one or more pieces of S-NSSAI from the third network slice information (rejected NSSAI) or the sixth network slice information (pending NSSAI). The UE 10 may transmit, to the AMF 30, a registration request (initial registration request, mobility registration update, or periodic registration update) message using the one or more pieces of S-NSSAI deleted from the third network slice information (rejected NSSAI) or the sixth network slice information (pending NSSAI) (S1403).

For example, it is assumed that the UE 10 holds S-NSSAI #1 as S-NSSAI associated with the third network slice information (rejected NSSAI). S-NSSAI #1 is associated with the first reason value (reason value indicating pending). In this case, when having received a registration accept message including S-NSSAI #1 as the second network slice information, the UE 10 deletes S-NSSAI #1 held as S-NS-SAI associated with the third network slice information (rejected NSSAI). In addition, the UE 10 may transmit, to the AMF 30, a registration request (initial registration request, mobility registration update, or periodic registration update) message using S-NSSAI #1 (S1403).

For example, it is assumed that the UE 10 holds S-NSSAI #1 as S-NSSAI corresponding to the sixth network slice information (pending NSSAI). In this case, when having received a registration accept message including S-NSSAI #1 as the second network slice information, the UE 10 deletes S-NSSAI #1 held as S-NSSAI corresponding to the sixth network slice information (pending NSSAI). In addition, the UE 10 may transmit, to the AMF 30, a registration request (initial registration request, mobility registration update, or periodic registration update) message using S-NSSAI #1 (S1403).

A case in which the third network slice information and the second reason value are included in a registration accept message will be described below. When one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

For example, it is assumed that the UE 10 holds S-NSSAI #1 as S-NSSAI associated with the third network slice information (rejected NSSAI). S-NSSAI #1 is associated with the first reason value (reason value indicating pending). In this case, when having received a registration accept message including S-NSSAI #1 as the third network slice information and the second reason value (reason value indicating failure), the UE 10 may rewrite, to the second reason value (reason value indicating failure), the reason value associated with S-NSSAI #1 held as S-NSSAI associated with the third network slice information (rejected NSSAI).

In some instances, for example, when configured NSSAI is included in the fourth network slice information, the UE 10 may delete the held third network slice information (rejected NSSAI) or the sixth network slice information (pending NSSAI) held by the UE 10. In other words, when having received the fourth network slice information (configured NSSAI), the UE 10 may reset the held third network slice information (rejected NSSAI) or the sixth network slice information (pending NSSAI) held by the UE 10. The UE 10 may transmit, to the AMF 30, a registration request (initial registration request, mobility registration update, or periodic registration update) message using one or more pieces of S-NSSAI associated with the fourth network slice information (configured NSSAI) (S1403). The fourth network slice information set by the UE 10 may include one or more pieces of S-NSSAI associated with the first reason value (reason value indicating pending) for network slice-specific authentication and authorization in the third network slice information (rejected NSSAI), or one or more pieces of S-NSSAI indicated by the sixth network slice information (pending NSSAI). In other words, at step S1403, the UE 10 can transmit a registration request (initial registration request, mobility registration update, or periodic registration update) message to the AMF 30 by using one or more pieces of S-NSSAI associated with the first reason value (reason value indicating pending) for network slice-specific authentication and authorization, which have been included in the reset third network slice information (rejected NSSAI), or one or more pieces of S-NSSAI indicated by the sixth network slice information (pending NSSAI).

For example, it is assumed that the UE 10 holds S-NSSAI #1 and S-NSSAI #2 as S-NSSAI associated with the third network slice information (rejected NSSAI). S-NSSAI #1 is associated with the first reason value (reason value indicating pending). S-NSSAI #2 is associated with the fourth reason value (reason value indicating "S-NSSAI not available in the current registration area") disclosed in Non Patent Literature 3. In this case, when having received a registration accept message including the fourth network slice information (configured NSSAI), the UE 10 may delete both S-NSSAI #1 and S-NSSAI #2 held as S-NSSAI associated with the third network slice information (rejected NSSAI) or may delete the third network slice information (rejected NSSAI) held by the UE 10. For example, when S-NSSAI #1 is included in the fourth network slice information (configured NSSAI), the UE 10 may transmit, to the AMF 30, a registration request (initial registration request, mobility registration update, or periodic registration update) message using S-NSSAI #1 included in the fourth network slice information (configured NSSAI).

In some instances, after the fourth processing example, the UE 10 may perform a second procedure example below as the second behavior example.

Figure 15:
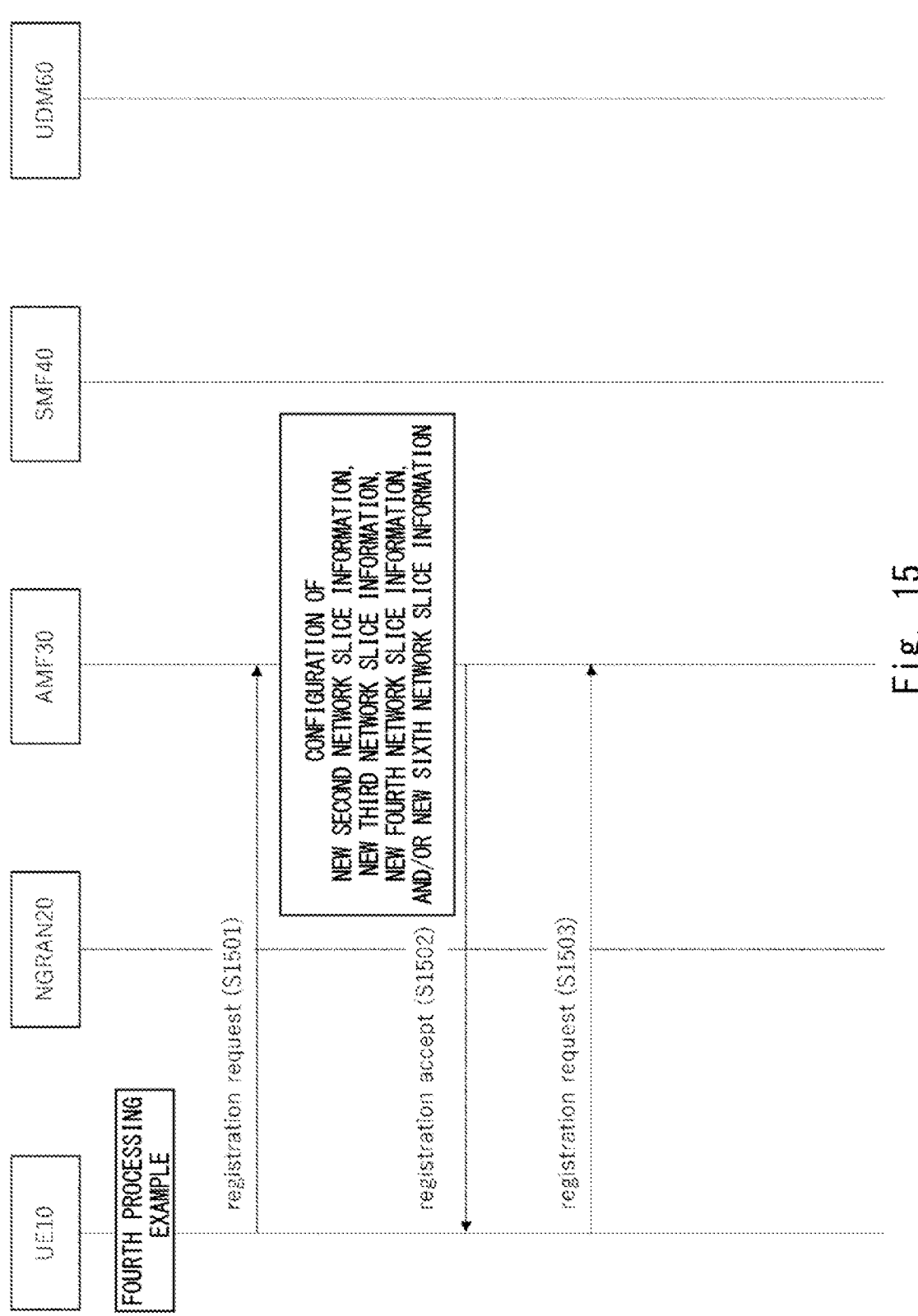
FIG. 15 is a diagram illustrating the procedure of reconnection using S-NSSAI according to the third aspect.

FIG. 15 is a diagram illustrating the procedure of reconnection using S-NSSAI associated with the first reason value (reason value indicating pending) or one or more pieces of S-NSSAI indicated by the sixth network slice information (pending NSSAI) in the second procedure example of the second behavior example in the present aspect.

Specifically, after having performed the fourth processing example in the present aspect as illustrated in FIG. 15, the UE 10 may transmit, to the AMF 30, a registration request (initial registration request, mobility registration update, or periodic registration update) message using one or more pieces of S-NSSAI associated with the first reason value (reason value indicating pending) in the third network slice information (rejected NSSAI) or one or more pieces of S-NSSAI indicated by the sixth network slice information (pending NSSAI) (S1501).

The AMF 30 receives a registration request message using one or more pieces of S-NSSAI associated with the first reason value (reason value indicating pending) in the third network slice information (rejected NSSAI) or one or more pieces of S-NSSAI indicated by the sixth network slice information (pending NSSAI). Subsequently, the AMF 30 may set the second network slice information to a registration accept message when the second network slice information that is new (allowed NSSAI) is set to the UE, may set the third network slice information and the second reason value to a registration accept message when the third network slice information (rejected NSSAI) that is new is set to the UE, may set the fourth network slice information to a registration accept message when the fourth network slice information that is new (configured NSSAI) is set to the UE, or may set the sixth network slice information to a registration accept message when the sixth network slice information that is new (pending NSSAI) is set to the UE, and may transmit a registration accept message including the information to the UE 10 (S1502).

Note that, even when the UE 10 has deleted, or rewritten to the second reason value (reason value indicating failure), a reason value associated with one or more pieces of S-NSSAI associated with the third network slice information (rejected NSSAI) based on the first procedure example, the AMF 30 may recognize, as the first reason value (reason value indicating pending), the reason value associated as UE context information with the S-NSSAI. In other words, the reason value recognized by the AMF 30 may be different from the reason value associated with one or more pieces of S-NSSAI associated with the third network slice information (rejected NSSAI) recognized by the UE 10. The reason value recognized by the AMF 30 is associated with one or more pieces of S-NSSAI associated with the recognized third network slice information (rejected NSSAI).

A case in which the second network slice information is included in a registration accept message will be described below. When one or more pieces of S-NSSAI included in the second network slice information match one or more pieces of S-NSSAI associated with the first reason value (reason value indicating pending) in the third network slice information (rejected NSSAI) held by the UE 10, or one or more pieces of S-NSSAI indicated by the sixth network slice information (pending NSSAI), the UE 10 may delete the matching one or more pieces of S-NSSAI from the third network slice information (rejected NSSAI) or the sixth network slice information (pending NSSAI). The UE 10 may transmit, to the AMF 30, a registration request (initial registration request, mobility registration update, or periodic registration update) message using the one or more pieces of S-NSSAI deleted from the third network slice information (rejected NSSAI) or the sixth network slice information (pending NSSAI) (S1503).

For example, it is assumed that the UE 10 holds S-NSSAI #1 as S-NSSAI associated with the third network slice information (rejected NSSAI). S-NSSAI #1 is associated with the first reason value (reason value indicating pending). In this case, when having received a registration accept message including S-NSSAI #1 as the second network slice information, the UE 10 deletes S-NSSAI #1 held as S-NSSAI associated with the third network slice information (rejected NSSAI). In addition, the UE 10 may transmit, to the AMF 30, a registration request (initial registration request, mobility registration update, or periodic registration update) message using S-NSSAI #1 (S1503).

For example, it is assumed that the UE 10 holds S-NSSAI #1 as S-NSSAI corresponding to the sixth network slice information (pending NSSAI). In this case, when having received a registration accept message including S-NSSAI #1 as the second network slice information, the UE 10 deletes S-NSSAI #1 held as S-NSSAI corresponding to the sixth network slice information (pending NSSAI). In addition, the UE 10 may transmit, to the AMF 30, a registration request (initial registration request, mobility registration update, or periodic registration update) message using S-NSSAI #1 (S1503).

A case in which the third network slice information and the second reason value are included in a registration accept message will be described below. When one or more pieces of S-NSSAI included in the third network slice information match one or more pieces of S-NSSAI associated with the first reason value (reason value indicating pending) in the third network slice information (rejected NSSAI) held by the UE 10, the UE 10 may rewrite a reason value associated with the matching one or more pieces of S-NSSAI to a reason value indicated by the second reason value. The reason value indicated by the second reason value may be the reason value indicating failure.

For example, it is assumed that the UE 10 holds S-NSSAI #1 as the third network slice information (rejected NSSAI). S-NSSAI #1 is associated with the first reason value (reason value indicating pending). In this case, when having received a registration accept message including S-NSSAI #1 as the third network slice information and the second reason value (reason value indicating failure), the UE 10 may rewrite, to the second reason value (reason value indicating failure), the reason value associated with S-NSSAI #1 held as S-NSSAI associated with the third network slice information (rejected NSSAI).

In some instances, for example, when configured NSSAI is included in the fourth network slice information, the UE 10 may delete the held third network slice information (rejected NSSAI) or the sixth network slice information (pending NSSAI) held by the UE 10. In other words, when having received the fourth network slice information (configured NSSAI), the UE 10 may reset the held third network slice information (rejected NSSAI) or the sixth network slice information (pending NSSAI) held by the UE 10. The UE 10 may transmit, to the AMF 30, a registration request (initial registration request, mobility registration update, or periodic registration update) message using one or more pieces of S-NSSAI associated with the fourth network slice information (configured NSSAI) (S1503). The fourth network slice information set by the UE 10 may include one or more pieces of S-NSSAI associated with the first reason value (reason value indicating pending) for network slice-specific authentication and authorization in the third network slice information (rejected NSSAI), or one or more pieces of S-NSSAI indicated by the sixth network slice information (pending NSSAI). In other words, at step S1503, the UE 10 can transmit a registration request (initial registration request, mobility registration update, or periodic registration update) message to the AMF 30 by using one or more pieces of S-NSSAI associated with the first reason value (reason value indicating pending) for network slice-specific authentication and authorization, which are included in the reset third network slice information (rejected NSSAI), or one or more pieces of S-NSSAI indicated by the sixth network slice information (pending NSSAI).

For example, it is assumed that the UE 10 holds S-NSSAI #1 and S-NSSAI #2 as the third network slice information (rejected NSSAI). S-NSSAI #1 is associated with the first reason value (reason value indicating pending). S-NSSAI #2 is associated with the fourth reason value (reason value indicating "S-NSSAI not available in the current registration area") disclosed in Non Patent Literature 3. In this case, when having received a registration accept message including the fourth network slice information (configured NSSAI), the UE 10 may delete both S-NSSAI #1 and S-NSSAI #2 held as S-NSSAI associated with the third network slice information (rejected NSSAI) or may delete the third network slice information (rejected NSSAI) held by the UE 10. For example, when S-NSSAI #1 is included in the fourth network slice information (configured NSSAI), the UE 10 may transmit, to the AMF 30, a registration request (initial registration request, mobility registration update, or periodic registration update) message using S-NSSAI #1 included in the fourth network slice information (configured NSSAI).

Subsequently, a processing example that stops the timer 11 being activated will be described below.

It may be set that the AMF 30 stops the timer 11 when having transmitted an EAP identity request to the UE 10 or stops the timer 11 when having transmitted EAP success or EAP failure to the UE 10.

The above description is made on a case in which, after having executed the processing at steps S0501 to S0505 in FIG. 5, the UE 10 receives at least one of the third network slice information and the first reason value from the AMF 30 and receives the sixth network slice information, but the following description will be made on a case in which the fifth network slice information is received.

Specifically, the AMF 30 may transmit the fifth network slice information to the UE 10 when all pieces of S-NSSAI included in the first network slice information (requested NSSAI) are targets of network slice-specific authentication and authorization, when the first network slice information (requested NSSAI) is not included and all pieces of default S-NSSAI set to the subscriber information are targets of network slice-specific authentication and authorization, or when all pieces of S-NSSAI included in the first network slice information (requested NSSAI) do not match S-NSSAI (subscribed NSSAI) recorded in the subscriber information and all pieces of default S-NSSAI set to the subscriber information are targets of network slice-specific authentication and authorization.

In this case, the AMF 30 transmits the fifth network slice information since there is no S-NSSAI as the second network slice information (allowed NSSAI) that can be transmitted to the UE 10. The AMF 30 may include S-NSSAI as a target of network slice-specific authentication and authorization in the third network slice information and transmit the associated first reason value (reason value indicating pending) to the UE 10, does not necessarily need to transmit the third network slice information and the first reason value to the UE 10, and does not necessarily need to transmit the sixth network slice information to the UE 10.

In this case, the UE 10 may perform behavior same as in the case of having received at least one of the third network slice information and the first reason value from the AMF 30 as described in the present aspect. Alternatively, the UE 10 may perform behavior same as in the case of having received the sixth network slice information from the AMF 30 as described in the present aspect.

In the present specification, a user device (user equipment (UE)) (such as a mobile station, a mobile terminal, a mobile device, or a wireless device) is an entity connected to a network through a wireless interface.

A UE in the present specification is not limited to a dedicated communication device but may be an optional instrument having a communication function as a UE described in the present specification as follows.

The terms "user terminal (user equipment (UE)) (as a term used in 3GPP)", "mobile station", "mobile terminal", "mobile device", and "wireless device" are typically intended to be synonymous with each other and may be a stand-alone mobile station such as a terminal, a cellular phone, a smartphone, a tablet, a cellular IoT terminal, or a IoT device.

Note that it should be understood that the terms "UE" and "wireless device" include a device at rest for a long duration.

The UE may be, for example, a production-manufacturing facility and/or an energy-related machine (such as a boiler, an engine, a turbine, a solar panel, a wind power generator, a hydraulic generator, a thermal power generator, a nuclear power generator, a secondary battery, a nuclear system, a nuclear-related instrument, a heavy electric instrument, a pump including a vacuum pump, a compressor, a fan, an air blower, a hydraulic instrument, an air pressure instrument, a metal fabrication machine, a manipulator, a robot, a robot application system, a tool, a mold, a roll, a conveyance device, an elevation device, a cargo handling device, a fiber machine, a sewing machine, a printer, a printing-related machine, a paper work machine, a chemical machine, a mine machine, a mine-related machine, a construction machine, a building-related machine, an agricultural machine and/or instrument, a forestry machine and/or instrument, a fishery machine and/or instrument, a safety and/or environmental conservation instrument, a tractor, a bearing, a fine bearing, a chain, a gear, a power transmission device, a lubrication device, a valve, a pipe joint, and/or an application system of an optional above-described instrument or machine).

The UE may also be, for example, a transfer device (such as a vehicle, an automobile, a two-wheeled automobile, a bicycle, a train, a bus, a rear car, a rickshaw, a ship or any other watercraft, an airplane, a rocket, an artificial satellite, a drone, or a balloon).

The UE may also be, for example, an information communication device (such as an electronic calculator or a related device thereof, a communication device or a related device thereof, or an electronic component).

The UE may also be, for example, a refrigerator, a refrigerator application product or device, a commercial or service instrument, an automatic vending machine, an automatic service machine, an office machine or device, a consumer electric-electronic machine instrument (such as a voice instrument, a speaker, a radio, a video instrument, a television, an oven microwave, a rice cooker, a coffee maker, a dishwasher, a washing machine, a dryer machine, an electric fan, a ventilator or a related product thereof, or a vacuum cleaner).

The UE may also be, for example, an electronic application system or an electronic application device (such as an X-ray device, a particle acceleration device, a radioactive material application device, a sound wave application device, an electromagnetic application device, or an electric power application device).

The UE may also be, for example, a light bulb, an illumination, a measurement machine, an analysis instrument, a test machine, a measurement machine (such as a smoke alarm, a personal alert sensor, a motion sensor, or a wireless tag), a chronometer (watch or clock), a physical and chemical machine, an optical machine, a medical instrument and/or medical system, a weapon, an amenity craft tool, or a hand tool.

The UE may also be, for example, a personal digital assistant or device (such as an electronic device (for example, a personal computer or an electronic meter) to which a wireless card, a wireless module, or the like is attached or inserted) having a wireless communication function.

The UE may also be, for example, a device or part thereof that provides applications, services, and solutions as follows in "Internet of Things (IoT)" using wired and wireless communication technologies.

IoT devices (or things) include appropriate electronic devices, software, sensors, and network connections that enable data collection and data exchange between devices and with any other communication device.

An IoT device may be an automated instrument that obeys software commands stored in an internal memory.

The IoT device may operate without supervision nor response by a person. The IoT device may be a device installed for a long duration and/or may be inactive for a long duration.

The IoT device may be implemented as part of a stationary device. The IoT device may be embedded in a non-stationary device (such as a vehicle) or attached to a monitored or traced animal or person.

It should be understood that IoT technologies can be implemented on an optional communication device connectable to a communication network that transmits and receives data irrespective of control based on an input by a person nor a software command stored in a memory.

It should be understood that the IoT device is also called a machine-type communication (MTC) device, a machine-to-machine (M2M) communication device, or a narrow band-IoT (NB-IoT) UE.

It should be understood that the UE can support one or a plurality of IoTs or MTC applications.

Examples of the MTC applications are listed in the table (refer to 3GPP TS22.368 V13.2.0 (2017-01-13) Annex B, the contents of which are incorporated in the present specification by reference) below.

The list is not exhaustive but indicates MTC applications as examples.

| Service range | MTC application |
|---|---|
| Security | Monitoring system |
| | Backup of a land-line phone |
| | Physical access control (for example, access to a building) |
| | Vehicle/driver security |
| Tracking & tracing | Fleet management |
| | Order management |
| | Telematics insurance: charging in accordance with drive (Pay as you drive (PAYD)) |
| | Assets management |
| | Navigation |
| | Traffic information |
| | Road tolling |
| | Road traffic optimisation/steering |
| Payment | Point of sales (POS) |
| | Vending machines |
| | Gaming machines |
| Health | Monitoring vital signs |
| | Supporting the aged or handicapped |
| | Web access telemedicine points |
| | Remote diagnostics |
| Remote maintenance/control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer devices | Digital photo frame |
| | Digital camera |
| | Electronic book |

Examples of applications, services, and solutions include a mobile virtual network operator (MVNO) service/system, a disaster-prevention wireless service/system, a private wireless phone (private branch exchange (PBX)) service/system, a PHS/digital codeless phone service/system, a point-of-sale (POS) system, an advertisement deliver service/system, a multicast (multimedia broadcast and multicast service (MBMS)) service/system, a vehicle-to-everything (V2X: inter-vehicular communication and road-vehicle and pedestrian-vehicle communication) service/system, an in-train mobile wireless service/system, a position information-related service/system, a disaster/emergency wireless communication service/system, an internet-of-things (IoT) service/system, a community service/system, a video distribution service/system, a femto cell application service/system, a Voice-over-LTE (VoLTE) service/system, a wireless TAG service/system, a charging service/system, a radio on-demand service/system, a roaming service/system, a user behavior monitoring service/system, a communication carrier/communication NW selection service/system, a function restriction service/system, a proof-of-concept (PoC) service/system, a terminal-oriented private information management service/system, a terminal-oriented display-video service/system, a terminal-oriented non-communication service/system, and an ad hoc NW/DTN (delay tolerant networking) service/system.

Note that the above-described UE categories are merely application examples of technological ideas and aspects described in the present specification. Various kinds of modifications may be provided by the skilled person in the art without limitations to the examples.

Note that the above-described aspects do not limit the present disclosure but may be modified as appropriate without departing from the scope of the present invention. The present disclosure may be achieved by combining the aspects as appropriate.

The present application invention is described above with reference to the aspects but is not limited to the above description. The configurations and details of the invention of the present application include various modifications that can be understood by the skilled person in the art within the scope of the invention.

This application is based upon and claims the benefit of priority from Japanese Patent Application No. 2019-169739, filed on Sep. 18, 2019, the entire contents of which are incorporated herein.

Some or all of the above-described example embodiments can be written as in supplementary notes below but are not limited thereto.

(Supplementary Note 1)

A wireless terminal comprising:

a reception means for receiving, from a core network node, first information indicating that a procedure of network slice-specific authentication and authorization is pending; and a storage means for storing first network slice information including one or more pieces of first slice information or one or more pieces of second slice information, the first slice information indicating a slice that a network rejects to be used, the second slice information indicating a slice that the network permits to be used, wherein the storage means is configured to store, independently from the first network slice information, second network slice information corresponding to the first information.

(Supplementary Note 2)

The wireless terminal according to Supplementary note 1, wherein the second network slice information includes third slice information and the reception means is configured to receive, from the core network node, third network slice information including at least one piece of fourth slice information corresponding to one piece of the third slice information, and the wireless terminal further includes a processing means configured to update the second network slice information based on a kind of the received third network slice information.

(Supplementary Note 3)

The wireless terminal according to Supplementary note 2, wherein the third network slice information is any of allowed network slice selection assistance information (NSSAI), rejected NSSAI, and configured NSSAI.

(Supplementary Note 4)

The wireless terminal according to Supplementary note 3, wherein the processing means is configured to delete all pieces of the third slice information included in the second network slice information when the third network slice information is configured NSSAI.

(Supplementary Note 5)

The wireless terminal according to Supplementary note 3, wherein the processing means is configured to delete at least the one piece of the third slice information included in the second network slice information when the third network slice information is allowed NSSAI or rejected NSSAI.

(Supplementary Note 6)

The wireless terminal according to any one of Supplementary notes 1 to 5, wherein the first information is information indicating that all network slices that the wireless terminal requests the network for permission to use are targets of the network slice-specific authentication and authorization and the procedure of the authentication and authorization is pending, or at least one piece of fifth slice information indicating that a slice that is a target of the network slice-specific authentication and authorization and for which the procedure of the authentication and authorization is pending.

(Supplementary Note 7)

The wireless terminal according to Supplementary note 1, wherein the reception means is configured to receive fourth network slice information including sixth slice information before the storage means is configured to store the second network slice information, the storage means is configured to store the fourth network slice information, and the wireless terminal further includes a processing means configured to delete at least the sixth slice information corresponding to one piece of the third slice information included in the second network slice information from the fourth network slice information when the second network slice information is to be stored in the storage means and the sixth slice information is included in the fourth network slice information.

(Supplementary Note 8)

The wireless terminal according to Supplementary note 7, wherein the fourth network slice information is at least one of allowed NSSAI and rejected NSSAI.

(Supplementary Note 9)

A communication method by a wireless terminal, the communication method comprising:

receiving, from a core network node, first information indicating that a procedure of network slice-specific authentication and authorization is pending;

storing first network slice information including one or more pieces of first slice information or one or more pieces of second slice information, the first slice information indicating a slice that a network rejects to be used, the second slice information indicating a slice that the network permits to be used; and storing, independently from the first network slice information, second network slice information corresponding to the first information.

(Supplementary Note 10)

The communication method according to Supplementary note 9, wherein the second network slice information includes third slice information, and third network slice information including at least one piece of fourth slice information corresponding to one piece of the third slice information is received from the core network node, and the second network slice information is updated based on a kind of the received third network slice information.

(Supplementary Note 11)

The communication method according to Supplementary note 10, wherein the third network slice information is any of allowed network slice selection assistance information (NSSAI), rejected NSSAI, and configured NSSAI.

(Supplementary Note 12)

The communication method according to Supplementary note 11, wherein all pieces of the third slice information included in the second network slice information are deleted when the third network slice information is configured NSSAI.

(Supplementary Note 13)

The communication method according to Supplementary note 11, wherein at least the one piece of the third slice information included in the second network slice information is deleted when the third network slice information is allowed NSSAI or rejected NSSAI.

(Supplementary Note 14)

The communication method according to any one of Supplementary notes 9 to 13, wherein the first information is information indicating that all network slices that the wireless terminal requests the network for permission to use are targets of the network slice-specific authentication and authorization and the procedure of the authentication and authorization is pending, or at least one piece of fifth slice information indicating that a slice that is a target of the network slice-specific authentication and authorization and for which the procedure of the authentication and authorization is pending.

(Supplementary Note 15)

The communication method according to Supplementary note 9, wherein fourth network slice information including sixth slice information is received before the second network slice information is stored, the fourth network slice information is stored, and at least the sixth slice information corresponding to one piece of the third slice information included in the second network slice information is deleted from the fourth network slice information when the second network slice information is to be stored and the sixth slice information is included in the fourth network slice information.

(Supplementary Note 16)

The communication method according to Supplementary note 15, wherein the fourth network slice information is at least one of allowed NSSAI and rejected NSSAI.

(Supplementary Note 17)

A core network node comprising a transmission means for transmitting, to a wireless terminal, first information indicating that a procedure of network slice-specific authentication and authorization is pending, wherein, upon the transmission of the first information, the wireless terminal stores, independently from first network slice information, second network slice information corresponding to the first information, the first network slice information including one or more pieces of first slice information or one or more pieces of second slice information, the first slice information indicating a slice that a network rejects to be used, the second slice information indicating a slice that the network permits to be used.

(Supplementary Note 18)

The core network node according to Supplementary note 17, wherein the second network slice information includes third slice information and the transmission means is configured to transmit, to the wireless terminal, third network slice information including at least one fourth slice information corresponding to one piece of the third slice information, and upon the transmission of the third network slice information, the second network slice information is updated based on a kind of the third network slice information.

(Supplementary Note 19)

The core network node according to Supplementary note 18, wherein the third network slice information is any of allowed network slice selection assistance information (NSSAI), rejected NSSAI, and configured NSSAI.

(Supplementary Note 20)

The core network node according to Supplementary note 19, wherein all pieces of the third slice information included in the second network slice information are deleted when the third network slice information is configured NSSAI.

(Supplementary Note 21)

The core network node according to Supplementary note 19, wherein at least the one piece of the third slice information included in the second network slice information is deleted when the third network slice information is allowed NSSAI or rejected NSSAI.

(Supplementary Note 22)

The core network node according to any one of Supplementary notes 17 to 21, wherein the first information is information indicating that all network slices that the wireless terminal requests the network for permission to use are targets of the network slice-specific authentication and authorization and the procedure of the authentication and authorization is pending, or at least one piece of fifth slice information indicating that a slice that is a target of the network slice-specific authentication and authorization and for which the procedure of the authentication and authorization is pending.

(Supplementary Note 23)

The core network node according to Supplementary note 17, wherein the transmission means is configured to transmit fourth network slice information including sixth slice information to the wireless terminal before the second network slice information is stored, upon the transmission of the fourth network slice information, the wireless terminal stores the fourth network slice information, and at least the sixth slice information corresponding to one piece of the third slice information included in the second network slice information is deleted from the fourth network slice information when the second network slice information is to be stored and the sixth slice information is included in the fourth network slice information.

(Supplementary Note 24)

The core network node according to Supplementary note 23, wherein the fourth network slice information is at least one of allowed NSSAI and rejected NSSAI.

(Supplementary Note 25)

A communication method by a core network node, the communication method comprising:

transmitting, to a wireless terminal, first information indicating that a procedure of network slice-specific authentication and authorization is pending; and storing, upon the transmission of the first information, in the wireless terminal independently from first network slice information, second network slice information corresponding to the first information, the first network slice information including one or more pieces of first slice information or one or more pieces of second slice information, the first slice information indicating a slice that a network rejects to be used, the second slice information indicating a slice that the network permits to be used.

(Supplementary Note 26)

The communication method according to Supplementary note 25, wherein the second network slice information includes third slice information, and third network slice information including at least one piece of fourth slice information corresponding to one piece of the third slice information is transmitted to the wireless terminal, and upon the transmission of the third network slice information, the second network slice information is updated based on a kind of the third network slice information.

(Supplementary Note 27)

The communication method according to Supplementary note 26, wherein the third network slice information is any of allowed network slice selection assistance information (NSSAI), rejected NSSAI, and configured NSSAI.

(Supplementary Note 28)

The communication method according to Supplementary note 27, wherein all pieces of the third slice information included in the second network slice information are deleted when the third network slice information is configured NSSAI.

(Supplementary Note 29)

The communication method according to Supplementary note 27, wherein at least the one piece of the third slice information included in the second network slice information is deleted when the third network slice information is allowed NSSAI or rejected NSSAI.

(Supplementary Note 30)

The communication method according to any one of Supplementary notes 25 to 29, wherein the first information is information indicating that all network slices that the wireless terminal requests the network for permission to use are targets of the network slice-specific authentication and authorization and the procedure of the authentication and authorization is pending, or at least one piece of fifth slice information indicating that a slice that is a target of the network slice-specific authentication and authorization and for which the procedure of the authentication and authorization is pending.

(Supplementary Note 31)

The communication method according to Supplementary note 25, wherein fourth network slice information including sixth slice information is transmitted to the wireless terminal before the second network slice information is stored,

upon the transmission of the fourth network slice information, the wireless terminal stores the fourth network slice information, and at least the sixth slice information corresponding to one piece of the third slice information included in the second network slice information is deleted from the fourth network slice information when the second network slice information is to be stored and the sixth slice information is included in the fourth network slice information.

(Supplementary Note 32)

The communication method according to Supplementary note 31, wherein the fourth network slice information is at least one of allowed NSSAI and rejected NSSAI.

REFERENCE SIGNS LIST

10 UE
11 COMMUNICATION UNIT
12 CONTROL UNIT
20 NG-(R)AN
30 AMF
31 COMMUNICATION UNIT
32 CONTROL UNIT
40 SMF
50 UPF
60 UDM
70 AAA

What is claimed is:

1. A user equipment (UE) comprising:
at least one memory storing instructions; and
at least one processor configured to execute the instructions to:
receive, from a core network node, pending network slice selection assistance information (Pending NSSAI) indicating at least one single network slice selection assistance information (S-NSSAI) for which a procedure of network slice-specific authentication and authorization is pending;
receive, from the core network node, Allowed Network Slice Selection Assistance Information (Allowed NSSAI);
remove, from the Pending NSSAI, each of one or more S-NSSAI(s) if each of the one or more S-NSSAI(s) includes one of at least one mapped single Network Slice Selection Assistance Information (mapped S-NSSAI) for the Allowed NSSAI,
wherein the at the least one mapped S-NSSAI is for a Home Public Land Mobile Network (Home PLMN), and
wherein each of the at least one mapped S-NSSAI is mapped to a S-NSSAI of a serving PLMN;

62 store the Allowed NSSAI; and
store the at least one mapped S-NSSAI.

2. The UE according to claim 1, wherein the Allowed NSSAI is included in at least one of a registration accept message, a configuration update command or a Downlink (DL) non-access stratum (NAS) transport message.

3. The UE according to claim 1, wherein the at least one processor is configured to execute the instructions to:
receive, from the core network node, an extensible authentication protocol (EAP) identity request.

4. The UE according to claim 3, wherein the at least one processor is configured to execute the instructions to:
send, to the core network node, an EAP identity response for the at least one mapped S-NSSAI.

5. The UE according to claim 1, wherein the at least one processor is configured to execute the instructions to:
receive, from the core network node, a registration accept message including information, wherein the information indicates mapping of the S-NSSAI of the serving PLMN to the least one mapped S-NSSAI.

6. A method performed by a user equipment (UE), the method comprising:
receiving, from a core network node, pending network slice selection assistance information (Pending NSSAI) indicating at least one single network slice selection assistance information (S-NSSAI) for which a procedure of network slice-specific authentication and authorization is pending;
receiving, from the core network node, allowed network slice selection assistance information (Allowed NSSAI);
removing each of one or more S-NSSAI(s) from the Pending NSSAI, in a case where each of the one or more S-NSSAI(s) includes one of at least one mapped network slice selection assistance information (mapped S-NSSAI) for the Allowed NSSAI,
wherein the at the least one mapped S-NSSAI is for a Home Public Land Mobile Network (Home PLMN), and wherein each of the at least one mapped S-NSSAI is mapped to a S-NSSAI of a serving PLMN;
storing the Allowed NSSAI; and
storing the at least one mapped S-NSSAI.

7. The method according to claim 6, wherein the Allowed NSSAI is included in at least one of a registration accept message, a configuration update command or a Downlink (DL) non-access stratum (NAS) transport message.

* * * * *